SEARCH MEMORY

Filed July 9, 1964 11 Sheets-Sheet 1

INVENTORS
EARL C. JOSEPH
ALBERT KAPLAN
SAMUEL K. POPPLETON
BY Griffin and Stokes
ATTORNEYS

SEARCH MEMORY

Filed July 9, 1964 11 Sheets-Sheet 5

United States Patent Office 3,332,069

Patented July 18, 1967

3,332,069

SEARCH MEMORY

Earl C. Joseph, Minneapolis, Albert Kaplan, St. Paul, and Samuel K. Poppleton, Savage, Minn., assignors to Sperry Rand Corporation, New York, N.Y., a corporation of Delaware Filed July 9, 1964, Ser. No. 381,452

34 Claims. (Cl. 340—172.5)

ABSTRACT OF THE DISCLOSURE

The disclosure relates to a descriptor-oriented thin film search memory. A finite dictionary of descriptive terms is defined and a file established for each descriptor. When a document is entered in the system it is assigned an arbitrary location and its address is entered into the files of all descriptors in its abstract. To retrieve a document, a request is stated as a set of descriptors. The system includes a mode of search register which specifies the type of search, such as Equality, Greater Than, Less Than, Between Limits, Next Higher, Next Lower. The system can also perform the logical negation of these modes; i.e. Not Equality, Not Greater Than, etc. A parameter register defines the field for which the search is made. The field is defined on a byte basis and a different mode of search may be performed on each byte. A mask register is provided to enable selective masking of individual bits with a byte. The result of a byte search in a same word, or the result of a word search may be logically combined with cumulative results of previously performed searches.

The present invention relates to a new and novel search or associative memory system, and more particularly, to one having the capability of performing any one of a plurality of search modes simultaneously on each of a group of words, and wherein mixed searches can be performed on two or more portions of the same memory word in just one pass therethrough.

Search memory techniques are effectively applied to the broad class of problems associated with information retrieval. Information retrieval can be defined as the process of extracting information from a file on the basis of the information itself. Extremely time-consuming file searches, and sorts required for file maintenance, can be accomplished on orders of magnitude faster than with conventional techniques. The two predominate approaches to information retrieval are the document-oriented system and the descriptor-oriented system, the latter being the class of the present invention. In a descriptor-oriented system, a finite dictionary of descriptive terms is defined and a file is established for each "descriptor.' When a document is entered into the file, it is assigned an arbitrary location and its address is entered into the files of all the "descriptors" in its abstract. To retrieve a document, a request is stated as a set of "descriptors." The files of these "descriptors" are read into the computor and correlated. That is, if a given document address is found in the files of all of the "descriptors" specified, then it satisfies the retrieval or search criteria. Many variations of this basic process can be employed, such as And-Or-Not clauses in the request (as in the document-oriented system), and partial correlation retrieval where a document is retrieved if its address is found in at least *k* out of the *n* "descriptor" files specified in the request.

This mode of operation can also be effectively implemented with a search memory with a considerable increase in performance. In this mode, the search memory is used to correlate the "descriptor" files. If a request were stated as (missiles) And (pump) And (vibration), the first step involves the copying of the file for missiles from a mass memory into the search memory. Then the file for pump is read sequentially and each item compared simultaneously with all items in the search memory. If a match occurs, that data is written in a temporary store. At the completion of the pump file, this temporary store contains a list of addresses which were found in both the missile and pump files. The search memory is then cleared and this partially correlated list copied into the search memory. The vibration file is then sequentially accessed and this process repeated, resulting in a list in temporary storage representing addresses common to all three lists and thus satisfying the search criteria. The Or-Not functions can be easily implemented in this type of system. To implement the Or function, the normal logic is temporarily disengaged. An address from the "descriptor" file is then compared with the file in the search memory and if there is a match it is disregarded. If there is no match, that document address is written into the next available slot in the search memory. The Not function is mechanized in a converse fashion. If a match is found, the matching entry is erased; if no match, that document address is discarded.

The present invention provides novel search memory means particularly useful in an information retrieval process such as would be employed for a library or inventory control system. The major requirements for this type of application are to provide Equality searches, variable And-Or-Not logic between byte or field searches, and the ability to analyze the results of partial word searches so that search criteria can be loosened or tightened according to the number of matches. With reference to the present system, a search is defined as the comparison of all, or selected portions, (i.e. bytes) of the content of a search register with the correspondingly positioned bytes of each word held in a memory matrix. The present system further provides Greater Than, Less Than, and Between Limits search functions for data correlation applications which require quantitative searches. Finally, statistical analysis of data sets requires Next Higher and Next Lower searches, as well as other quantitative criteria, all of which are provided by the present system. In addition, the number of matches found at the end of each search may be required, as is the address and/or related data of each match found after the search has been conducted.

Therefore, one object of the present invention is to provide a system which can perform any one of the following search criteria on all, or selected portions, of a word: Equal, Greater Than Or Equal, Less Than Or Equal, Between Limits, Next Higher, and the Not functions of many of the above.

A related object of this invention is to provide a novel word match logic circuit for accomplishing any of the above search modes.

This system further provides completely variable fluid or byte structure so that multiple bytes of variable length and position within the search word can be specified under a program control word. Furthermore, the system permits mixed searches to be performed on a word for only one pass therethrough such that a different search mode can be applied to each specified byte and the result of each byte interrogation combined in either And or Or fashion with the cumulative results of previous byte, or even word searches.

Therefore, another object of the present invention is to provide a search or associative memory system wherein the location and length of word portions, i.e. bytes, can be selectively specified for each search.

A further object of the present invention is to provide a system of the nature described wherein the result of a byte search in the same word, or the result of a word search, can be logically combined with cumulative results of previously performed searches.

Still another object of the present invention is to provide a system wherein mixed searches, i.e. different modes of search, can be conducted on different bytes of the same word during but a single pass through said word.

Another object of the present invention is to provide an interrupted search mode whereby the search can be selectively interrupted after a specified byte has been interrogated and the approximate number of matches then can be determined, and wherein the exact number of matches can be requested by program control.

These and other objects of the present invention will become apparent during the course of the following description to be read in view of the drawings, in which.

Figures 2, 3A, 3B, 3C:
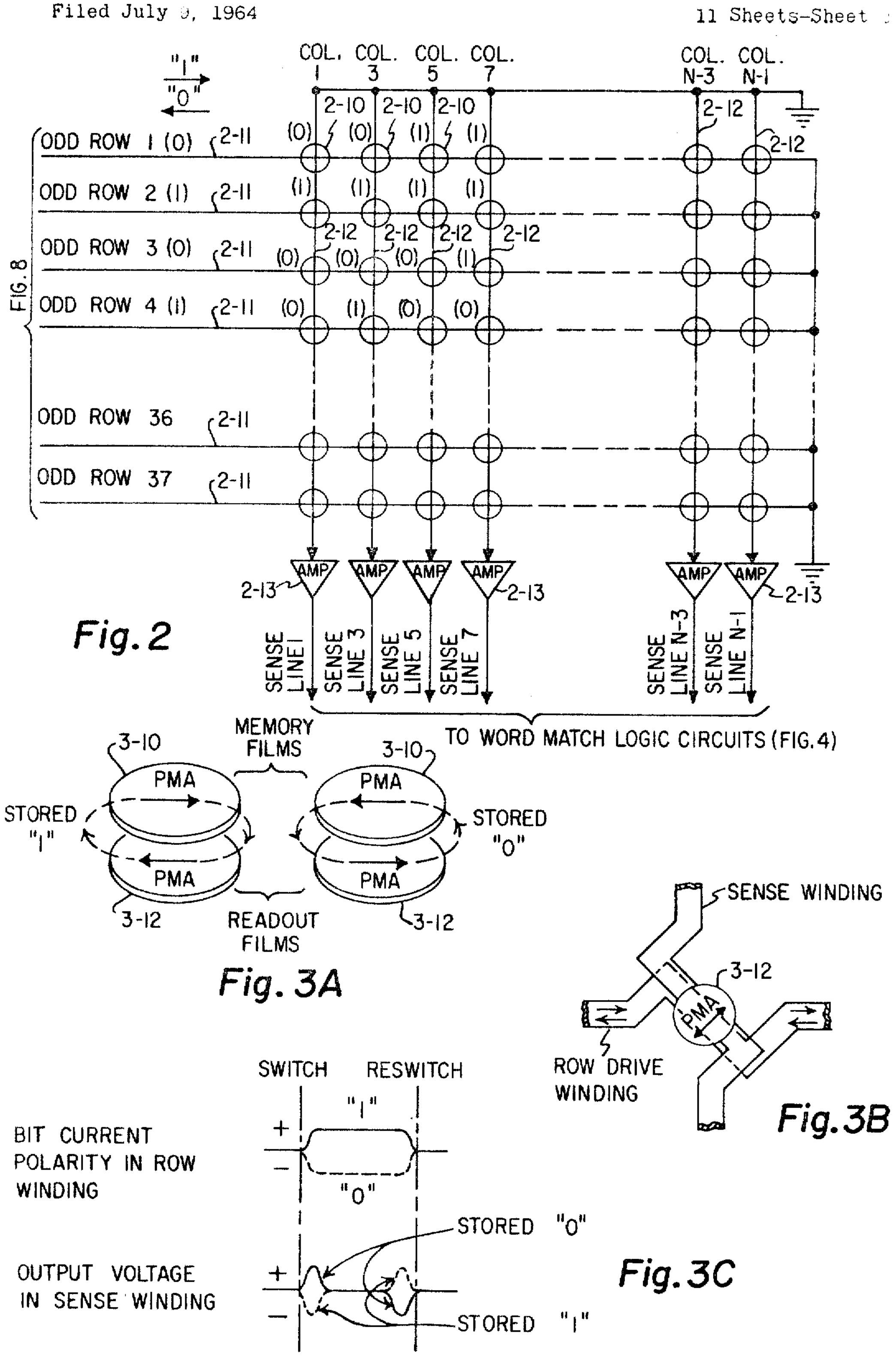
FIGURE 2 is a diagrammatic drawing of a multiword memory matrix or array, preferably of the magnetic thin film type.
Figure 4:
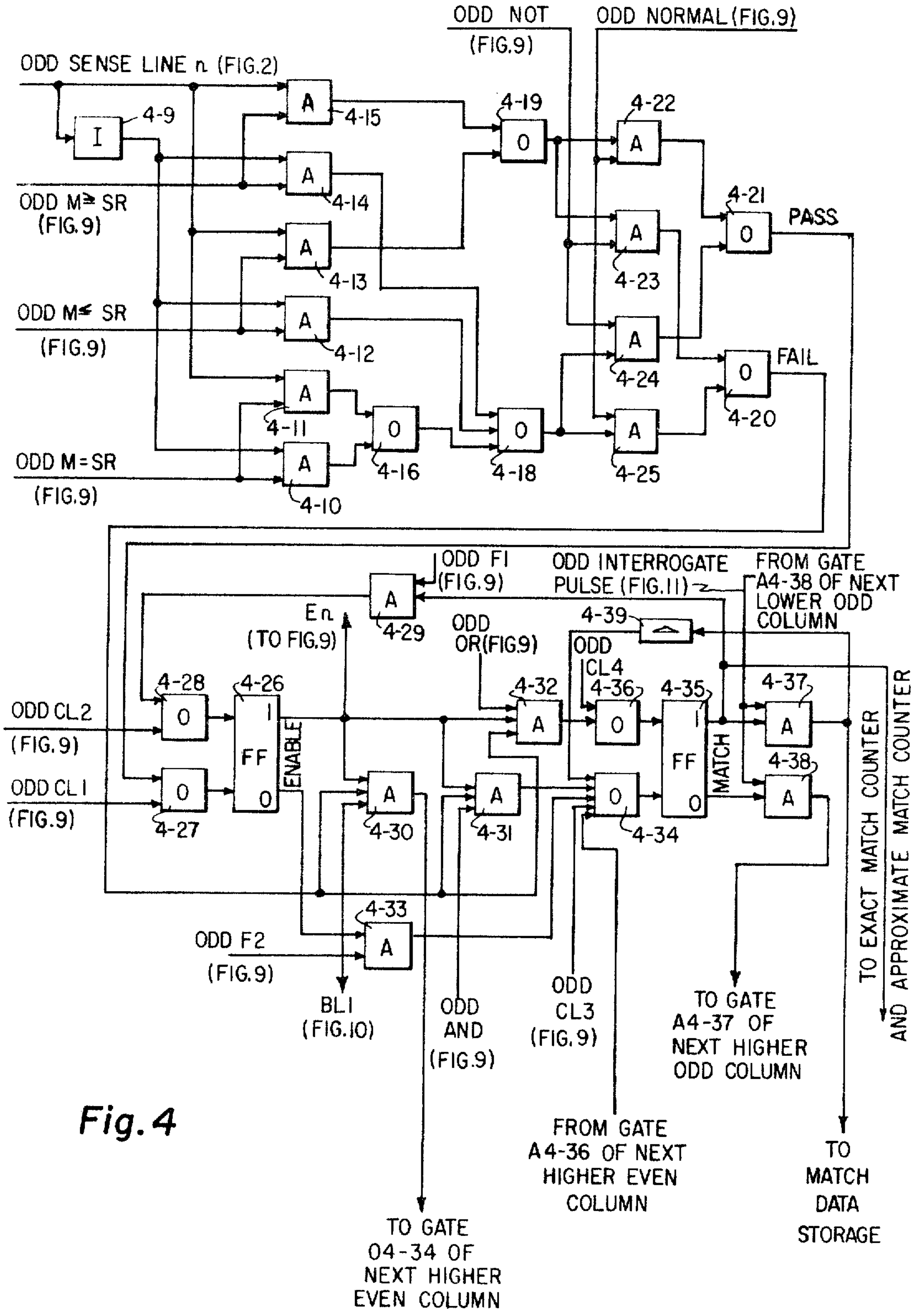
Figure 5:
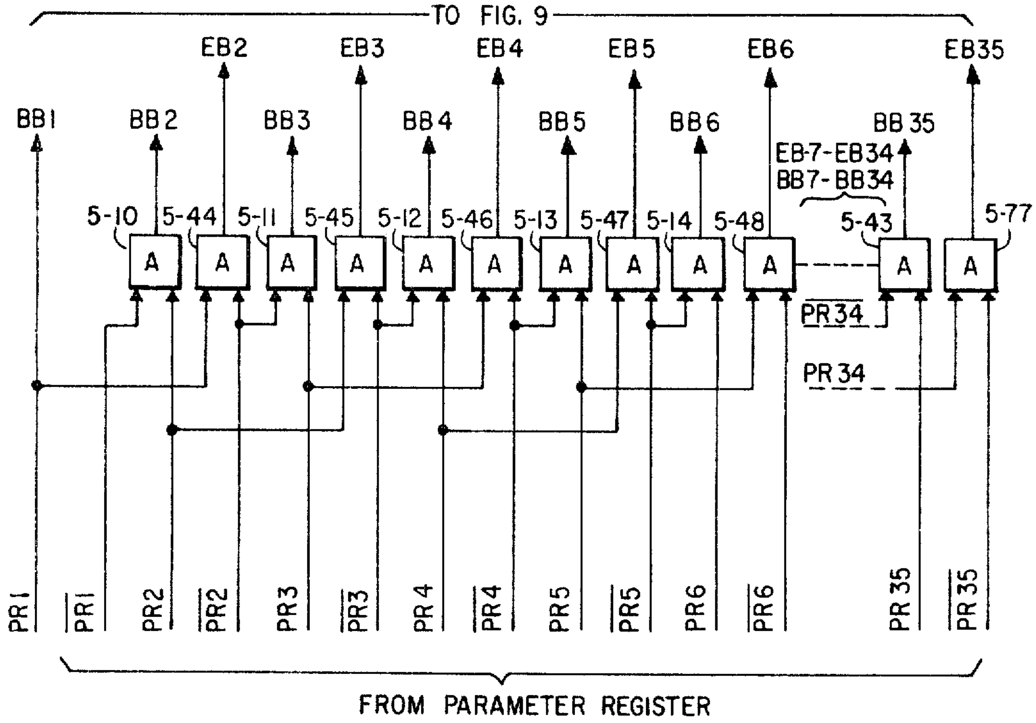
Figure 6:
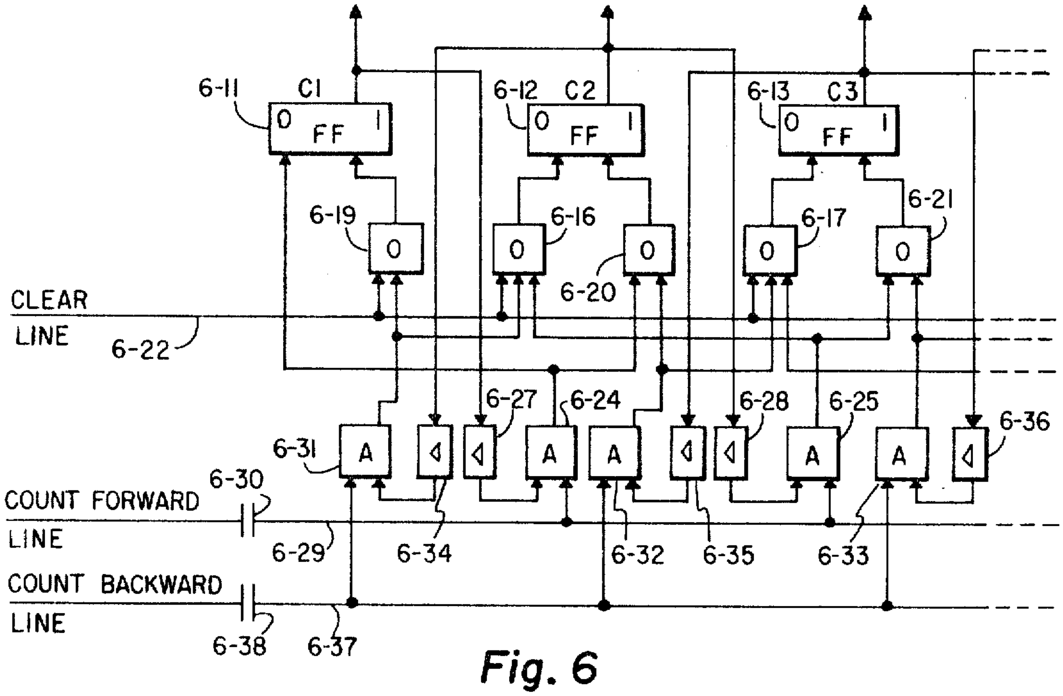
Figure 7:
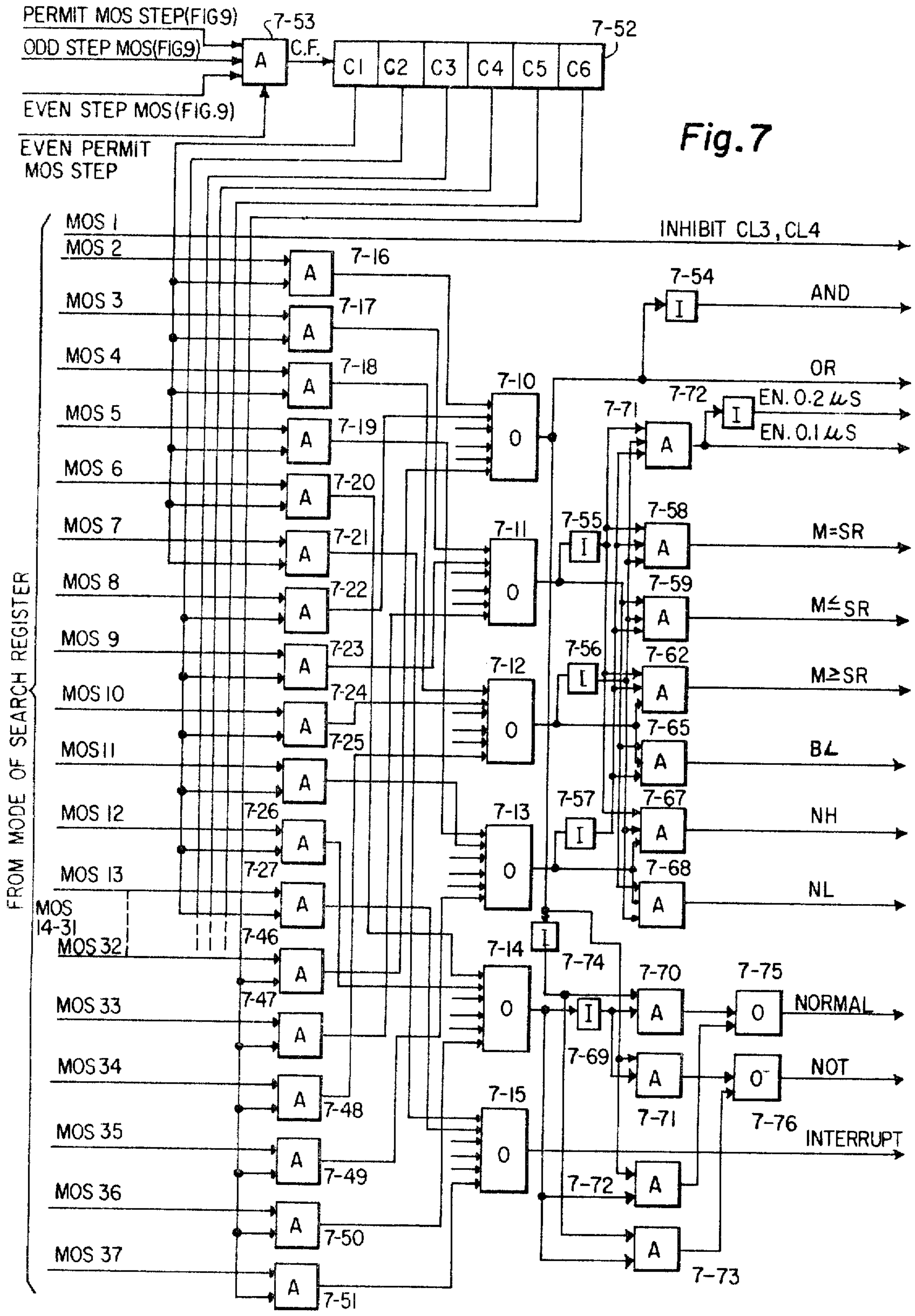
Figure 8:
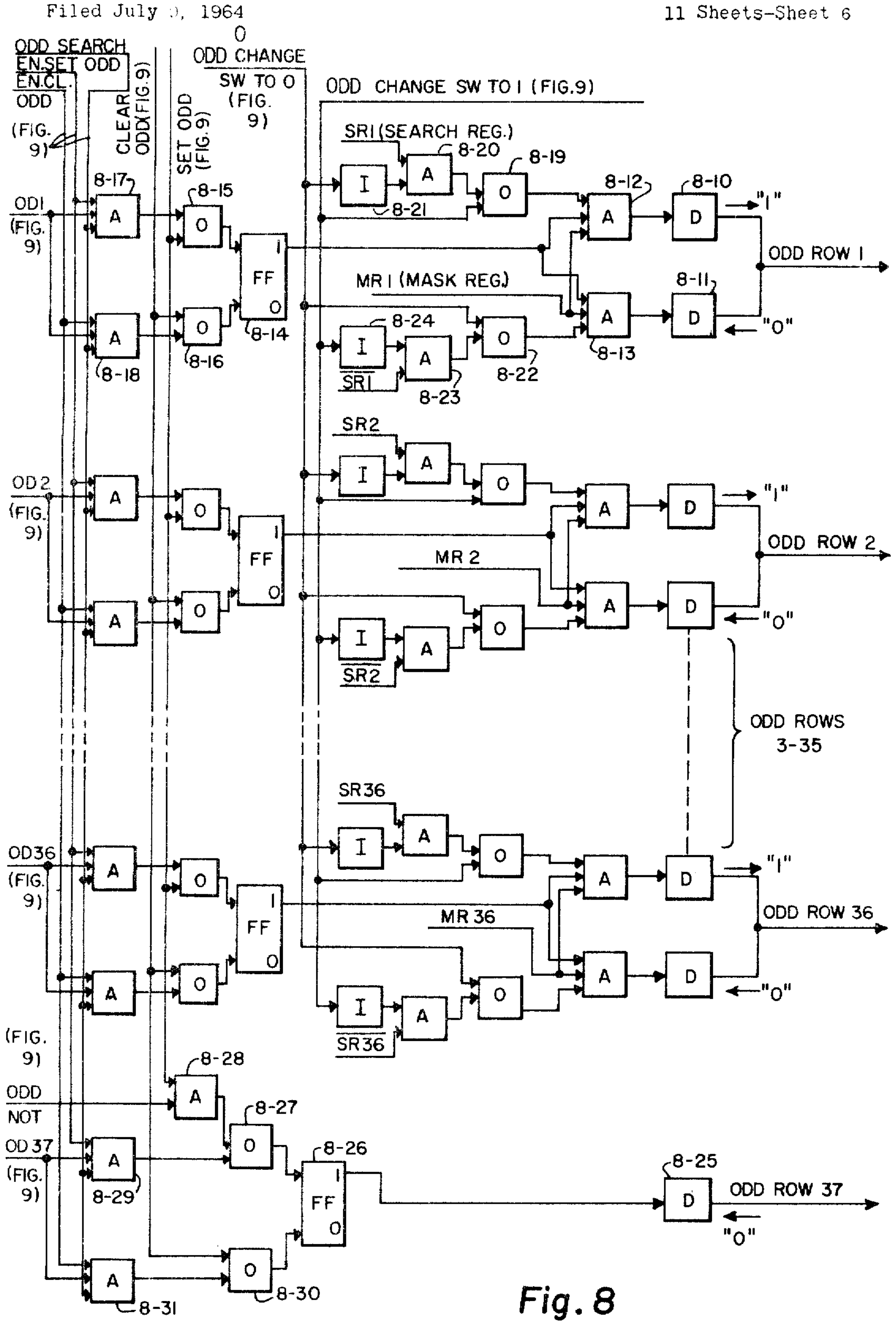
Figure 9A:
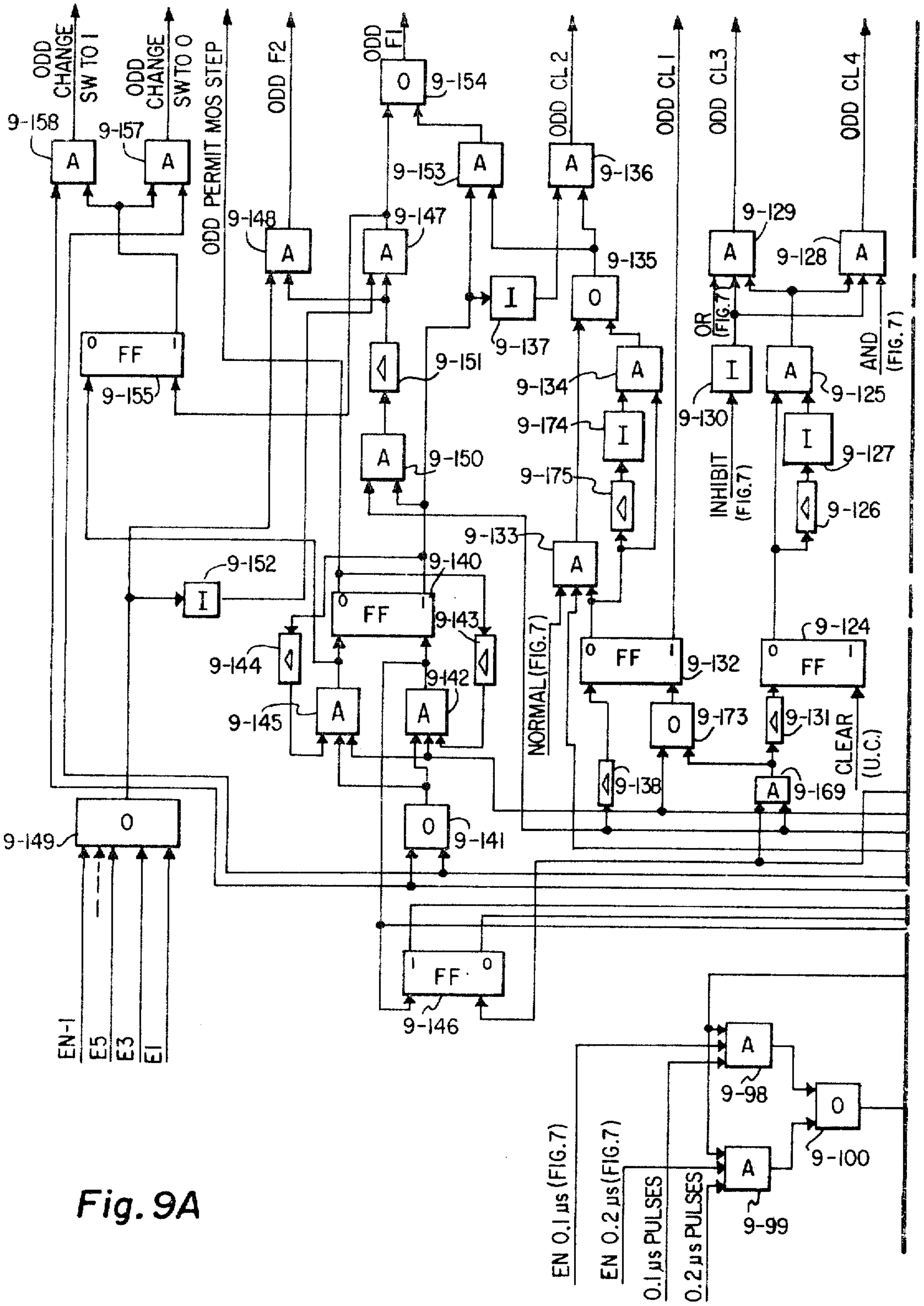
Figure 9B:
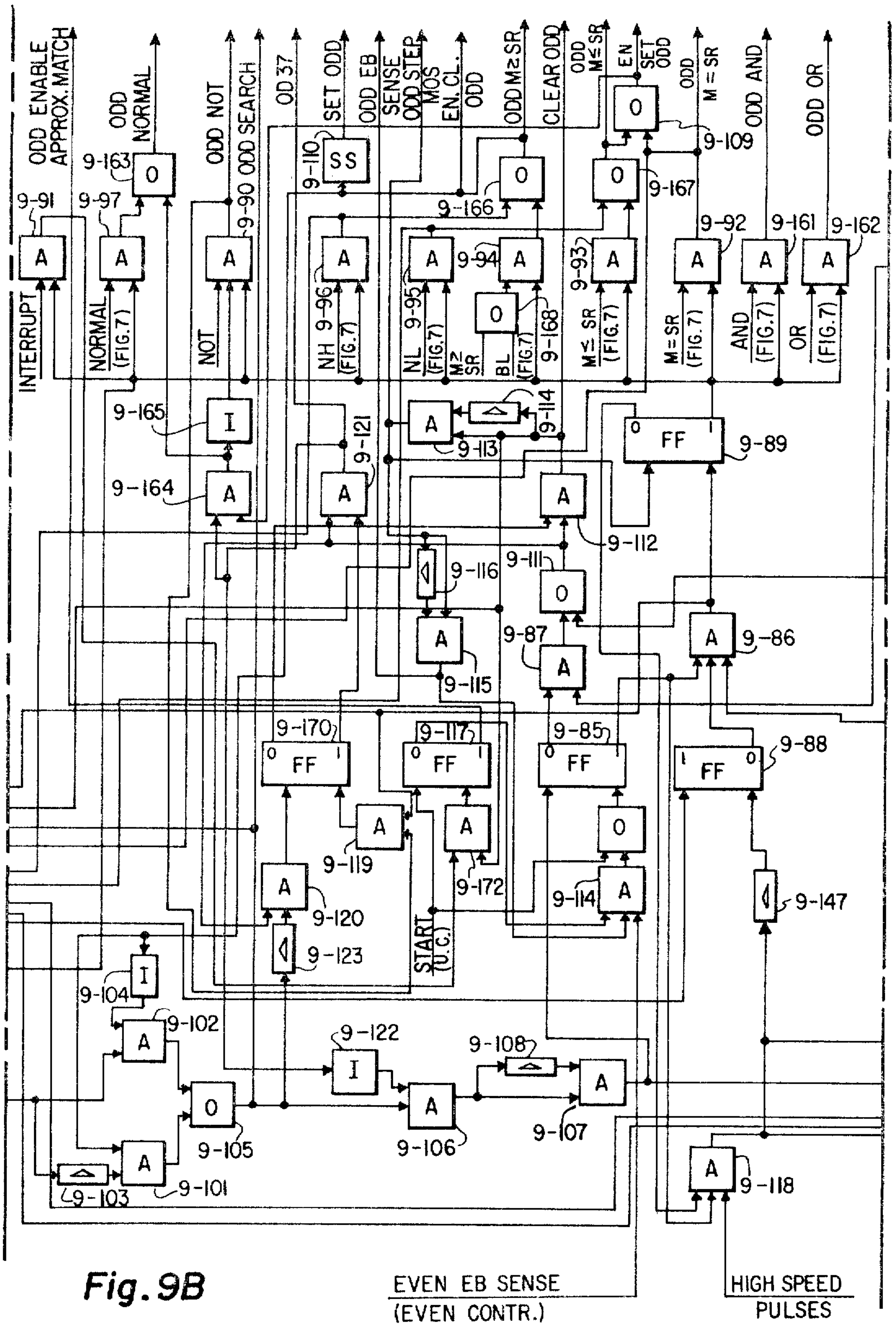
Figure 9C:
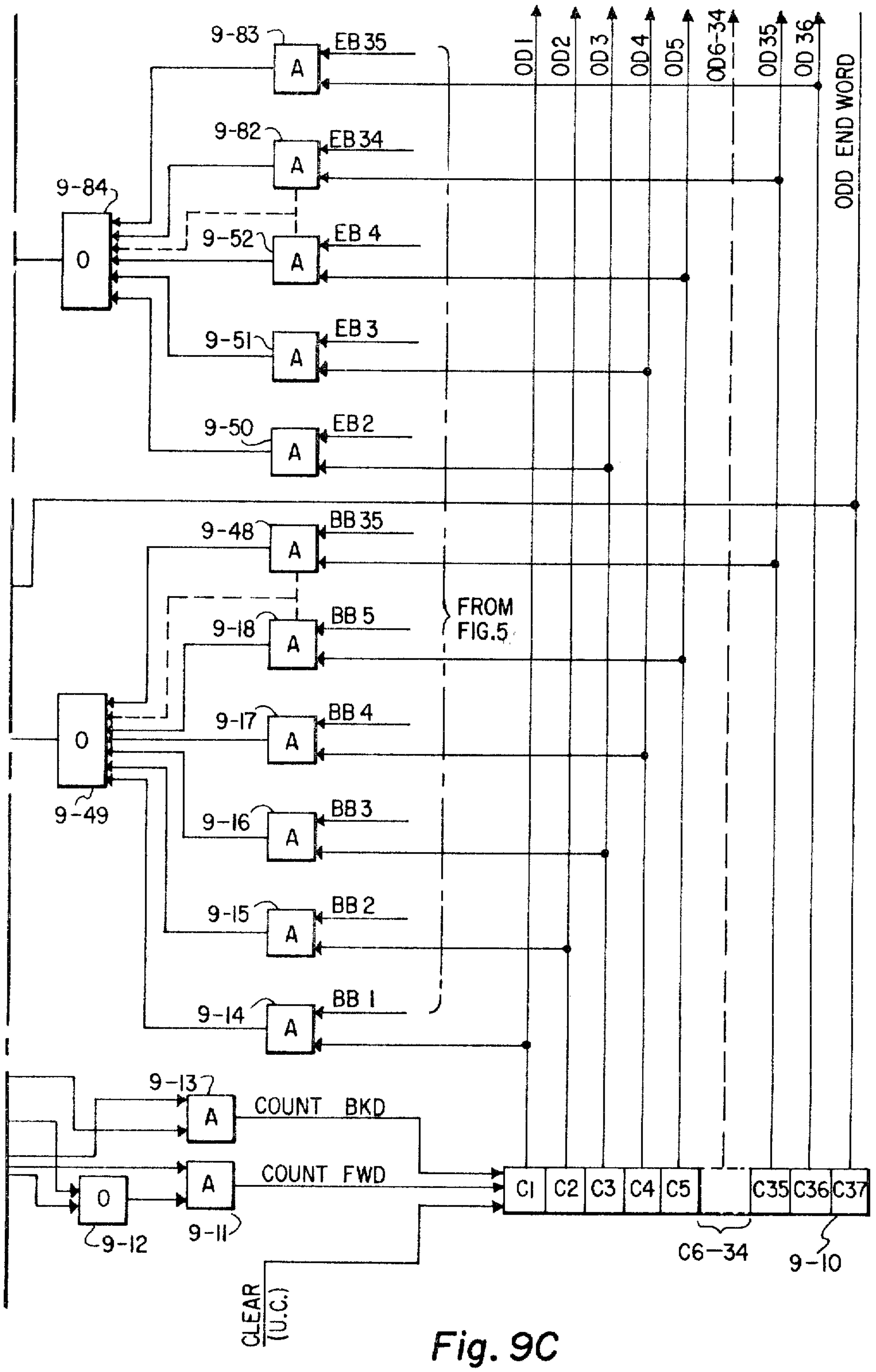
Figure 10:
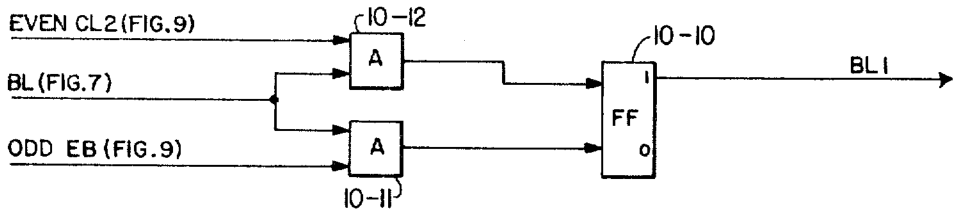
Figure 11:
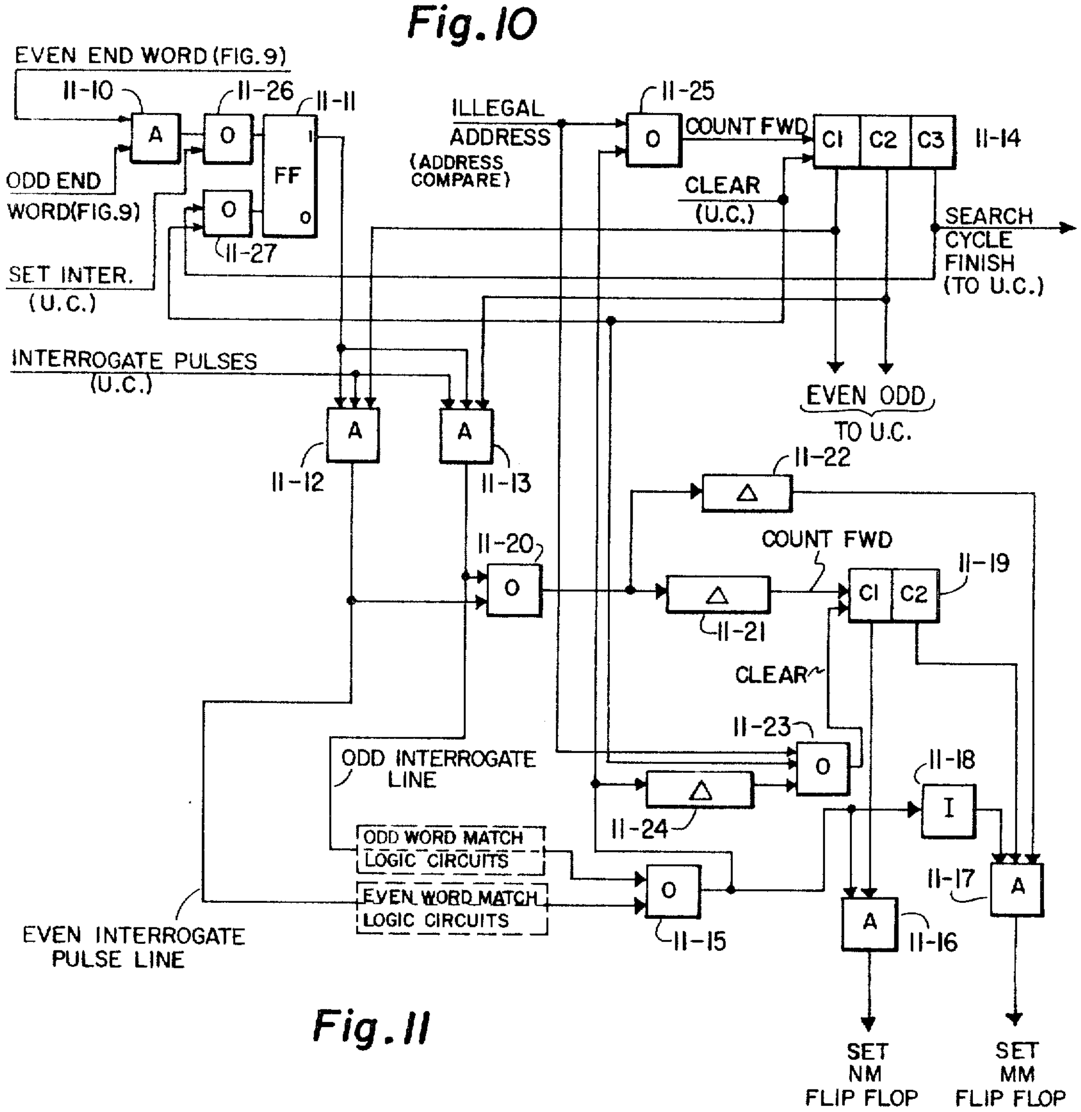

FIGURES 3A, 3B, and 3C show construction details of typical thin film memory elements as well as the mode of operating same;

FIGURE 4 shows details of a word match logic circuit;

FIGURE 5 shows details of the byte translator;

FIGURE 6 shows details of a typical multistage ring counter which can be used in certain control circuits;

FIGURE 7 shows details of the mode of search translator;

FIGURE 8 shows details of the odd column row driver circuits;

FIGURES 9A, 9B and 9C show details of the odd column control circuit;

FIGURE 10 is the circuit operating for a Between Limits search;

FIGURE 11 shows details of the interrogate control unit; and

Figure 12:
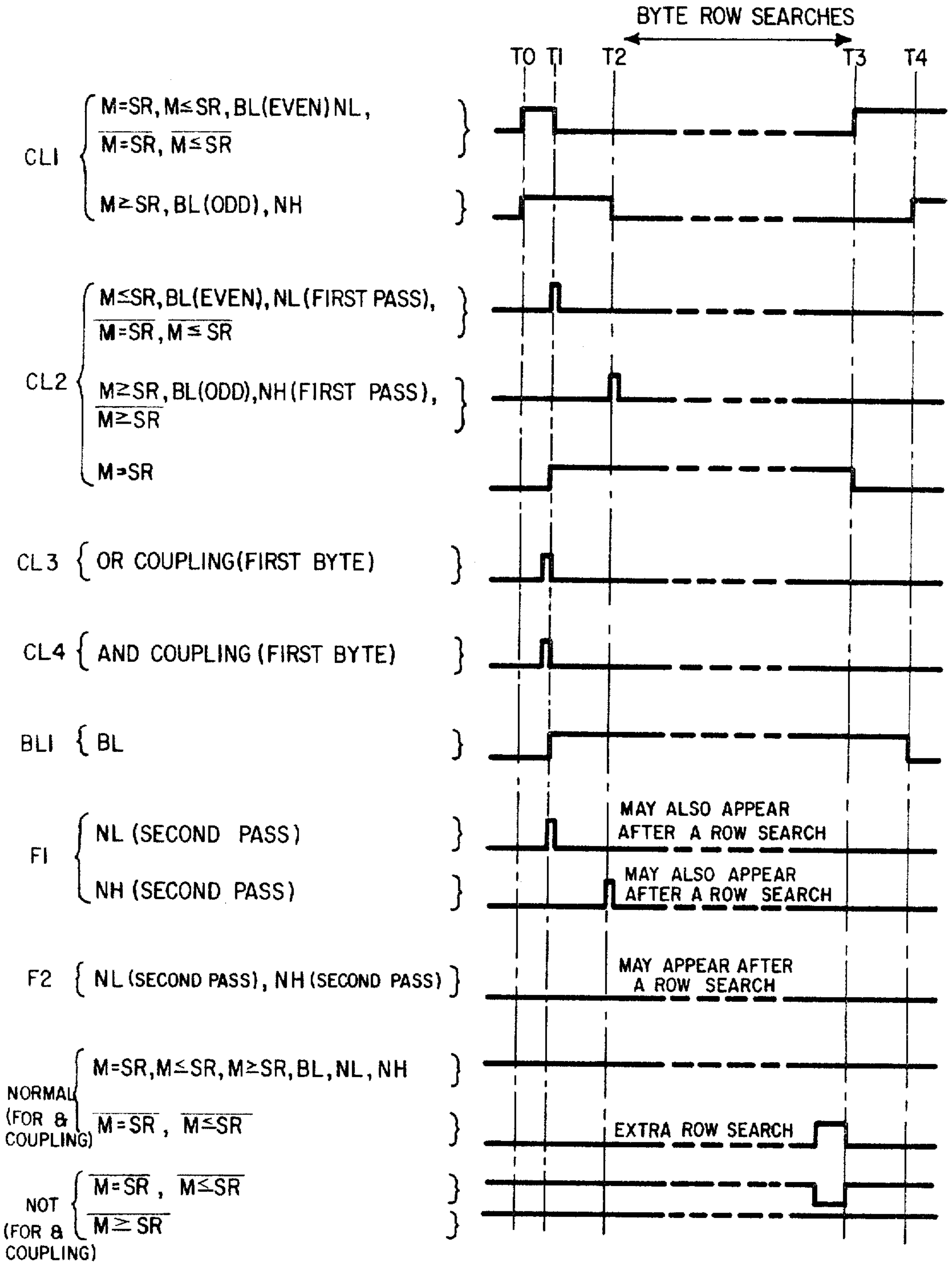

FIGURE 12 is a timing diagram showing both the phase and duration of control signals generated in the system.

GENERAL SYSTEM DESCRIPTION

Figure 1:
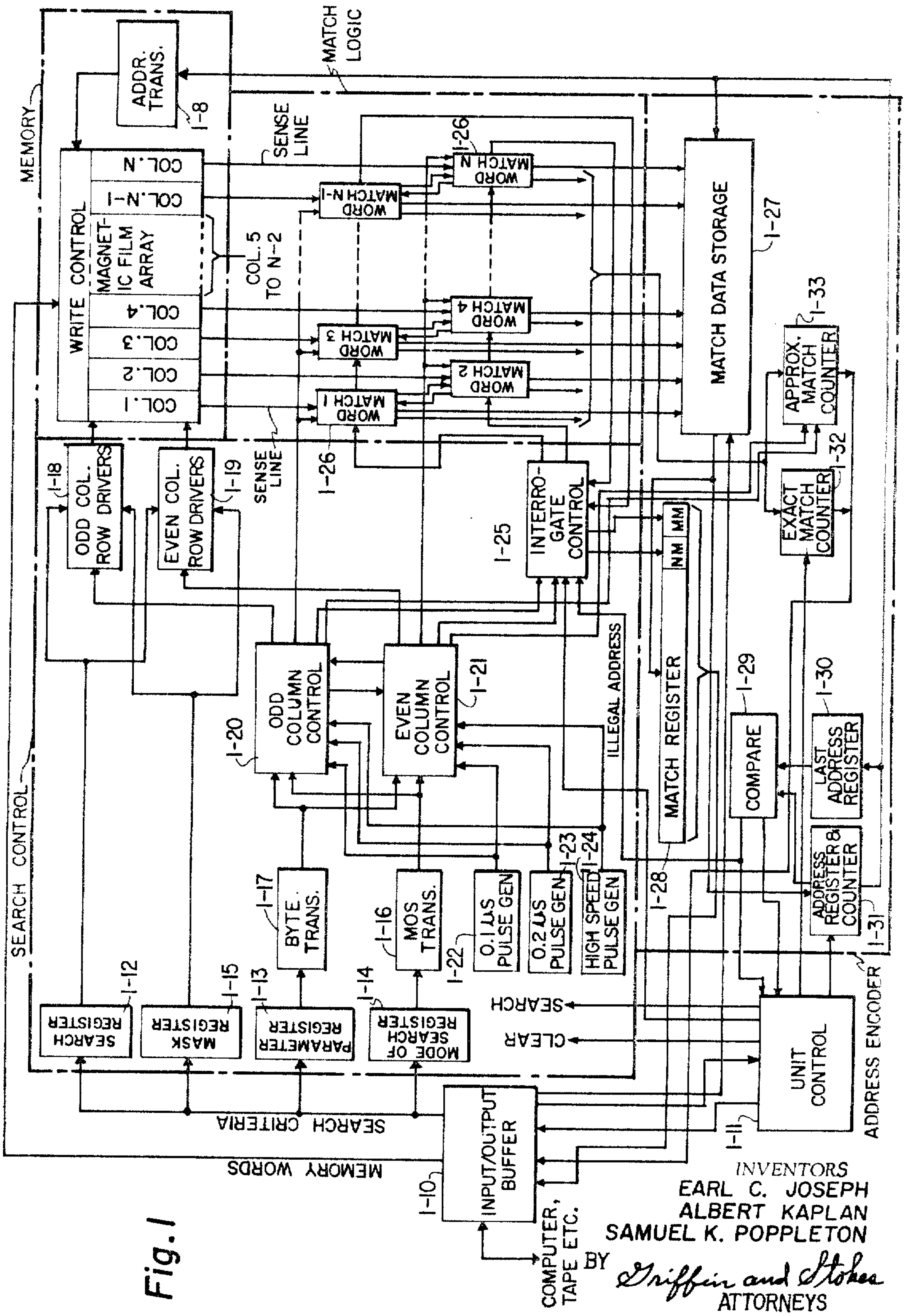
FIGURE 1 is an overall block diagram showing the general system organization and interconnection of its basic units.

FIGURE 1 is a block diagram illustrating the present search memory system. A brief functional description will first be given of each unit, then the system operation and capabilities will be generally described before turning to details of certain units shown in the succeeding figures.

The particular embodiment of the system herein described may be used as a flexible peripheral device with a conventional computer or other data processing system. On the other hand, the search memory system can be employed either as an interface device (i.e. communicating with both a computer and a peripheral device), or can be integrated into computer structure at the time of the main system design. The choice of approach depends primarily upon the application, since if the search memory system is to be used with an existing computer, a peripheral device is most likely the best method rather than redesigning the computer. For any special purpose applications, however, the interface device appears to be the optimum solution. For general purpose applications in a new computer, the search memory can be effectively integrated into the design. Hence, although the system as shown in FIGURE 1 generally may be considered as a peripheral device, its concept should not be limited to this particular environment since data flow and control requirements for any of the three environments are similar. Some form of an Input/Output Buffer 1–10 is provided for communication between the computer, tape, etc. and the search memory system, with said Input/Output Buffer perhaps including an assembly register (not shown) for making up or disassembling a complete computer word which may be of longer length than the words operated upon in the search memory system. If the computer includes units such as a main memory and an accumulator (not shown), the Input/Output Buffer can conveniently be connected to receive both control and data information from said computer main memory, and to place the results of the seaecch into the computer accumulator for either computer use or eventual transfer back to the computer main memory. Details of the Input/Output Buffer, however, do not form a part of the present invention and so it will not be further described or shown.

A Unit Control section 1–11, also not part of the present invention but which would be provided where the search memory system is a peripheral device, generally provides the interpretation of control or program information from the computer and associated storage equipment, as well as the encoding of control messages for the computer. Unit Control, on Load operations, activates the Write Control of the Memory section of the search memory system by directing an Address Encoder section to provide addresses of memory locations in which data words are to be stored from the computer and on which the search is to be conducted. The Memory section in the disclosed embodiment includes an array constructed of magnetic thin film bistable elements which are grouped into a large number N of data word storage columns, each column being capable of holding a multibit binary data word. Unit Control further transfers said data words from the I/O Buffer to the Memory section. Upon completion of the Load operation, Unit Control must send termination signals to the Address ENCODER and Memory sections. In some environments Unit Control must also encode a computer interrupt message in the event of any overflow or illegal operations. On search operations, Unit Control 1–11 must further start operation of a Search Control section and direct thereto data from the I/O Buffer to be used as search criteria. It must also control subsequent I/O Buffer acceptance from the computer of such criteria as specified in search external function commands. This command defines whether search criteria information is to be accepted from the computer as one, two, three, or four word groups per search cycle. A four word group always includes a Search word, a Mode of Search word, a Parameter word, and a Mask word. One, two, or three word groups include any lesser number combinations of these four possibilities. Unit Control 1–11 must also transmit search termination signals to Search Control and must also accept any search completed signal from Search Control for transmission to the computer as an interrupt command.

The Search Control section directs search operations as defined by the search criteria. For example, signals must be sent to the Memory to skip those bits of a Search word not to be included in a search, as defined both by a Parameter word and a Mask word. Signals must also be sent directing each data word bit in Memory to be driven either to the 1 state or the 0 state depending upon the value of the corresponding bit in a Search word. Signals must further be generated to govern the timing of both the driving and sensing of the Memory as defined by the Mode of Search word. Search Control further applies signals to a Match Logic section to clear circuitry therein and also to gate sense information from the Memory. Conditional control elements must also be set depending upon the type of search being conducted. Search Control must further initiate address encoding when memory has been completely searched.

FIGURE 1 also shows generally the logical units making up the novel Search Control section of the system. Functional control over the Memory and the Match Logic sections is maintained jointly by four internal registers: the Search register 1–12 (SR), the Parameter register 1–13 (PR) the Mode of Search register 1–14 (MOS), and the Mask register 1–15 (Mask). The Search register in the disclosed embodiment holds a 36-bit Search word for the duration of a search cycle which is used as information compared with data words in the Memory section. The Parameter register is also a 36-bit register, the content of which is the Parameter word which describes the number, location, and length of bytes (or word portions) in which the search is to be conducted. Thus, PR is used for variable field length designation. The mode Of Search register holds a 37-bit Mode Of Search word used to designate the particular search mode for each byte specified by the Parameter register. One of six different search modes can be designated for a given byte by a given six-bit mode statement comprising part of the MOS word in the MOS register. Six mode statements in the MOS word are associated with the bytes defined by the Parameter register in one-to-one correspondence upon order of appearance, starting from the high order portions of the two registers as will be subsequently described. The Mask register holds a 36-bit Mask word to enable masking within specified bytes. Thus, only a binary 1 in the Mask register permits a search of the corresponding order bit in the Search register.

A Mode Of Search translator 1–16 sequentially decodes each mode statement in the MOS register for subsequent application to other control circuits. A Byte translator 1–17 decodes the content of the Parameter register for specifying the exact location and length of each byte in the Search word.

The rows in all odd numbered columns of Memory section are sequentially driven by an Odd Column Row Driver circuit 1–18, while rows in even numbered columns are sequentially driven by an Even Column Row driver circuit 1–19. For respectively controlling the Odd and Even column row drivers, an Odd Column Control unit 1–20 and an Even Column Control unit 1–21 are provided. These two control units 1–20 and 1–21 further provide signals to circuits in the Match Logic section. For certain search modes, the system scans a byte at a frequency rate of 0.1 $\mu$sec. with pulses provided by a generator 1–22. Other search modes require a pulse scanning rate of 0.2 $\mu$sec. provided by source 1–23. For use in stepping through memory rows between byte locations, a source of even higher speed pulses 1–24 is provided. Search Control further includes an Interrogate Control unit 1–25 which is employed at the end of a search cycle to detect the states of the Word Match Logic circuits.

For each word in the Memory section, the final determination of whether that word is a match is carried out in an associated Word Match logic circuit 1–26 found in the Match Logic section. There is a circuit 1–26 for each of the word storage locations in the Memory which operates from the sense line output of an associated memory array sense amplifier. Adjacent pairs of odd and even column circuits 1–26 are coupled together in a manner to be described.

The Address Encoder section receives a matching indicating output from any one of the World Match Logic circuits 1–26 to provide the address of the column in Memory in which the match was obtained. This function may be conveniently provided by a magnetic core or film storage matrix 1–27 (Match Data Storage) which, when pulsed on any one of its input lines from Match Logic, generates a unique prestored match address number identifying the column location in the film array which gave the match condition. This match address number is sent to an Address Register and Counter 1–31 where it is compared by circuit 1–29 with a number in a Last Address register 1–30. Said Last Address register number is indicative of the highest numbered word column in the film array to which a Memory data word transfer was made when loading said Memory section prior to the search cycle operation. Thus, if the match address is greater than said last address, an illegal signal is generated for terminating or changing the interrogate portion of the search cycle, and also for informing Unit Control of an error. A legal match address in the Address Register 1–31 can then be used in reloading its identified Memory word column with a new data word upon which will occur a subsequent search. If desired, the match address could also be directed to the utilization circuits via the Input/Output Buffer. The Address Counter 1–31 also, during block data information loading, generates memory column addresses in sequence which are applied to the Memory Write control via an Address Translator 1–8. Consequently, the number in the Last Address register may be taken from the Address Counter at the conclusion of the block load operation.

The Match Data Storage unit 1–27, besides containing an address identifying number for each Memory word column, can also hold a plurality of match date words each associated with a different word stored in the Memory array. When a match is indicated by any one of the Word Match Logic circuits 1–26, said associated match data word from Match Data Storage is directed to a Match Register 1–28 for eventual transfer to the computer or other utilization means via the Input/Output Buffer. The nature of said match data word can be varied according to the use to which it is put. It can be identical to its associated data word in Memory, or it can be different information therefrom. For this reason, provision is also made to load the Match Data Storage unit with information from the computer, etc. via the I/O Buffer unit. The Match Register 1–28 further contains a No Match (NM) stage and a Multiple Match (MM) stage each of which is selectively set by Interrogate Control 1–25 to provide a correlation of match data words and/or match addresses. The No Match stage is set to binary 1 if there have been no memory data words which match the Search word according to the search criterion specified by the Mode Of Search word. The Multiple Match stage, on the other hand, is used to identify each block of match data words resulting from multiple matches occurring during any given search cycle. This MM stage is set to 0 for the first match data word in any given block, and to 1 for all succeeding match data words in the same block.

The Address Encoder section is also shown to hold a slow speed Exact Match Counter unit 1–32 and a high speed Approximate Match Counter unit 1–33. The Exact Match Counter is used for statistical analysis and is activated by an appropriate signal from Unit Control to sequentially scan each of the Word Match Logic circuits 1–26 in order to ascertain and count the exact number of those indicating a match condition. Details of the Exact Match Counter unit may therefore include a plurality of gates (one connected to each Word Match Logic circuit 1–26) whose outputs are connected in common to a binary pulse counter. These gates are opened and closed sequentially by scanning means (such as a ring counter) so as to feed a pulse to the pulse counter for each match indicating Word Match Logic circuit 1–26. The content of the pulse counter may then be directed to the utilization means via I/O Buffer 1–10. On the other hand, the Approximate Match Counter unit 1–33 is activated whenever a mode statement in the Mode of Search word specifies an interrupt operation at the conclusion of a byte interrogation. This unit 1–33 quickly generates an approximate number ($\pm 10\%$) of the matches indicated by the Word Match Logic circuits 1–26. One way of performing this function is to build unit 1–33 with an analog summing network having inputs from all of said circuits 1–26 such that a particular output voltage level is produced therefrom according to the number of match indications. An analog-to-digital converter can then be connected to the summing network in order to provide a digital indication which is then transferrable to the I/O Buffer.

BASIC SEARCH MODES

The basic search modes possible for the present system on any Search word byte will now be briefly described.

*Exact or equality search.*—The system is capable of comparing any Search word byte serially bit-by-bit (beginning with the highest binary order of the byte) with correspondingly located bytes of all data words in the film memory simultaneously. The searched bits of a data word must be identical both in value and binary order position, to the Search word bits before a match condition can be indicated.

*Less than or equal to search.*—For this search a match condition exists if the byte of a Memory data word is numerically less than or equal to the corresponding byte of the Search word.

*Greater than or equal to search.*—If the byte in a memory data word is found to be numerically greater than or equal to the corresponding byte in the Search word, a match is indicated.

*Between limits search.*—Three methods are provided for between limits determination. The first method requires two programmed search cycle operations. In the first search cycle, the Search register contains a Search word a byte of which represents the lower limit of a range of values, and a Greater Than-or-Equal to Search is specified. A programmed control inhibits the match address generation and the clearing of the match logic at the conclusion of this first search cycle. The second search cycle is then a conventional Less Than-or-Equal To Search, with the Search word byte representing the upper limit of said range of values. This method has the advantage of efficient use of storage, but it is slower than the other quantitative searches.

The second method employs a special Between Limits mode of search and involves the use as a single unit of a pair of adjacent data words in the film Memory. One byte of a Memory data word is the upper limit of the range, and the corresponding byte of the other Memory data word the lower limit. In the disclosed embodiment, the selected word byte in each even numbered Memory column becomes the lower limit and the corresponding byte in the next lower adjacent odd numbered Memory column becomes the upper limit. The special Between Limits search determines if the magnitude of the Search word byte in the Search register falls within the limits specified by said pair of Memory data words. When a match is found, only the even match address of the Memory data word pair is encoded. This second method of search has the advantage of speed although ti is not as efficient in Memory section storage as the first. If the byte in the Search register is not within the limits described by the bytes of the word pairs, then neither of the words containing the limits can be a match regardless of the outcome of comparisons made on other bytes of the words. If the byte in the Search register is within the limits described in the word pair, then match determination is made for each of the two words independently and is based entirely on the outcome of comparisons (other than between limits) made on other bytes of these words.

The third method of a between limits determination is a byproduct of the standard Greater Than and Less Than searches. If, with a 36-bit Search word, six bytes of six bits each were specified by the Parameter word, and a data word in the film array contained the respective quantities A, B, C, D, E, and F in six corresponding byte locations, the Search register could be loaded with a Search word having the redundant pattern X, X, Y, Y, Z, Z, with a mixed search of alternate Less Than-or-Equal To, and Greater Than-or-Equal To modes on the six bytes initiated. A match will result if $$A \leqslant X \leqslant B$$
$$C \leqslant Y \leqslant D$$
$$E \leqslant Z \leqslant F$$

The time required for this third method is the same as the time required for the second method of between limits determination; however, it requires fewer data transmissions from the computer.

*Next higher and next lower searches.*—For the Next Higher Search mode, a selected Search word byte is compared against corresponding bytes in all of the Memory data words for the purpose of finding those data word bytes equal to, or are the next highest in value to the selected Search word byte. For example, if said selected Search word byte has a value 5 when compared with five Memory data word bytes of values 2, 3, 6, 7, and 9, a match indication is only generated for the Memory column holding the data byte value 6. The Next Lower search mode is similar except that match indications are generated only for Memory columns having data bytes equal or next lowest in value to the Search word byte, e.g., only data byte value 3 in the example above.

*Not searches.*—Any of the Equality, Greater Than-or-Equal and Less Than-or-Equal searches can be conducted with logical negation, i.e., Not Equal, Not Greater Than-or-Equal, etc., thus immensely increasing the flexibility of the equipment.

The above discussion of basic search modes and their logical negations has been confined to the case of a search on one or more bytes of a word during a single pass through said word. A search cycle match indication here normally results only for each of those Memory data words whose bytes completely satisfy the differing search modes applied to them.

DETAILED FIGURE DESCRIPTION

FIGURE 2 illustrates in diagrammatic form the organization of only the Odd numbered columns of the magnetic thin film array used as data word storage in the Memory section. The organization of the even numbered columns 2, 4 . . . N in memory is identical, except that a different set of row windings labelled Even Row 1, Even Row 2, Even Row 3, etc. would be employed. The array or matrix is comprised of rows and columns of bistable storage elements 2–10. Thereare $N/2$ odd columns (for an N word memory) and each word column in the disclosed embodiment contains 37 elements (37 rows) adapted to hold a 37-bit data word placed therein. A separate row winding 2–11 is inductively coupled with each corresponding row element in all odd columns. A separate bidirectional driver circuit (shown in FIGURE 8) is provided for each row winding 2–11 which is controlled by the content of the Search register. Each column location has a sense windnig 2–12 which terminates in a sense amplifier 2–13 whose output in turn is labelled Sense Line 1, 3, 5, etc. and applied to a particular one of the World Match Logic circuits.

The search memory matrix is preferably, but not necessarily, constructed of non-destructive readout thin film elements two of which are shown in exploded form in FIGURE 3A. These are typical Bicore elements each consisting of a high coercivity storage or memory magnetic thin film 3–10 inductively coupled with a low coercivity readout magnetic thin film 3–12. The films are fabricated in separate layers, one on top of the other on a glass substrate. Each said film has at least one preferred (easy) magnetic axis (PMA) along which can lie remanent flux in either direction so as to be bistable. The PMA's of said memory and readout films can be parallel to each other. Each film, particularly film 3–12, has a substantially square hysteresis loop. Characteristics of the films are such that the external magnetic field of the memory film 3–10 controls the direction of magnetization of the readout film 3–12. Writing of a bit into film 3–10 is accomplished by applying a sufficiently large magnetic field to magnetize the film 3–10 in the direction of the said applied field in either a "1" direction or a "0" direction. When the write field is removed, the external field created by remanent flux in film 3–10 switches the readout film 3–12 to the opposite direction; i.e., causes the film 3–12 flux vector to lie in the indicated direction along its PMA. Reading or interrogation of a Bicore element is accomplished by applying to the readout film 3–12 a magnetic field which is approximately 25 percent of the previously applied write field. When the direction of this readout field in film 3–12 is opposite to the direction of storage film 3–10 field, the field of said storage film is overcome and the flux in readout film 3–12 is switched to the opposite direction along its PMA, but the storage film flux direction is not disturbed. Upon removal of the read field, the external field of the film 3–10 switches the readout film flux back to original direction along the PMA that it had before the read field was applied. If the read field is applied to film 3–12 in the same direction as applied the film 3–10 field the readout film flux does not switch but is driven further into saturation, i.e., there is no change in film 3–12 flux. It might be here mentioned that an acceptable memory array can also be constructed using the well known ferromagnetic toroid, and other storage elements would be permissible if capable of receiving and producing signals with the polarities as set forth below.

FIGURE 3B shows the actual orientation of the row drive winding 2–11 and the column or word sense winding 2–12 for any one of the thin film elements 2–10 in FIGURE 2. Both windings are actually parallel at the region of the films 3–10 and 3–12, but are perpendicular to the PMA of each film. In the write operation, a bipolar pulse is generated in the sense winding and a smaller amplitude pulse, which brackets the sense winding pulse in time, is generated in the row winding by the Memory Write control. The polarity of the row current determines the final direction of magnetization of the film 3–10 in the selected word. With this type of word-organized or line selection writing operation, the field used to switch the storage films 3–10 is about three times as great as the field from the row current which alone cannot switch the storage films.

As described previously, when a read field, generated by a current in the row line, is applied to a Bicore element, the readout film flux switches from one direction along its PMA to the opposite direction if the direction of the read field is opposite to the direction of the memory film field. If the direction of the read field is the same as the direction of the storage film field, the readout film is not switched. The row winding drive generators may be designed to produce a pulse in either direction in the row winding so that the read field can be selectively applied in either direction according to the value of a bit in the Search word, as will be subsequently described. Thus, there are four combinations of the two directions of storage film field and the two directions of the read field. When the readout film 3–12 is switched while it is in the "1" state, the polarity of the induced output signal voltage on the sense winding 2–12 is opposite to the polarity of induced signal when the film 3–12 is switched while it is in the "0" state. Opposite polarities of row current are, of course, required to switch the film for each of its two states.

If flux in readout film 3–12 switches to a different direction, when a read field is applied, it reswitches to its original direction when the read field is removed. An output voltage pulse of one polarity is produced on the sense winding during the switch time and a pulse of the opposite polarity during the reswitch time. An assumed relationship of the information stored in film 3–10, the row read current polarity, and induced output signal polarity are tabulated in the table below, and shown in FIGURE 3C.

| Stored Information (Film 3–10) | Row Current Polarity (Search register) | Output Signal Switch (Sense Winding) | Reswitch |
|---|---|---|---|
| 1 | + | 0 | 0 |
| 1 | − | −V | +V |
| 0 | + | +V | −V |
| 0 | − | 0 | 0 |

Referring to FIGURE 2, the disclosed system is designed so that a 1 bit in any given position in the Search register results in positive current on the corresponding row bit line, while a 0 bit therein results in a negative row current. The coupling between each sense winding and the memory element is such that the field generated by a positive row current pulse (a 1 in the Search register) is in the same direction as the field produced by a stored 1 in film 3–10. Thus, little or no output is induced on the sense winding because the film 3–12 flux is not changed in direction. On the other hand, a positive row current and a stored 0 in film 3–10 result in a fairly large positive induced signal on the sense winding as caused by a switch in film 3–12 flux. Of course, when said positive row current is terminated, the reswitching of film 3–12 flux produces a large negative induced voltage on the sense winding. Similarly, a 0 bit in the Search register produces negative row current which results in a little or no signal for a stored 0 bit in film 3–10, and a large negative induced signal for a stored 1 bit therein. In the latter case, a large positive signal is induced upon reswitch of films 3–12 flux.

To illustrate the operation of FIGURE 2, consider now the following example. Assume that the Search register contains bits 0101 in a Search word, commencing in row 1 thereof which will be sequentially scanned in order to generate current pulses of appropriate polarity at different times in row windings 1, 2, 3 and 4 as in this order. Further assume that Memory columns 1, 3, 5, and 7 contain bit values in rows 1 through 4 indicated by the numbers in parenthesis next to each element 2–10. It is seen that the selected SR bits are identical to the four selected bits in column 3, or word 3 as it will be hereafter designated. Bit one of the Search register is a "0," and when scanned first, produces a negative current pulse on the row 1 winding. Memory words 5 and 7 contain "1's" in that bit position and first negative and then positive signals result on their sense windings. Bit two of the Search register is a "1" and produces a positive current pulse on the row 2 winding, but since all four words 1, 3, 5, and 7 have a "1" in that bit position, no outputs are produced on the sense windings. Bit three of the Search register is a "0" which, when scanned third in order, produces outputs on only the word 7 sense winding. Finally, bit four of the Search register is a "1," and the positive current pulse in row winding 4 produces outputs on the sense windings of words 1, 5, and 7. Notice that word 3, which matches the selected search register bits, has had no outputs whatsoever on its sense winding, while the other words 1, 5, and 7 have had at least one signal. Thus, the matching word can be detected.

To perform a Greater Than, or Less Than search, the above-described bit serial mode of operation is essential. The basic algorithm is as follows: the highest order bit in which a Memory word differs from the Search register determines whether that Memory word is greater or less than the content of the Search register. If this bit in the search register is a "1," then the Memory word is less. If it is a 0, then the Memory word is greater. This algorithm is easily implemented with the disclosed organization because of the previously described bipolar output from each memory element 2–10. The memory array is interrogated bit-serially, starting with the highest order bit, and each Word Match logic circuit is implemented on each sense line to interpret the first induced signal and to ignore all successive induced signals. With the same bit values shown in FIGURE 2, it is seen that bit one of the search register is a "0" such that the negative row 1 current pulse produces first a negative and then a positive signal on the sense winding of words 5 and 7. These negative signals are interpreted by the column 5 and 7 Word Match Logic circuits to mean "greater than," and all further outputs from words 5 and 7 are ignored. Bit two of the Search Register produces no sense winding outputs. Bit three of the Search register produces first a negative and then a positive output on the word 7 sense line, but this is ignored. Finally bit four of the Search register produces positive then negative outputs for words 1, 5, and 7. The signals on the words 5 and 7 are ignored. However, the positive signal on the word 1 sense winding is interpreted as "less than," and word 1 is also set to thereafter ignore all successive signals. Thus, in one pass words 1, 3, 5, and 7 in the memory have been quantitatively compared with the word in the search register.

In the following FIGURES 4 through 11 to be described, various symbols are employed to represent logical and other components whose details are well known in the art. The letters "A" and "O" enclosed in rectangular boxes respectively stand for logical AND and OR gates, the former generating a high or positive output signal when all inputs are high, and the latter generating a high output signal when any one or more input is high. The Greek letter "Δ" represents a delay circuit or line, while the letter "D" a drive circuit usually employed to produce current in one direction or the other in a memory array winding. "I" is an inverter circuit for reversing the polarity of an input signal thereto. The letters "FF" enclosed by a rectangle indicate a bistable single bit storage element such as a flip-flop which, when in its 1 state, produces a high signal from its indicated 1 output terminal and a low signal from its indicated 0 output, and vice versa when in its 0 state. Each of said two flip-flop states can be produced by a high signal applied to that input terminal leading to the respective indicated 1 or 0, output terminal side. Each of the control word storage registers, such as SR, PR, MOS, and Mask, can comprise a plurality of said flip-flop elements one for each bit to be stored. A conductor taken from the 1 output terminal of any said register flip-flop stage is identified both by the register name or abbreviation and the stage location, e.g., SR1, PR1, MOS1, Mask 1; while a conductor from the 0 output terminal of a register stage is further identified by a bar (negation) thereover, e.g., $\overline{\mathbf{SR1}}$, $\overline{\mathbf{PR1}}$, etc. Thus, for example, a 0 bit in stage 1 of the Search register makes low the SR1 conductor and makes high the $\overline{\mathbf{SR1}}$ conductor, and vice versa for a 1 bit stored therein.

FIGURE 4 shows logic details of any one of the Word Match Logic circuits individually connected to a sense line coming from the film memory array. For the purposes of this description, this circuit in FIGURE 4 is assumed to be connected with Memory column 1, but just as easily could be the circuit connected to any other odd column, or for that matter, the Match circuit for any even Memory column. All input control signals to the FIGURE 4 circuit have the prefix Odd applied to them showing that they are derived from the Odd Column control unit. For any even column Word Match Logic Circuit, the signals there applied would be prefaced by the word Even which indicates their source to be the Even Column control unit. The following description refers to each FIGURE 4 signal generally without reference to the Odd prefix except for the Between Limits mode of search when the Odd and Even Memory columns are each driven in a different way.

A plurality of A gates 4–10 through 4–15 are employed to receive certain control signals, as well as both true and inverted (complement) signals from the word or column sense line associated with Memory column 1. A4–10 and A4–11 are enabled by a high $M=SR$ signal for responding to either signal polarity on the sense line. A4–11 passes a positive sense line signal to O4–16, while A4–10 passes an inverted negative sense line signal from I4–17 to said O4–16. If there is no active voltage signal induced on the sense line when a bit in the Memory column 1 is searched, then neither A4–10 nor A4–11 produces a signal. The output from O4–16 in turn is applied to O4–18 so that during an Equality search, a mismatch between the search register bit and the Memory column bit (i.e. nonidentity) causes a high output from O4–18, whereas a match (identity) causes no such output.

A gates 4–12 and 4–13 are only enabled when a search is made for a Memory word byte less than or equal to the Search register word byte. This search mode is indicated by the application of a high signal $M \leqslant SR$ applied in common to these two A gates. A4–12 produces an output at this time only if the sense line signal is negative, thus positive (by action of I4–17 to the input of A4–12. The output of A4–12 is connected to O4–18 to indicate a mismatch, i.e. that the Memory word bit has a value of 1 whereas the search register bit has a value of 0 to thus cause a negative sense line signal during the switch time of the Memory. On the other hand, a positive sense line signal occurring during the Memory switch time indicates that the Search register bit is 1 while the Memory bit is 0, thus meeting the search criterion of $M \leqslant SR$. A4–13 responds to said positive sense line signal and applies its output to the input of O4–19.

For a Greater Than or Equal search mode, A gates 4–14 and 4–15 are enabled by a high $M \geqq SR$ signal applied thereto. The significant numerical relationship between the Search register bit and Memory bit is indicated during the reswitch time of Memory whereby it will be remembered that a positive signal appears on the sense line if a Memory bit of value 1 is driven by a search register bit of value 0. A4–15 consequently passes this positive going signal to O4–19 to indicate a match. On the other hand, a negative sense line signal during the reswitch time of the Memory indicates a mismatch, i.e. a Memory bit of 0 and a Search register bit of 1. This negative sense line signal is inverted by I4–17 so as to energize A4–14 and apply a signal to O4–18.

In brief summary of the logic so far described, it will therefore be seen that for either a $M \leqq SR$ or $M \geqq SR$ signal, an output from O4–19 indicates a match between correspondingly located Search register and Memory bits, as far as their relative magnitude is concerned. However, for any of the three search modes (Equal, Less Than or Equal, and Greater Than or Equal) O4–19 will not produce a high output when there is actual identity between the two bits. On the other hand, O4–18 definitely produces an output whenever there is a mismatch for any one of said three modes. That is to say, if an Equality search is being conducted, any inequality or non-identity between a Search register bit and a Memory bit causes an output from O4–18. O4–18 also produces an output if the Memory bit is greater than the SR bit during a $M \leqq SR$ search, or if the Memory bit is less than the SR bit for a $M \geqq SR$ search. For a $M=SR$ and a $M \leqq SR$ search, signals are generated from O4–18 and O4–19 only during the switch drive time of the Memory, whereas signals are generated therefrom only during the subsequent reswitch Memory time in the case of a $M \geqq SR$ search.

For all $M \geqq SR$, $M \leqq SR$, $M=SR$, Between Limits and Next Higher and Next Lower searches, the output from O4–18 appears via O4–20 on the Fail line connected to the remaining part of the Word Match Logic circuit. The output from O4–19 is also communicated directly to the output of O4–21 for any one of these same six basic search modes. However, for any Not search, i.e. $\overline{M=SR}$, $\overline{M \leqq SR}$, and $\overline{M \geqq SR}$, the outputs from O4–18 and O4–19 must be interchanged so that O4–21 instead receives the output from O4–18 while O4–20 receives the output from O4–19. This function is provided by A gates 4–22, 4–23, 4–24, and 4–25. For this normal condition, a high Normal signal is applied to permit A4–22 and A4–25 to directly communicate the outputs from O4–19 and O4–18 to respective gates O4–21 and O4–20. For any Not search, the Normal signal is low and a high Not signal is instead applied to A4–23 and A4–24 for interchanging said signals on the Fail and Pass lines as has been described above.

The Fail and Pass lines from respective O gates 4–20 and 4–21 are applied to logic circuits next to be described. In particular, an Enable flip-flop 4–26 is set to 0 by a high output from O4–21 via an input O gate 4–27. A high CL1 signal applied to O4–27 is also used to set FF4–26 to 0. Two different high signals are individually employed to set FF4–26 to its 1 state via an input O gate 4–28. One is labelled CL2, while the other is from the output of A4–29 which is only enabled or conditioned during a Next Higher or Next Lower search by the selective application of a high signal F1 thereto. The function of this gate will be discussed in subsequent paragraphs. When FF4–26 is set to 1, it applies a high signal to each of the A gates 4–30, 4–31, and 4–32. Furthermore, a high signal from the 1 output terminal of FF4–26 is labelled E1 which is used in the FIGURE 9 control circuits later to be described. For any Word Match Logic circuit in a Memory column other than column 1, the signal from the high 1 side of its FF4–26 flip-flop would be labelled E together with a digit indicating the column in which it is found, e.g., E2, E3, E4, etc. On the other hand, if FF4–26 is set in its 0 condition, then a high signal is applied to one input of A4–33 later to be described. A4–30 further requires a positive input from O4–20 and also, the presence of a high signal BL1 which is only applied during a Between Limits mode of search. The output of A4–30 in any odd numbered column match circuit is connected to an O gate labelled 4–34 which is in the different Word Match Logic circuit connected with the adjacent next higher numbered even Memory column, whereas the gate A4–30 in any even numbered column match circuit is connected to an O gate 4–34 in the adjacent next lower numbered odd column match circuit. A4–31 requires a high signal from O4–20 as well as a high signal labelled And in order to produce a high output therefrom, which in turn is applied to the O4–34 gate in its own match circuit. Likewise, A4–33 further requires the presence of a high signal F2 to apply a high input also to the O4–34 of its own match circuit. FIGURE 4 further shows that O4–34 receives said input from the A4–30 gate of the next higher numbered even column match circuit, or conversely, from the next lower number odd column match circuit where FIGURE 4 itself represents an even column match circuit.

The output from O4–34 is used to clear to 0 a Match flip-flop 4–35. This will indicate that a mismatch has been found in the particular Memory word in which a search is conducted. A second O gate 4–36 is employed to set the Match flip-flop 4–35 to 1. O4–36 in turn receives an output from A4–32 which requires both an output from O4–20 and the presence of a signal labelled OR in order to generate an output therefrom. Also applied to O4–36 can be a control signal CL4 used for initially setting FF4–35. When FF4–35 is in its 1 state at the end of a search through a byte, this indicates that the data word held in the Memory column agrees with the Search word byte according to the mode of search conducted; i.e. is a match. An output conductor from the 1 output terminal thereof is used to convey a high signal from FF4–35 to each of the Exact Match and Approximate Match counters. Two A gates 4–37 and 4–38 are also employed to respectively automatically reset the Match flip-flop 4–35 to its binary 0 value upon interrogation thereof at the end of the search cycle, and to pass along an Interrogate signal to the next higher odd column in the event that FF4–35 is already in its binary 0 condition. A4–37 has one input from the binary 1 output terminal of FF4–35 and will thus be enabled, upon pulsing with an Interrogate pulse, to pass an output along an individual conductor to the Match Data Storage unit to generate the match data such as the address of each Memory column in which a match is found. Any output from A4–37 is also slightly delayed by a delay line 4–39, whose output in turn is applied to O4–34 to clear FF4–35 shortly after a pulse has been passed to Match Data Storage. This provides an automatic reset of FF4–35 from a Match to a No Match condition. On the other hand, if FF4–35 is already in its 0 condition at the time that an Interrogate pulse is applied to the match column, then A4–38 is enabled to pass this Interrogate pulse to gates 4–37 and 4–38 of the next higher odd column, and no pulse is sent to the Match Data Storage unit.

To describe the entire operation of FIGURE 4 for any of the search modes, reference will now be made to Table 1 below and also to FIGURE 12 which shows the relative timing of certain control signals applied to the Word Match Logic circuits.

TABLE 1

| Row | SW Byte | MW Bytes | | |
|---|---|---|---|---|
| | | (1) | (2) | (3) |
| n | 1 | 1 | 1 | 1 |
| n+1 | 0 | 0 | 0 | 0 |
| n+2 | 0 | 0 | 0 | 1 |
| n+3 | 1 | 1 | 0 | 0 |
| n+4 | 1 | 1 | 1 | 0 |
| n+5 | 0 | 0 | 1 | 1 |

Table 1 above assumes that a given Search word byte in the Search register contains a binary value 100110 (decimal 38) the bits of which occupy any rows $n$ through $n+5$ holding the highest binary order $2^5$ through the lowest order $2^0$ bits, respectively, of said byte. Three examples of Memory word bytes are also given in Table 1, labelled (1), (2), and (3). For the purpose of this discussion each Memory word byte can be considered as occupying the same rows in different Memory odd numbered columns, or alternatively, as occupying different rows of the same memory odd numbered column under the assumption that the same Search word byte is repeated three times in the Search register. This example also applies to words held in even numbered columns of Memory, since the Word Match Logic circuits therefor are identical to FIGURE 4 except for the origin of their control signals which in all search modes, except Between Limits, appear at the same times as do the Odd prefixed signals. Consider first the memory word byte (1) having the binary digits 100110 (decimal 38). Assume that a $M=SR$ search mode is required by the MOS register, with And logical coupling between search results of different bytes in the same word. In FIGURE 4, the $M=SR$ signal is applied to A gates 4–10 and 4–11, and a Normal signal is applied to A gates 4–22 and 4–25. These signals are continuous for the entire byte search time. To commence the search, row $n$ of the Memory array is first driven for a binary 1 value because of the binary 1 held in the corresponding row $n$ of the search register. In FIGURE 12, time T0 is indicative of the initiation of drive current being applied to the indicated row $n$. However, due to circuit delays caused by line parameters, any significant voltage signal which might be induced on the sense line is assumed not to appear at the FIGURE 4 circuit until approximately time T1. At time T0, a CL1 signal is applied which lasts until time T1. This CL1 signal maintains FF4–26 in its clear (or binary 0) condition regardless of any possible noise signal being applied to O4–28 during this period. Just prior to time T1, a short CL4 pulse is applied to O4–36 to set FF4–35 to 1 if the Memory word byte under discussion is the first byte to be searched in the Memory word. At T1 or shortly thereafter, the potential condition on the sense line from Memory is then significant of the result of the row $n$ search. Signal CL1 is terminated and signal CL2 commences at this time to set FF4–26 to its binary 1 condition. For an $M=SR$ search, signal CL2 remains on for the entire time that the rows $n$ through $n+5$ are searched in sequence, finally being terminated at time T3 when CL1 comes on once again while the row drivers are turned off. Consequently, the continuous presence of signal CL2 maintains FF4–26 in its 1 condition regardless of any spurious inputs applied to its clear or 0 input terminal via O4–27.

Since memory byte (1) in Table 1 is now being considered, there will be no active voltage induced on the sense line at time T1 because of perfect identity between the Search register 1 bit and the Memory word 1 bit held in row $n$. Consequently, O4–18 does not produce an output, which in turn means that no output appears from O4–20. Since O4–19, and consequently O4–21, never can have outputs for an $M=SR$ search (with And logical coupling) there is no output from O4–27. Without an output from O4–20, there will obviously be no output from A4–31 so that FF4–35 remains in its 1 condition. Each of the remaining Memory rows $n+1$ through $n+5$ is then driven in sequence with a current polarity according to the corresponding Search register bit. In the case of Memory word byte 1, complete equality is found between like order bits so that O4–16 never produces an output for any of the six sequential row interrogations. Consequently, after row $n+5$ has been driven, it will be observed that FF4–35 still remains in its set condition which, if now interrogated by a pulse applied to A4–38 and A4–39, indicates to the Address Encoder that the search criterion $M=SR$ has been met or established for the Memory byte just searched.

Next assume that a Memory word byte has the bit values shown in Example 2 of Table 1, i.e. 100011 (decimal 35), with a $M=SR$ mode of search required. Signals CL1 and CL2 are applied as shown in FIGURE 12, with signal CL4 also being applied if this byte is the first in a memory word to be searched to thereby insure the initial setting to 1 of FF4–35. After rows $n$, $n+1$, and $n+2$ have been driven, FF4–35 still remains on because of the complete identity between corresponding order Search word and Memory word bits. However, upon driving row $n+3$, a positive voltage is induced on the sense line during the switch drive time of the memory because of a mismatch between the $2^2$ order bits. This positive signal passes through A4–11 to O4–18 via O4–16. Since A4–25 is enabled for this normal search, O4–20 generates an output which in turn passes through A4–31 to clear FF4–35 back to its 0 condition. Once FF4–35 is so cleared, there is no provision to set it once again to 1, because the CL4 pulse is only generated at the beginning of an entire word search. Consequently, any interrogate pulse later applied to A4–37 cannot pass therethrough to the Address Encoder, but does pass through A4–38 so as to be applied to A gates 4–37 and 4–38 of the next higher odd column match circuit. This means, therefore, that memory word byte (2) in Table 1 does not meet the search criterion $M=SR$.

Memory word byte (3) in Table 1 likewise does not meet the search criteria $M=SR$ for the given SW byte. This is because the search of row $n+2$ finds a mismatch between corresponding order bits in a manner to generate a negative signal on the sense line which, when inverted by I4–17, passes through A4–10 to ultimately clear FF4–35.

Assume now that a M Not Equal To SR ($M\neq SR$ or $\overline{M=SR}$) search mode is required so that FF4–35 is in its 1 condition by interrogate time only if non-equality is established between the search register byte and the memory word byte. For this Not mode, the Normal signal to A gates 4–22 and 4–25 is discontinued and the Not signal to A4–23 and A4–24 is applied, except when the extra bit in the last memory matrix row is searched. Otherwise, signals CL1, CL2, and CL4 have the same operating times as shown in FIGURE 12. Consequently, at the beginning of the byte search, FF4–35 is set to its 1 condition. Consider first the memory word byte (1) of Table 1 which is equal to the search register byte. When rows $n$ through $n+5$ are interrogated in sequence, there will again be no output from O4–16 because there are no active voltages induced on the sense line for any of the row searches. FF4–35 would therefore continue to be on by interrogate time so as to falsely indicate that the search criterion $\overline{M=SR}$ has been met. To avoid this false indication, all Not searches require a search on the additional row 37 of Memory elements, one said element in each column, which is permanently stored with a binary 1 value. Thus, at the conclusion of the row $n+5$ search, this last row 37 of the memory matrix is always driven to a binary 0 value, thus inducing a negative signal by its leading edge (memory switch time) which is gated through to the Fail line in order to clear FF4–35 via A4–31. This means that when the match circuit is interrogated, the Interrogate pulse to A gates 4–37 and 4–38 finds FF4–35 in its clear condition indicating noncompliance with the search criterion.

When Memory bytes (2) and (3) are searched for $M\neq SR$, any mismatch between bits therein produces an output from O4–16 which finds its way via O4–18, A4–24, O4–21, and O4–27 to clear FF4–26. Thus, when said extra row bit is finally driven to thereby apply one high input to A4–31, the other input signal is now low so that FF4–35 remains on to indicate a match condition.

The same search register and three memory word byte examples in Table 1 will now be discussed for a $M\leq SR$ mode of search. Consider first Memory word byte (1) having the same value as does the search register byte. For this mode of search $M\leq SR$, Match FF4–35 should be in its 1 condition at the conclusion of driving row $n+5$. Since the $M\leq SR$ is also conducted by the leading edge of each row drive pulse, the first significant signal in the sense line appears to the match logic at approximately time T1 in FIGURE 12, the same as for the $M=SR$ search. At time T0 therefore, CL1 signal is applied to first maintain FF4–26 in its Clear condition until time T1. If this byte is the first in the memory word to be searched, then a CL4 signal is applied just prior to T1 in the case of an And logical coupling between different bytes of the same word. This CL4 pulse sets FF4–35 to its binary 1 condition where it remains unless cleared by a subsequent output from A4–31. At T1, the CL1 signal is terminated and only a very short CL2 pulse applied to set FF4–26 in its binary 1 condition. This makes high one input to A4–31, with another high input being applied by the And signal thereto. Consequently, any signal from O4–20 can be gated through A4–31 to clear FF4–35. Also, the continuous $M\leq SR$ signal is applied to A gates 4–12 and 4–13, while the Normal signal is applied to A gates 4–22 and 4–25.

When row $n$ of the matrix is first driven, there will be no sense line signal induced because of identical bits in the $2^5$ binary order of the SW byte and the MW byte. Neither O4–21 nor O4–20 therefore produces an output, so that the flip-flops 4–26 and 4–35 both remain in their set 1 condition. The same result occurs when rows $n+1$ through $n+5$ are searched since corresponding SW and MW bits are identical. Consequently, at the end of the search for the MW byte (1) in Table 1, FF4–26 and FF4–35 remain set to 1, with this condition indicating that the search criterion has been met, i.e., M is either equal to or less than SR. At time T3, after the last significant sense line signal (caused by a search of the last row $n+5$) has had time to appear to the match logic, CL1 is again applied to clear FF4–26 and thus prevent the match circuit from being affected by sense line signals caused by simultaneous row driver restoration.

Next consider MW byte (2) in Table 1 for the $M \leq SR$ search. The signals CL1, CL2, (and possibly CL4) are applied as shown in FIGURE 12 so that flip-flops 4–26 and 4–35 are both set to the binary 1 condition by T1 time. For the search of rows *n*, *n*+1, and *n*+2 no induced signals appear on the sense line. However, when row *n*+3 is driven, the resulting positive sense line signal is gated through A4–13 to clear FF4–26 via O4–27. When the Enable flip-flop has thus been cleared, it prevents A4–31 from subsequently generating any output signal to clear FF4–35 even though O4–20 may go high. This means that when row *n*+5 of the byte is driven, the resulting negative sense line signal (produced because of the 1 bit in Memory and the 0 bit in the Search register) cannot get past A4–31. FF4–35 therefore is in its binary 1 condition at the time of interrogation. On the other hand, for Memory word byte (3) in Table 1 having a decimal value greater than the search register byte, FF4–35 must instead finally be in its clear condition when the Interrogate pulse is applied to A4–37. At the beginning of the search on memory word byte (3), FF4–26 and FF4–35 are once again set to 1 by T1 time when the first signficant sense line potential occurs due to the driving of row *n*. No active sense line signals are induced therein for rows *n* and *n*+1 because of identical bits. However, for row *n*+2, a negative sense line signal appears which, when inverted by I4–17, produces an output from A4–12. This output in turn passes through O4–18, A4–25, and O4–20 to appear as one input to A4–31. Since FF4–26 is still in its binary 1 condition at this time, A4–31 generates an output which clears FF4–35. Because there is no way to subsequently reset FF4–35 to its 1 condition, it remains clear by the time that it is interrogated to thereby indicate a No Match condition.

For a search mode of $\overline{M \leq SR}$, the Not signal replaces the Normal signal for row searches *n* through *n*+5. When the extra row 37 is finally searched, the Normal signal once again is applied, with Not discontinued to gate a signal to the Fail line. Thus, for memory word byte (1) in Table 1, no induced sense line signal ever appears during the successive searches on rows *n* through *n*+5, but a negative signal does appear thereon when the extra row 37 is searched. This negative signal, when inverted, passes through A4–12, O4–18, A4–25 (since the Normal signal is applied during this extra row search), A4–31 and O4–34 to clear FF4–35, thereby indicating No Match. For memory word byte (2), the positive sense line signal induced by the search of row *n*+3 causes an output on the Fail line (via A4–13, O4–19, A4–23, and O4–20) which also clears FF4–35. However, for MW byte (3), the negative sense line signal appearing when row n+2 is searched now passes through I4–17, A4–12, O4–18, A4–24, O4–21, and O4–27 to clear FF4–26, making the still set flip-flop 4–35 insensitive to subsequently appearing Fail signals.

The mode of search $M \geq SR$ will now be considered as conducted on each of the MW bytes (1), (2), and (3) in Table 1. For byte (1), which is equal to the Search register byte, FF4–35 should be in its 1 condition at the end of the search. FIGURE 12 shows that the CL1 signal is applied beginning at time T0 until a time T2 which is subsequent to time T1 heretofore considered. This is because time T0 indicates when the leading edge of the drive pulse is applied to row *n*. In the case of the $M \geq SR$ search, all drivers to rows *n* through *n*+5 are turned on simultaneously at time T0, and then after a 1 microsecond delay, are turned off sequentially beginning with row *n*. Consequently, the driver only to row *n* is first turned off at some time intermediate times T0 and T2. Because of the previously mentioned delay in the Memory array the significant sense line potential for row *n* does not appear until at approximately time T2, which is when the CL1 signal is terminated as shown in FIGURE 12. CL4 can still be applied at time T1, as was the case for the searches previously discussed, in order to initially set FF4–35 to its binary 1 condition if the MW byte is the first in the Memory word to be searched for with And coupling between bytes. At time T2, when the CL1 signal is terminated, CL2 is temporarily applied for only a brief instant to set FF4–26 to its binary 1 condition in preparation for the significant sense line potentials next to follow.

When the row *n* driver is turned off so as to reswitch the core elements therein, identical SR and MW bits prevent any induced signal on the sense line to thereby avoid changing the state of either FF4–26 or FF4–35. This is true also when the driver to row *n*+1 is next turned off. For the remaining rows *n*+2 through *n*+5, the sequential termination of the driver current therein further causes no induced signal in the Sense line so that at the end of the search cycle, FF4–35 remains set. This indicates the match condition of $M \geq SR$. Signal CL1 may again be turned on at T4 to clear FF4–26 and thus insure that no spurious noise signals can inadvertently clear FF4–35.

For MW byte (2) in Table 1, the $M \geq SR$ search should produce a No Match condition such that FF4–35 is cleared by the end of the search cycle. Signals CL1, CL2 (and perhaps CL4), are applied as shown in FIGURE 12. When rows *n*, *n*+1, and *n*+2 are sequentially searched by turning off their respective drivers, the absence of induced sense line signal fails to change the circuit flip-flops. However, when row *n*+3 is searched, the binary 1 bit in SR and the binary 0 bit in MW produces a negative sense line signal at the trailing edge of the drive pulse when the Memory element reswitches. This negative signal is inverted by I4–17 and passes through A4–14 to clear FF4–35 via A4–31. Its binary 0 condition at the end of the search cycle indicates that no match was found according to the mode of search.

A search on the memory word byte (3) in Table 1 should indicate a match, since this memory word is greater than the search word. By T2 time of this search cycle, flip-flops 4–26 and 4–35 are once again in their binary 1 condition. Rows *n* and *n*+1 are searched in sequence without changing the flip-flop states. When row *n*+2 is searched, the positive sense line signal passes through A4–15, O4–19, A4–22, and O4–21 to thereby clear FF4–26. This thereafter disables A4–31 from responding to any subsequent signals appearing on the Fail line and so will keep FF4–35 in its binary 1 condition for the remainder of the search cycle. Consequently, a Match is indicated during interrogation time.

When $\overline{M \geq SR}$ is the mode of search, the Not signal remains on and the Normal signal remains off even for the extra row 37 search. For example, consider byte (1) in Table 1 wherein no induced active sense line signal appears for the row *n* through *n*+5 searches. Finally, the extra row 37 is searched by turning off its driver. The reswitch of the memory element from 0 to 1 causes a positive induced sense line signal which passes through A4–15, O4–19, A4–23, O4–20, and A4–31 to clear FF4–35. When byte (2) is searched, the row *n*+3 reswitch causes a negative sense line signal clears FF4–26 before any Fail line signal can appear to clear FF4–35. However, when byte (3) is searched, the row *n*+2 reswitch produces a positive sense line signal to clear FF4–35 before FF4–26 can itself be cleared.

In order to accomplish the Between Limits search, wherein the lower limits of the ranges are held in even numbered columns and upper limits of the ranges are stored in odd numbered columns, the $M \geq SR$ mode of search is conducted on all odd numbered columns simultaneously with a $M \leq SR$ search on even numbered columns. To illustrate this, consider a Search word byte value as shown in Table 1. Next assume that odd Memory column 1 contains memory word byte (3) while even Memory column 2 contains memory word byte (2) both shown in Table 1. If a $M \geq SR$ mode of search is conducted on column 1 simultaneously with a $M \leq SR$ mode of search on column 2, the Match flip-flop 4–35 in each said column will be in the binary 1 condition at the conclusion of the search cycle. The CL1, CL2 (and possible CL4), signals are applied to the even column and the odd column as shown in FIGURE 12, with an additional signal BL–1 being applied to A gate 4–30 in each column. Consequently, if A4–31 in either column generates an output to clear its associated FF4–35, then A4–30 in said column will also generate an output to clear FF4–35 in the adjacent column to which it is connected. The values now assumed to be in column 1 and column 2 are such, however, that the flip-flop 4–26 in each will be cleared by a PASS signal before there is any output from O4–20 in either column.

A Match will also be found in the event that memory word byte (3) is in column 1 and memory word byte (1) is in column 2; the same is true for memory word byte (1) in column 1 and either memory word byte (2) or memory word byte (1) in the column 2. There are, therefore, four combinations of the Table 1 MW values which will provide matches in a Between Limits search, such that flipflops 4–35 in column 1 and column 2 are both in the binary 1 condition at the conclusion of of the search cycle. However, there are six combinations of these Table 1 Memory word byte values which provide No Match indications, as indicated by binary 0 values held in FF4–35 of each. For example, assume that MW byte (2) is contained in column 1 and also in column 2. When a $M \leq SR$ search is conducted on column 2, its FF4–26 is cleared by a PASS signal before any signal appears on its Fail line. Consequently, neither A4–30 nor A4–31 of column 2 is allowed to generate an output signal. On the other hand, the $M \geq SR$ search conducted on column 1 results in a Fail signal appearing from its O4–20 prior to any clearing of its FF4–26. This means that both A4–30 and A4–31 in column 1 generate a signal, the former being applied to O4–34 of column 2 to thereupon clear FF4–35 in said even column, while a signal from A4–31 is applied to its own FF4–35 operating to clear same. At the conclusion of this search cycle, FF4–35 in column 1 and in column 2 are set to 0, thereby indicating No Match for this search. As another example, consider the case where memory word byte (3) is held in both column 1 and column 2. The $M \geq SR$ search on column 1 finds a match so as to prevent outputs from its A4–30 and A4–31. On the other hand, the $M \leq SR$ search being simultaneously conducted in column 2 finds a mismatch to enable both A4–30 and A4–31 therein. The signal from A4–30 of column 2 is applied to its own O4–34 to thereby clear the column 2 flip-flop 4–35. Other examples of No match determinations for a Between Limits search are those occurring whenever column 1 contains memory word byte (2), or whenever column 2 contains Memory word byte (3).

The Next Higher and the Next Lower searches are most complex since each requires two passes through the same Memory word byte. In the disclosed embodiment of the invention, the Search word byte is compared with all corresponding data word bytes in the even Memory columns independently from but simultaneously with its comparison with corresponding data word bytes in the odd Memory columns. Thus, at the end of the NH or NL search, the next higher (or lower) even column data word and the next higher (or lower) odd column data word will be found. The following discussion and illustrations will be confined to add column operation only, but the identical procedure is to be found in the even column NH or NL search. For a Next Higher search, the first pass is a conventional $M \geq SR$ mode of search, while for the Next Lower the first pass is a conventional $M \leq SR$. After this first pass is completed, all Enabled Flip-flops FF4–26 in all odd columns are disabled, and then A4–29 in each column is pulsed by a F1 signal is set to 1 only those flip-flops 4–26 whose corresponding column match flip-flops 4–35 have remained set at 1 by the inclusion of the first pass through the byte. The Memory word byte is then searched again with a $M \geq SR$ or a $M \leq SR$ (according to whether a Next Higher or Next Lower search is being conducted). At the end of each Memory row search during this second pass through the byte, an O gate 9–149 (shown in FIGURE 9) in the Odd Column Control unit examines the States of all respective odd column Enable flip-flops 4–26. If at least one thereof is still set after the row search, an F2 signal is applied to all A gates 4–33 in all of the odd columns to clear match flip-flops 4–35 only in those columns wherein the associated FF4–26 was cleared by said row search. On the other hand, if after a row search the OR gates show that all odd column Enable flip-flops 4–26 have been cleared to 0, a signal F1 is applied to A gates 4–29 in all odd columns to set only those flip-flops 4–26 whose associated match flip-flops 4–35 are in a 1 condition. Furthermore, in addition to applying said signal F1 to A4–29 in each odd match circuit, the Search register byte effectively has all of its bit values changed to 0 (in the case where a Next Higher search is being conducted) or to 1 (in the case where the Next Lower search is being conducted). At the conclusion of this second pass through the byte, only odd column match flip-flops 4–35 continue to be in a 1 condition whose memory words are equal to the Search word byte, or absent any such equal memory words, those which are the next higher of all higher odd Memory column words. Also at the conclusion of said second pass, one or more of the Even column Match flip-flops may be in its 1 condition to indicate the next higher or lower even Memory column word. One numerical odd column example for each of the Next Higher and Next Lower searches will now be given to demonstrate the operation of FIGURE 4.

Table 2 below shows an assumed value 11011 of a Search register byte at respective rows $n$ through $n+4$ to be compared against all of the corresponding word bytes in the Memory columns in order to determine which one therein is equal to or the next higher in value to the Search word byte. A conventional $M \geqslant SR$ search is conducted on the first pass through the bytes with the CL1, CL2, and CL4 signals applied as shown in FIGURE 12. CL4, of course, is only applied if this is the first byte to be searched in the word in order to insure that FF4–35 in each column is set to 1. Assume for the purpose of this description that only odd Memory column 3, odd Memory column 11, and odd Memory column 17 contain bytes numerically equal to or greater than said Search register byte. For example, column 3 is assumed to have bits 11100 in respective rows $n$ through $n+4$ column 11 has 11101, and column 17 has 11110. At the conclusion of the first pass through the memory, only Match flip-flops 4–35 in columns 3, 11, and 17 therefore remain in the 1 condition, since these are the only word locations whose bytes are here assumed to be equal or greater than the search register byte. The Match flip-flops 4–35 in all other odd Memory columns are cleared to the 0 condition by this time. To commence the second pass through the same byte, a CL1 signal is first applied to all odd Memory columns 1 through N clearing all Enable flip-flops 4–26 to 0. Next, CL1 is terminated and a F1 signal is applied to each odd Memory column 1 through N–1, rather than CL2, in order to set to 1 only those Enable flip-flops 4–26 whose associated Match flip-flops are in the 1 condition at the end of the first pass. This means that gates A4–29 in only Memory columns 3, 11, and 17 are responsive to said F1 signal to thereupon set their associated flip-flops 4–26 to 1. Thus, when row $n$ is initially searched during the second pass, only columns 3, 11, and 17 will be in a condition to make a final determination as to the relative magnitude of the SW bit and the MW bit in said row.

TABLE 2.—NEXT HIGHER MOS (2ND PASS)

| Row | SW Byte | MW Column 3 Byte E M→E M | | | | | MW Column 11 Byte E M→E M | | | | | MW Column 17 Byte E M→E M | | | | |
|---|---|---|---|---|---|---|---|---|---|---|---|---|---|---|---|---|
| | | Byte | E | M | E | M | Byte | E | M | E | M | Byte | E | M | E | M |
| $n$ | 1 | 1 | 1 | 1 | 1 | 1 | 1 | 1 | 1 | 1 | 1 | 1 | 1 | 1 | 1 | 1 |
| $n+1$ | 1 | 1 | 1 | 1 | 1 | 1 | 1 | 1 | 1 | 1 | 1 | 1 | 1 | 1 | 1 | 1 |
| $n+2$ | 0 | 1 | 0 | 1 | 1 | 1 | 1 | 0 | 1 | 1 | 1 | 1 | 0 | 1 | 1 | 1 |
| $n+3$ | 1→0 | 0 | 1 | 1 | 1 | 1 | 0 | 1 | 1 | 1 | 1 | 1 | 0 | 1 | 0 | 1 |
| $n+4$ | 1→0 | 0 | 1 | 1 | 1 | 1 | 1 | 0 | 1 | 0 | 0 | 0 | 0 | 0 | 0 | 0 |

Table 2 further shows E and M headings for each Memory column 3, 11, and 17, both to the left and to the right of an arrow. The E and M headings to the left are used to respectively specify the states of the column Enable flip-flop 4–26 and the column Match flip-flop 4–35 immediately after each row of the Memory word byte has been searched. The E and M headings to the right of the arrow indicate the states of said respective flip-flops just prior to the search of the next following row. These right hand states of the E and M flip-flops may either be the same states that they are in just subsequent to a row search, or they may be different due to the application of signals F1 or F2 just prior to the next row search.

Since the row $n$ bit in each of the columns 3, 11, and 17 is identical to the Search register bit in this row, this row search still leaves the E and M flip-flops of these three columns in their 1 condition. This fact is indicated in Table 2 by a 1 appearing in all left hand E and M headings at the row $n$ line. Before row $n+1$ is searched, however, said O gate 9–149 examines the states of E flip-flops 4–26 in all odd columns 1 through N–1 thus finding that at least one of the E flip-flops is still in a 1 condition after the row $n$ search. An F2 signal is therefore applied to A4–33 in each odd column Word Match Logic circuit of the system (not only column 3, 11, and 17) which would ordinarily clear to 0 the Match FF4–35 therein in the event that the associated Enable FF4–26 were in its 0 condition. Since FF4–26 in each column 3, 11, and 17 is in its 1 condition, the Match flip-flop 4–35 in each of these columns 3, 11, and 17 cannot be cleared to 0 by said F2 signal. This is indicated by the 1 values in all right hand M headings in Table 2 on the row $n$ line. Furthermore, each FF4–26 in these three Memory columns 3, 11, and 17 also remains in its 1 condition as indicated by 1 values in all right hand E headings of Table 2.

Row $n+1$ of the memory matrix is searched next. Since the SR bit is identical with the row $n+1$ bits in columns 3, 11, and 17, the E and M flip-flops in each said Memory column remains at 1 at the conclusion of the row $n+1$ search. Consequently, a F2 signal is again applied to A4-33 in all match logic circuits but does not disturb the 1 condition of the Match flip-flops 4–35 in columns 3, 11, and 17. A row $n+2$ search can now be conducted. The 1 values in columns 3, 11, and 17 are greater than the 0 value in the search register row $n+2$, Such that a positive sense line signal appears to each of these three column match circuits and passes through each A4–15 to thereupon clear each FF4–26 therein. This is indicated by the 0 value in each left hand E heading of Table 2 on the row $n+2$ line. Match FF4-35 in each of these three columns still remains in its 1 condition at the conclusion of the row $n+2$ search. Before row $n+3$ is searched, however, said gates O9–149 determine that there are no Enable flip-flops 4–26 in any odd column match circuit of the system still in a 1 condition. Signal F2 is not therefore applied to any of the match circuits which instead receive a signal F1 at their gates A4–29. In Memory columns 3, 11, and 17, this F1 signal once again sets each FF4–26 to its 1 condition as indicated by the 1 value in each right hand E heading on the row $n+2$, line in Table 2. Furthermore, the search register bits, in all remaining byte rows $n+3$ and $n+4$, must be changed to 0 values if not already zero. This is indicated in Table 2 by the 0 values at the right of the two arrows in rows $n+3$ and $n+4$ of the SW Byte heading.

Row $n+3$ is now searched, using a 0 value rather than the original Search word 1 value. Since identical 0 bits are in columns 3 and 11, both the E and M flip-flops therein remain in a 1 condition at the conclusion of this search. On the other hand, the value 1 in column 17 is greater than the Search word 0 value, such that a positive sense line signal thereto causes FF4–26 in column 17 to be cleared to 0. After row $n+3$ has been searched, flip-flops 4–26 in all odd column match logic circuits of the system are examined to determine if at least one thereof is still set to 1. Such is the case here, as shown by FF4–26 in columns 3 and 11, so that a F2 signal is applied to each A4–33. In the case of column 17, F2 is able to clear its FF4–35 to 0 because its FF4–26 is now 0. Just before row $n+4$ is to be searched, Table 2 shows that both the E and M flip-flops in Memory columns 3 and 11 are set to 1, while both the E and M flip-flops in column 17 are in a 0 condition. Of course, all other Memory columns in the system have had their E and M flip-flops in a 0 condition since the beginning of this second pass through the byte.

Row $n+4$ is now searched with an effective 0 value from the SR byte. A like 0 value in Memory column 3 means no active sense line signal, so that FF4–26 and FF4–35 therein remain in a 1 condition. On the other hand, the 1 value in Memory column 11 causes a positive sense line signal to clear its FF4–26. The column 11 Match flip-flop 4–35, however, still remains in a 1 condition immediately after the row $n+4$ search has been conducted. Column 17 is removed from consideration at this time, since neither its Enable nor Match flip-flop is set to 1 for the row $n+4$ search. At the conclusion of row $n+4$ search, but before an Interrogate signal is applied to A4–37 in each odd Memory column, or alternatively, before the next byte in the words is searched, the state of all Enable flip-flops 4–26 are again examined. Since at least one thereof (in column 3) is still in a 1 condition, an F2 signal is finally applied to all gates A4–33 which, in Memory column 10, thereby clears its associated Match flip-flop 4–35. It is therefore seen that after the second pass has been made through the same byte, only the Match flip-flop 4–35 in column 3 remains in its 1 condition to thereby indicate that its Memory word is either equal to the Search word byte, or is the next higher thereto of all higher odd Memory column words.

Table 3 illustrates the operation of FIGURE 4 during the second pass in the same byte during a Next Lower mode of search. Assume that the Search word byte value is 01010 held in rows $n$ through $n+4$, respectively. Further assume that only words in Memory columns 5, 7, and 13 contain values equal to or less than said Search word byte value. Column 5 is shown to contain a value 00111, column 7 a value of 01001, and column 13 a value of 01010. The word in column 13 is equal to the SR byte, while the word in column 7 is the next lower of the two words contained in columns 5 and 7.

The first pass through the byte is a conventional $M \leq SR$ which results in only columns 5, 7, and 13 having their Match flip-flops 4–35 in the 1 condition at the conclusion thereof. Furthermore, the Enable flip-flop 4–26 in column 13 will still be in its 1 condition because of perfect correspondence between its Memory column bits and those of the SR byte. However, the Enable flip-flops 4–26 in columns 5 and 7 will have been cleared to 0 because of mismatches found between one or more of their bits with corresponding SR bits. Just before the second byte pass is to begin, a CL1 signal is applied to all odd column match logic circuits for clearing each FF4–26 therein in the manner shown in FIGURE 12 for a $M \leqq SR$ search. However, at T1 time of the second pass a F1 signal is now applied, rather than a CL2 signal, so that only those flip-flops 4–26 are set to 1 which are in odd columns having Match flip-flops already in a 1 condition. Consequently, flip-flops 4–26 in columns 5, 7, and 13 are in a 1 condition at the beginning of the second pass, whereas flip-flops 4–26 in all other odd columns remain in their 0 condition to thereby remove their match logic circuits from responding to any sense line signals. Row $n$ is now searched. Since each of the columns 5, 7, and 13 here contains a 0 value, there are no active sense line signals, which means that both the E and M flip-flops in each of these three columns remain in a 1 condition. This is indicated in Table 3 by the 1 values in the left hand E and M headings of each Memory column at the row $n$ line thereof. Before searching row $n+1$, all odd column flip-flops 4–26 are first examined by gate O9–149, and since at least one thereof is still in the 1 condition, a signal F2 is produced. This signal does not disturb the 1 condition of Match flip-flop 4–35 in any of the three columns 5, 7, or 13, under consideration, inasmuch as each A4–33 therein cannot produce an output because of the 1 condition of its respective FF4–26. Therefore, for the row $n+1$ search, the E and M flip-flops in columns 5, 7, and 13 will be in a 1 condition as indicated by the values shown in all right hand E and M headings at the row $n$ line of Table 3.

TABLE 3.—NEXT LOWER MOS (2ND PASS)

| Row | SR Byte | MW Column 6 Byte E M→E M | | | | | NW Column 7 Byte E M→E M | | | | | MW Column 13 Byte E M→E M | | | | |
|---|---|---|---|---|---|---|---|---|---|---|---|---|---|---|---|---|
| n | 0 | 0 | 1 | 1 | 1 | 1 | 0 | 1 | 1 | 1 | 1 | 0 | 1 | 1 | 1 | 1 |
| n+1 | 1 | 0 | 0 | 1 | 0 | 0 | 1 | 1 | 1 | 1 | 1 | 1 | 1 | 1 | 1 | 1 |
| n+2 | 0 | 1 | 0 | 0 | 0 | 0 | 0 | 1 | 1 | 1 | 1 | 0 | 1 | 1 | 1 | 1 |
| n+3 | 1 | 1 | 0 | 0 | 0 | 0 | 0 | 0 | 1 | 0 | 0 | 1 | 1 | 1 | 0 | 0 |
| n+4 | 0 | 1 | 0 | 0 | 0 | 0 | 1 | 0 | 0 | 0 | 0 | 0 | 1 | 1 | 1 | 1 |

When row $n+1$ is next searched with a Search word 1 value, identical bits in memory word columns 7 and 13 prevent any active sense line signals therein. Therefore, their E and M flip-flops remain set. However, the 0 bit in row $n+1$ of column 5 induces a positive sense line signal which clears its FF4–26 although keeping its FF4–35 in a 1 condition. After row $n+1$ has been searched, an examination of all odd column Enable flip-flops 4–26 indicates that at least one thereof is still set to 1 (shown by 1 values in the left hand E headings of Memory columns 7 and 13). Therefore, an F2 signal is generated prior to the search of row $n+2$ and which, in column 5, clears flip-flops 4–35 to 0. The F2 signal in columns 7 and 13 does not disturb the FF4–35 state therein, nor is the 1 condition of FF4–26 therein changed. Consequently, at the beginning of the row $n+2$ search, only flip-flops 4–26 in columns 7 and 13 will be in a 1 condition. The 0 condition of FF4–26 in column 5 effectively removes this match logic circuit from any further determination of the next lower value.

Row $n+2$ is now searched and finds like values in columns 7 and 13. Consequently, the E and M flip-flops in both of these two columns remain in a 1 condition which in turn generates an F2 signal before the following now $n+3$ search. This F2 signal to A4–33 in columns 7 and 13 cannot clear Match flip-flops 4–35 therein since each FF4–26 thereof is in a 1 condition. Row $n+3$ is now searched, finding a 0 in column 7, and a 1 in column 13. In column 13, therefore, both the E and M flip-flops are kept in a 1 condition. In column 7, however, the 0 value produces a positive sense line signal which clears its Enable flip-flop 4–26 but leaves its Match flip-flop 4–35 still set to 1. The 1 condition of flip-flop 4–26 in column 13 causes a F2 signal to be generated which, in column 7, clears its match flip-flop 4–35 to 0. When row $n+4$ is finally searched, only column 13 has its FF4–26 in a 1 condition in order to interpret any active sense line signal. Since a like 0 value is found in row $n+4$ of column 13, no such sense line signal occurs so that both FF4–26 and FF4–35 therein remain set. This in turn produces another F2 signal at the end of the second byte pass which fails to change the states of these two columns 13 flip-flops, thus leaving the column 13 Match flip-flops 4–35 in its 1 condition for any future Interrogate pulse to sample. All other odd column Match flip-flops 4–35 are cleared to 0.

During the foregoing discussion as to basic search modes, it has been assumed that all byte mode statements specify logical And coupling between searches on different bytes of the same word as indicated by a 0 value held in the first position of each MOS register mode statement. However, a 1 value held therein for any Equality, Less Than or Equal and Greater Than or Equal search requires that logical Or coupling be performed between adjacent searches in the same word. The way in which logical Or coupling affects the operation of FIGURE 4 will now be described. First of all, A4–31 in FIGURE 4 is disabled by the absence of the And signal thereto from the column control circuit. Instead, a high Or signal is applied to A4–32 so as to permit an output therefrom whenever FF4–26 is in its 1 state and there is a signal appearing on the Fail line from O4–20. Any output from A4–32 is applied via O4–36 to set FF4–35 to its 1 condition which, as has heretofore been explained, is indicative of a match. Furthermore, at the beginning of the first byte search in a word the CL3 signal is applied to O4–34 instead of a CL4 signal to O4–36. The CL3 signal insures that FF4–35 is initially in its 0 condition indicating a No Match situation. However, in the event that the first bit position of the entire MOS word holds a 1 value, then the CL3 signal is inhibited, as was the CL4 signal, in order to combine the search results with the search results with the search results of preceding words.

For any one of the three following Normal searches with Or coupling, $M=SR$, $M \leqq SR$, and $M \geqq SR$, the application of the Not and Normal signals to gates A4–22 through A4–25 is identical to the previously described situation where there is both And coupling and a Not mode of search, i.e., $\overline{M=SR}$, etc. Also, the extra row 37 of the Memory array is searched in the same fashion as for said Not mode with And coupling. To illustrate, consider a normal $M=SR$ search with Or coupling as being conducted on each of three different bytes in the same Memory word, where the Search word byte value and the Memory word byte values are as shown in Table 1. That is to say, assume that a Search word contained in the Search register has three different bytes thereof each of the same value 100110, and that there is a Memory word whose three correspondingly located bytes have the three respectively different values shown in headings (1), (2), and (3) of said Table 1. The object of the word search with Or coupling is to have Match flip-flop 4–35 in its 1 condition at the end of the search cycle if there is a match between any Search word byte and its corresponding Memory word byte. On the other hand, if And coupling were to be utilized between byte searches, there would have to be a match between every Search word byte and its corresponding memory word byte for Match flip-flop 4–35 to be in its 1 condition at the end of the search cycle.

At the beginning of the Or coupling $M=SR$ search on the first byte, a CL3 signal is applied to set FF4–35 to its 0 condition with the assumption that the first bit position of the mode of search register contains a 0 value therein. The first Search register byte of values 100110 is then sequentially compared bit by bit, starting with the highest order bit, with the first Memory word byte also of value 100110. During this comparison the Not signal is applied to gates A4–23 and A4–24, but gates A4–22 and A4–25 are disabled because there is no Normal signal. Since the Memory word byte (1) bits are identical to the Search word byte bits, no active voltage is ever induced on the sense line during the scan of rows $n$ through $n+5$. Consequently, after the scan of row $n+5$ the Match flip-flop FF4–35 still remains in its 0 condition even through there is complete identity between the first Search word byte and the corresponding Memory word byte. However, Or coupling during any one of the above three normal search modes further requires the scan of the extra Memory row 37. Since the mode of search is $M=SR$, at the time said row 37 bit is scanned the Normal signal appears and the Not signal is terminated. This means that the active voltage on the sense line which appears at this extra row scan is now gated through O4–16 and appears at the output of O4–20 from where it is directed via A4–32 in order to set FF4–35 to its 1 condition. Inasmuch as the CL3 signal can only appear at the beginning of a search on the entire word, and never at the conclusion of any byte search therein, there is now no way for FF4–35 to be returned to its 0 condition even though no more matches may be had during successive byte searches in the same word (with the assumption, of course, that the mode statement for each succeeding byte further requires said Or coupling). Thus, after the search has been conducted on Memory word byte (1) in Table 1, the second Search word byte, also of value 100100, is now compared with the second (2) byte of value 100011. Since the mode statement for this search is also $M=SR$ with Or coupling, the mismatch at row $n+3$ between the 1 bit in the Search word byte and the 0 bit in the Memory word byte causes an output from O4–16 which passes through A4–24 (because of the Not signal being applied) and to O4–21. The output from O4–21 resets FF4–26 to a 0 condition which thereupon disables A4–32 from any subsequent response to a signal appearing on the Fail line from O4–20. However, said mismatch does not affect the 1 condition of FF4–35. Of course, if Memory word byte (2) had been the first byte searched during the search cycle, rather than byte (1), the clearing to 0 of FF4–26 by the row $n+3$ mismatch would have prevented FF4–35 from being set to 1 by any following signal on the Fail line during the remainder of this byte search including the extra row scan.

After the second byte search, the third Search word byte, also of value 100110 in the assumed example, is compared with memory word byte (3) of value 10110. During this third byte search the mismatch at row $n+2$ causes FF4–26 to be cleared to 0 but does not affect the previously set 1 condition of FF4–35.

A normal $M\leqq SR$ search with Or coupling is performed in a manner identical to the above; that is, with the Or signal applied to A4–32, and a Not signal applied to A4–23 and A4–24 during the search through the byte bits, and then with the Normal signal applied to A4–22 and A4–25 for the extra row 37 search. For a normal $M\geqq SR$ search with Or coupling, the Or signal to A4–32 is also present, and the Not signal to A4–23 and A4–24 is present for the entire byte search time including the extra row search (exactly as is the case for a $\overline{M\geqq SR}$ search with And coupling, as previously described).

It is also possible to have one of three Not search modes, i.e., $\overline{M=SR}$, $\overline{M\geqq SR}$, and $\overline{M\leqq SR}$ with Or coupling. A mode statement so specifying any search of this nature has a 1 value in its first bit position and a 1 value in its fifth bit position. The Or signal is here applied to A4–32, but the Normal signal is now applied to A4–22 and A4–25 for the entire byte search, and there is no additional row 37 search. This procedure should be compared against a similar Not mode of search with And coupling, wherein the And signal is applied to A4–31, and the Not signal to A4–23 and A4–24 for the byte search with there further being an additional row 37 search. For example, for a $\overline{M=SR}$ search with Or coupling, any mismatch between a Search word bit and a Memory word bit causes an output from O4–16 which is transferred through O4–20 onto the Fail line from whence it is applied to A4–32 and used to set FF4–35, thus indicating that a match condition has been found (i.e. that a Search word byte is not equal to its corresponding Memory word byte). In the event that the Memory word byte is identical to the Search word byte for the $\overline{M=SR}$ search, there would be no output from O4–16 for any of the bit comparisons. This means in turn that no signal appears on the Fail line, and thus no output from A4–32 for this byte search.

For a $\overline{M\leqq SR}$ search with Or coupling, any first appearing 1 bit in the Memory word and a 0 bit in the Search word causes A4–12 to generate a signal which finally appears on the Fail line where it then passes through A4–32 to place FF4–35 in its 1 condition. On the other hand, a first appearing 0 Memory word bit and a 1 search word bit produces a Pass line signal which clears FF4–26 to 0, thus preventing any later appearing Fail signal from being gated through A4–32. Equality of all bits for a $\overline{M\leqq SR}$ search with Or coupling means that no Pass or Fail signal is ever generated, thus keeping FF4–35 in its 0 condition. A $\overline{M\geqq SR}$ search with Or coupling, where the Memory word byte is smaller than the Search word byte, likewise generates a Fail signal which passes through A4–32 before a subsequently appearing Pass signal can clear FF4–26 to 0.

FIGURE 5 shows details of the Byte translator which senses outputs of the Parameter register (PR) to generate signals indicating the beginning and end positions of each byte in the Search register word. In the disclosed embodiment of the present invention, the Parameter register holds 36-bits whose coding is done according to the following three rules:

(1) For each position of the Search register not included in a search word byte, the corresponding bit position in the Parameter register has a stored binary 0 value, with one exception as set forth below in Rule 3.

(2) All bit positions of a byte, except the lowest order bit position, are indicated by binary 1 values in the corresponding bit positions of the Parameter register.

(3) The lowest order bit position of a byte is indicated by a 0 value in the corresponding bit position in the Parameter register.

To illustrate this Parameter register coding, consider the 36-bit Example 1 given below and assumed to be held therein, where the highest order bit position (in the order of sequential searching) is at the left while the lowest order bit position is at the right.

*Example 1*

| | Byte 1 | | Byte 2 | | Byte 3 | Byte 4 | |
|---|---|---|---|---|---|---|---|
| 000000 | 110 | 0 | 10 | 000 | 111110 | 1111110 | 00000000 |

The first leftmost 6 bits, being all 0's, indicated that the values held in corresponding Search register bit positions form no part of any byte to be searched. The next three PR bits 110 constitute the Search register positions of the values making up the first byte for which a search is to be conducted. Following Byte 1, a single 0 value in the PR indicates that the value in the corresponding position of the Search register is not part of any byte to be searched. Next follows two values 10 in PR, thus indicating the location and length of Byte 2 in the Search register. The three 0 values following Byte 2 require that values in corresponding Search register positions are to be ignored, while the next following 6 bit number 111110 in PR indicates the location of Byte 3. Immediately following Byte 3 is Byte 4 represented by 1111110 in PR. The eight 0's (00000000) remaining in the lower order PR positions signify that values in corresponding Search register positions are to be ignored since they do not constitute any part of a byte to be searched. This example is applicable to either a thirty or a thirty-six bit coding of the Parameter register, since when it is loaded from a thirty bit input source, the high order 6 bits of PR are cleared to 0 thus automatically restricting the Parameter register coding to 30 bits.

Construction of the Byte translator in FIGURE 5 will now be described. From Example 1 above it is obvious that the beginning of any byte is indicated by a binary 1 in the highest order position of the byte, coupled with a binary 0 in the next higher order position of PR. The end of a byte is indicated by a binary 0 value in the lowest order position of the byte, coupled with a binary 1 in the next lowest order position of the byte. Thus, FIGURE 5 shows a set of A gates 5–10 through 5–43 which respectively indicate the beginning of bytes at positions 2 through 35 of the Search register. A second set of A gates 5–44 through 5–77 are employed to respectively indicate the end of bytes at any of the Search register positions or stages 2 through 35. Each of the A gates 5–10 through 5–43 has one input from the 1 output terminal of the PR stage at which it can identify a byte beginning, and another input from the 0 output terminal of the next lower numbered PR stage which, in actuality, is the next higher binary order position when considering the order of bit values. For example, A5–10 when producing a high output signal BB2, indicates the beginning of a byte in SR stage 2. It has one high input from the 1 output terminal of PR2 and another high input from 0 output terminal of PR stage 1. Similarly, A5–11 has one input from the 1 output terminal of PR stage 3 and a second input from the 0 output terminal of PR stage 2. Thus, when a 1 is in PR3 and a 0 is in PR2, A5–11 generates a high output BB3 indicating that a Search word byte begins in SR stage 3. If a Search register or word byte begins in position 1, all that is required is an output lead from the 1 output terminal of PR stage 1.

Each of the A gates 5–44 to 5–77 has one input from the 0 output terminal of the PR stage at which it can identify a byte ending, and the other input from the 1 output terminal of the next lower numbered PR stage which, in binary order of significance, is the next higher binary order position of the byte. A5–44, for example is connected to the 0 output of PR stage 2 and the 1 output of PR stage 1 so that with 1 and 0 values in respective PR stages 1 and 2, a high output EB2 from A5–54 indicates that the end, or lowest order binary bit value, of a byte in the search register occurs in its position 2. A5–45 is similarly connected so that a 1 in PR stage 2 and a 0 in PR stage 3 produces a high output EB3 indicating that the end, or lowest order binary value of a byte occurs in position 3 of the Search register. Although two additional A gates in each of the two sets could be provided for stage 36 in PR, this is not necessary, since (1) a byte will never begin with the last stage, and (2) it is obvious upon reaching the last stage 36 of the Search register that this must be the end of whatever byte might have been indicated to have begun at a lower numbered SR stage.

FIGURE 6 illustrates details of a counter chain configuration which can conveniently be employed in certain of the control circuits subsequently to be described. This counter configuration in general is comprised of a group of flip-flop stages 6–11, 6–12, 6–13, etc., the exact number depending upon the function to be provided, and wherein only one stage thereof can be on at any time. For the sake of convenience, each counter stage is hereafter referred to by a C1, C2, C3, etc. designation indicative of the order in which it is set on. Each counter stage has set and clear input terminals for respectively placing the stage in either a 1 or a 0 condition. A set of O gates 6–15, 6–16, 6–17, etc. is provided, one gate for each of the clear input terminals of the respective counter stages, while a one of a second set of O gates 6–19, 6–20, 6–21, etc. is provided for each of the set input terminals of the respective counter stages. A conductor 6–22 is connected in common to the clear O gate 6–19. Thus, conductor 6–22 provides one input to O6–19 and one input to each of 6–16, 6–17, etc. of the remaining C stages. A high Clear signal, temporarily applied to conductor 6–22 therefore places all C stages beginning with C2 into a 0 condition, while placing the initial C1 stage into a 1 condition. The counter of FIGURE 6 is adapted to step either forward in sequence, i.e., C1, C2, C3, etc. or step backwards, i.e., C3, C2, C1. To step forward a first set of A gates 6–24, 6–25, etc. are connected, one to each of the said O gates 6–20, 6–21, etc. Each of these A gates in turn has one input connected to the 1 output terminal of the immediately preceding lower numbered stage through respective short delay lines 6–27, 6–28, etc. A conductor 6–29 is connected in common to the other inputs of these A gates, and to which a high Count Forward pulse is applied via a capacitor 6–30. The output of each of these A gates also is applied to the clear O gate of the preceding lower numbered C stage. Thus, the output of A6–24 is connected to O6–15, A6–25 to O6–16, etc. This configuration of A gates permits each positive spike of the differentiated Count Forward Pulse to set to 1 that C stage whose A gate is primed by a high output from the preceding C stage. To illustrate this operation, assume that a Clear pulse is initially applied to conductor 6–22 so as to place C1 in its 1 condition and clear all other C stages to 0. A short time after C1 is set to 1, the high signal from its 1 output emerges from delay line 6–27 to make high one input to A6–24. All other A gates for succeeding C stages have low input signals due to the fact that all C stages 2, 3, etc. are in the 0 condition. Now if a Count Forward pulse is applied to conductor 6–29, the positive spike therefrom causes only A6–24 to produce a high output. The output from A6–24 is applied through O6–20 to set C2 to 1 while at the same time to clear C1 to its 0 condition via O6–15. Thus the counter is stepped from stage C1 to stage C2, with only the latter now producing a high output.

The high signal appearing at the 1 output terminal of C2 is delayed slightly by line 6–28 before being applied to A6–25. By this time, however, the positive spike of the just applied Count Forward pulse has disappeared from conductor 6–29 so as to avoid the inadvertent stepping of two or more counter stages by the same count pulse. A second Count Forward pulse is now required to energize A6–25 so as to set C3 to its 1 condition while at the same time clearing C2 to its 0 condition. In this manner, then, successive pulses on conductor 6–29 step the counter forward from stage to stage, with only one counter stage at any time being in a 1 condition.

To step backward, A gates 6–31, 6–32, 6–33, etc. are employed. Each of these has its output connected both to the set O gate of its associated stage and to the clear O gate of the next higher numbered stage. Thus, the output of A6–31 goes to O6–19 and O6–16; A6–32 to O6–29 and O6–17, and so forth. One input to each said A gate comes through a respective delay line 6–34, 6–35, 6–36, etc. from the 1 output terminal of the next higher numbered stage, as shown in FIGURE 6. The other input to each said A gate is supplied from a common conductor 6–37 adapted to receive a high Count Backward pulse via coupling capacitor 6–38. If a counter stage, as for example C3, is in its 1 condition, a positive signal is applied to one input of A6–32 through delay line 6–35. Thus, a Count Backward pulse on conductor 6–37 enables only A6–32 to set C2 to 1 while at the same time clearing stage C3. When stage C2 is set, a high signal from its 1 output is delayed just long enough by line 6–34 for said Count Backward positive spike to have disappeared from conductor 6–37. At the next following Count Backward pulse, A6–31 is now operated to set stage C1 and clear stage C2. In this manner, sequentially applied Count Backward pulses cause the chain to reverse direction and step backward, with only one stage thereof being on at any one time.

FIGURE 7 shows details of the Mode Statement translator circuit which is used in decoding the mode statement for each byte in the search register. As has been mentioned before in connection with FIGURE 1, each byte search mode is specified by a six-bit mode statement held in the MOS register. For each mode statement, the first bit position designates the type of logical connective to the previous field searches, i.e., either And represented by a 0 bit, or OR represented by a 1 bit. The next three bit positions of the mode statement, numbered 2, 3, and 4, specify the nature of the basic search mode, namely: Equality, Greater Than Or Equal; Less Than Or Equal, Between Limits, Next Higher, or Next Lower. Table 4 below shows the specific values for each mode as adopted in the present embodiment.

TABLE 4

| Mode Statement | | | Mode of Search |
|---|---|---|---|
| 2 | 3 | 4 | |
| 0 | 0 | 0 | M=SR. |
| 1 | 0 | 0 | M≤SR. |
| 0 | 1 | 0 | M≥SR. |
| 1 | 1 | 0 | Between Limits. |
| 0 | 0 | 1 | Next Higher. |
| 1 | 0 | 1 | Next Lower. |

The fifth bit position of each mode statement, when holding a 0 value, specifies a Normal search operation using the basic search criterion of bit positions 2, 3, and 4, without change. However, a 1 bit in the fifth bit position specifies a negative or Not function of said search criterion, thus $\overline{M=SR}$, $\overline{M\leq SR}$, $\overline{M\geq SR}$, etc. The last or sixth bit position of each mode statement designates that the search is to be interrupted after the byte has been searched, with the approximate number of matches then being entered into the accumulator by means of the high speed Approximate Match Counter. Thus, a 36-bit MOS register can hold 6-bit mode statements for specifying a different search to be conducted one on each of six different word bytes. An extra stage (stage 1) is included in the MOS register which, when set to 1, inhibits the generation of either the CL3 or CL4 signal at the start of a word search, so that the results of said word search can be combined with the results of previous word searches.

The mode statements held in the MOS register are associated with search register bytes (indicated by the Parameter register) in a 1-to-1 correspondence upon order of byte occurrence, starting from the high order portions of the two registers. Although there are six mode statement fields in the MOS register, only as many statements will be encoded as there are bytes to be actually searched. On the other hand, since any Search register byte may have as few as two bits therein, the 36-bit Parameter register may obviously specify up to 18 different bytes to be searched. Consequently, if more than six bytes have been specified for searching, the sixth, or last, mode statement in the MOS register is applied to all search register bytes beginning with Byte 6.

To illustrate the coding and arrangement of the values in the MOS register, consider now Example 2 below.

*Example 2*

MOS REGISTER STAGES

| | (1) | (2) | (3) | (4) | (5) | (b) |
|---|---|---|---|---|---|---|
| 1<br>0 | 2- - - -7<br>000000<br>1- - - -6 | 8- - - -13<br>001010<br>1- - - -6 | 14- - - -19<br>010000<br>1- - - -6 | 20- - - -25<br>011000<br>1- - - -6 | 26- - - -31<br>000000<br>1- - - -6 | 32- - - -37<br>000000<br>1- - - -6 |

The top row of decimal digits in Example 2 specify the MOS register positions, with the dashes indicating all stages therebetween. Thus, beginning from the left to right, MOS stage 1 contains either a 0 or a 1 value according to whether or not the current search word result is to be combined with previous search word results. Stages 2 through 7 contain the first mode statement scanned at the beginning of a search on a word. Thus, the first bit of the first mode statement (which indicates either the And or Or coupling) is placed into the MOS register stage 2, while bits 2 through 6 of the first anode statement are placed in respective MOS register stages 3 through 7. Considering now Example 2 in light of Example 1 (wherein is shown Parameter register contents specifying four bytes to be searched), MOS register stages 2 through 7 specify the search mode to be conducted on Byte 1 of the search register. Assume that the first mode statement in Example 2 is comprised of all 0's in its bit positions 1 through 6. Position 1 thus indicates that there is And coupling between the search result of this byte and the search result of the previous byte, if any, in the word. All 0 values in bit positions 2, 3, and 4 indicate that the basic mode of search is *M=SR*, which is further modified by the 0 value in bit position 5 indicating that this is a normal search. A 0 bit in position 6 specifies no interrupt at the conclusion of searching this byte.

After Byte 1 of the search register has been processed, Byte 2 thereof is scanned (in the rows indicated by the Parameter register settings) while the second mode statement in the MOS register is sensed to determine the type of search. This second mode statement occupies MOS register stages 8 through 13, inclusive, and is assumed to have values 001010 in bit positions 1 through 6 of the statement. Such a mode statement indicates And coupling between bytes, no interrupt, and with a mode to search $\overline{M\geq SR}$. The third statement in the MOS register always occupies positions 14 through 19 and will control the search performed on Byte 3 of the search register. For the assumed values shown in Example 2, the third mode statement calls for And coupling without interrupt, and a mode of search *M≤SR*. The fourth mode statement always occupies MOS register stages 20 through 25 and is used to govern the search on Byte 4 in the Search register occupying those locations or stages as specified by the Parameter register. For the assumed values shown in Example 2, this Byte 4 mode statement calls for And coupling without interrupt, and a Between Limits mode of search.

The fifth and sixth mode statements in the MOS register always occupy positions 26 through 31, and 32 through 37, respectively. If the Parameter register of Example 1 specified a fifth and a sixth byte to be searched, then the 0 values in the fifth and sixth mode statements of Example 2 would be interpreted exactly the way that the first mode statement was interpreted in stages 2 through 7. However, for Example 1 only four bytes are actually called for, which thus means that the contents of MOS register stages 26 through 37 will be ignored on the search. If the Parameter register specifies more than 6 bytes to be searched, then the last mode statement in the MOS register, occupying positions 32 through 37, is used as the mode statement for all remaining Search register bytes.

In FIGURE 7, six different groups of six A gates each are employed to transfer in parallel the six bits of only one mode statement at a time to a set of six O gates 7–10 through 7–15, respectively. Thus, a first group of A gates 7–16 through 7–21 each have one input terminal thereof connected to a 1 output terminal of the respective MOS register stages 2 through 7. Each of a second group of A gates 7–22 through 7–27 respectively has one input terminal connected to the 1 output terminal of individual MOS register stages 8 through 13 containing the second mode statement. In similar fashion, third, fourth, and fifth groups of A gates (not shown) are connected to respective MOS register stage groups 14–19, 20 through 25 and 26 through 31. A final group of six A gates 7–46 through 7–51 likewise transfer in parallel the contents of MOS register stages 32 through 37 to respective O gates 7–10 through 7–15. Only one of these six groups of transfer A gates is conditioned at any one time to thereby sample only one of the mode statements. This conditioning is performed by a six stage counter 7–52 constructed according to FIGURE 6 (but without need for the reverse counting gates), with the output from each counter stage going to a different group of transfer gates to there be applied to the second input terminal of each A gate therein. Thus, stage C1 of counter 7–52 permits A gates 7–15 through 7–21 to sample the contents of MOS register stages 2 through 7 and thus pass the information held therein to O gates 7–10 to 7–15. When counter 7–52 is stepped so that the output from stage C2 goes high while that from stage C1 goes low, the second group of A gates 7–22 through 7–27 is enabled to transfer the second mode statement to said O gate group. In this way each mode statement in the MOS register can be sampled in sequence according to the particular SR byte currently being searched. The actual means for generating count pulses applied to the Count Forward lead of counter 7–52 is by A7–53 which requires the presence of all four signals Odd Permit MOS Step, Odd Step MOS, Even Permit MOS Step, and Even Step MOS in order to produce a high output therefrom. When the output from A7–53 first goes high, its leading edge is differentiated by capacitor 6–30 in the Count Forward line 6–29 (FIGURE 6) so as to step the counter one stage in the forward direction, e.g. from C1 to C2, or from C2 to C3, etc. Thereafter, as long as the output from A7–53 remains high, no further stepping occurs because of the disappearance of the positive differentiated spike from the Count Forward line. If the output from A7–53 later disappears due to one or more input signals going negative, then the leading edge of a subsequent high output from A7–53 permits counter 7–52 to once again step one stage forward.

It will be noted that the output from stage 1 of the MOS register need not be gated by the MOS counter 7–52. When this stage contains a 0 value, control circuits subsequently to be described permit generation of either the CL4 of CL3 signals to the Word Match Logic circuits at the start of a search on a word. If this stage contains 1, then generation of either of these two signals is inhibited so that the result of the entire word search can be combined with the results of one or more previous word searches.

The outputs from O gates 7–10 to 7–15, from which appears only one of the six mode statements contained in the MOS register, must now be translated in order to provide the control signals used in actually conducting the search on the currently designated search register byte. O gates 7–10 to 7–15 respectively generate signals indicating the bit values in positions 1 through 6 of the mode statement. Thus, a low output from O7–10 signifies a 0 value in position 1 of the statement, which in turn represents an And logical connection between bytes of the same word. Such a low signal is inverted by I7–54 to produce a positive And signal eventually applied by the respective Odd and Even column control circuits to A4–31 in each of Word Match Logic circuits whose details are shown in FIGURE 4. On the other hand, a 1 value in bit position 1 of the mode statement requires a logical Or connection between bytes of the same word, so that the resulting high signal from O7–21 becomes the OR signal which ultimately is applied via the Odd and Even column control circuits to A4–32 in each of the Match Logic circuits.

The basic mode of search function, as held by bit positions 2, 3, and 4 of the mode statement, is decoded by the logic gates next to be described. I gates 7–55, 7–56, and 7–57 are used to provide complement signals of the outputs of O7–11, 7–12, and 7–13, respectively. A7–58 has three inputs, all from these I gates, such that when each O gate 7–11 through 7–13 has a low output therefrom (indicative of 0 values in positions 2, 3, and 4), A7–58 produces a high output $M=SR$ which in turn eventually becomes the Odd $M=SR$ and the Even $M=SR$ control signals applied to A gates 4–10 and 4–11 in the respective Odd and Even Word match logic circuits. A7–59 has one-input from O7–11 and two inputs from I7–56 and I7–57. This means that a 1 in position 2 and 0's in positions 3 and 4 cause A7–59 to produce a high output indicative of the $M\leqslant SR$ basic search function.

A7–62, by virtue of inputs from O7–12, I7–55, and I7–57, produces a high output $M\geqq SR$ only for values 010 in respective bit positions 2, 3, and 4 of the mode statement. The high output from A7–62 is eventually applied to the Word Match Logic circuits at A gates 4–14 and 4–15 therein. A7–65 has inputs from I7–57, O7–11, and O7–12 so as to respond to bit value 110 in respective positions 2, 3, and 4 in order to generate a high output BL indicating a Between Limits mode of search. The direct output from A7–65 is used by other circuitry to ultimately generate the BL1 signal applied to A4–30 in each match logic circuit. A7–67 and A7–68 respectively decode values 001 and 101 in positions 2, 3, and 4 in order to generate Next Higher (NH) or Next Lower (NL) control signals, which are utilized in controlling the two field passes required for either of these searches. The high output from O7–15 becomes the signal Interrupt.

O7–14 gates the bit value in position 5 of the mode statement which, when 0, indicates a normal search, and when 1 indicates the Not function. I7–69 inverts a low output from O7–14 in order to generate a high signal which is applied to one input of each of two A gates 7–70 and 7–71. The output of O7–14 is directly connected to one input of each of two A gates 7–72 and 7–73. The output from O7–10 is also directly connected to A gates 7–71 and 7–72, while another inverter circuit I7–74 receives the O7–10 output in order to apply a signal to inputs of gates A7–70 and A7–73. An O gate 7–75 receives inputs from A7–70 and O7–72 in order to produce a high Normal signal which eventually becomes the Odd Normal and Even Normal signals applied to the word match logic circuits. A second O gate 7–76 receives inputs from A7–71 and A7–73 to generate a high Not signal ultimately applied to the Odd and Even word match logic circuits. The operation of this configuration of gates is as follows. Whenever a mode statement calls for an And logical connection, the resulting high output from I7–74 permits the generation of either the Normal or Not signals corresponding directly to the bit value held in the fifth position of the mode statement. Thus, if a 0 value is held therein, the output from O7–14 is down which in turn makes high the output of I7–69 now transferrable via A7–70 and O7–75 to generate the high Normal signal. Conversely, a 1 bit in the fifth position of the mode statement makes high the output of O7–14 which can be transferred through A7–73 to eventually become the high Not signal. However, when a logical Or connection is called for by the mode statement for any of the $M=SR$, $M \leqslant SR$, and $M \geqq SR$ searches, then a different operation occurs. The output of O7–10 is high for said logical Or function so as to effectively complement the value held in the fifth position of the mode statement. Thus, when the output of O7–10 is high, a low output from O7–14 (indicative of a normal mode of search) is transferred via I7–69, A7–71, and O7–76 to become a Not signal. Similarly, a high output from O7–14, indicative of a Not search is transferred via A7–72 and O7–75 to become a Normal signal. As will be subsequently observed during the later discussion of FIGURE 9, the above described interchange of the FIGURE 7 Normal and Not signal generation for a mode statement with Or coupling automatically provides Odd Normal and Odd Not signals at proper times to the odd column Word Match Logic circuits (and Even Normal and Not signals to the even column match circuits) in order to effect the operation of FIGURE 4 previously discussed.

As has heretofore been described, the disclosed embodiment of the invention requires different byte scanning speeds according to the mode of search called for. For any basic $M=SR$ search, this scanning rate is 0.1 microsecond per byte row, whereas for any basic $M \leqq SR$ or $M \geqq SR$ search, said scanning rate is 0.2 microsecond. A7–71 has inputs from I7–55, I7–56 and I7–57 for producing a high output signal Enable 0.1 μsec. only when the basic mode of search is $M=SR$ as specified by 0 values in the positions 2, 3, and 4 of the mode statement. For any other 3-bit configuration in Table 4, A7–71 will have one or more inputs low to prevent generation of this signal. Instead, I7–72 inverts a low output from A7–71 to generate the Enable 0.2 μsec. signal.

FIGURE 8 shows details of the Odd column drivers for searching each row of the odd Memory columns. An identical circuit (not shown in detail) is provided for driving the rows of the even numbered Memory columns, except that certain of its input control signals are labelled with an Even prefix, rather than Odd as in FIGURE 8, because then origin is from the Even Column Control unit. In FIGURE 8, each row, as for example row 1, has a pair of drivers circuits D8–10 and D8–11, one for each opposite current polarity necessary in searching for a 1 or a 0 bit as specified by the Search word in the Search register. When energized, the driver 8–10 in row 1 causes a current in the row 1 winding which drives all odd numbered Memory column elements (or even numbered) inductively coupled therewith to a 1 condition, whereas driver 8–11 in row 1 generates a current of opposite polarity for driving said elements to a 0 flux condition. Each said driver is selectively energized by respective A gates 8–12 and 8–13. Each said A gate requires in turn three high inputs before it energizes its respective driver. One such input for each comes from the 1 output terminal of stage 1 (for row 1 in FIGURE 8) in the Mask register. The signal MR1 is high only when row 1 is to be actually searched even though said row may be included as part of a byte as specified by the Parameter register. A second input common to each A gate 8–12 and 8–13 is provided by the 1 output terminal of flip-flop 8–14. When the basic $M=SR$ or $M \leqslant SR$ search is conducted, the row drivers are energized in turn until all drivers for the byte (except those for bits which are masked) are on. This function is provided by A8–17 via O8–15 which responds to Odd Search pulses applied from FIGURE 9 at the frequency of the byte scan required for a particular mode of search. The corresponding pulses in the aforementioned Even Column Row drive circuit is labelled Even Search. Furthermore, a constantly applied Enable Set Odd Signal (or Enable Set Even) from FIGURE 9 is present for the entire byte search so as to permit the passage through A8–17 of one of the Odd search pulses. A third input to A8–17 is applied by a high signal OD1 coming from stage 1 of an Odd bit counter to be described in connection with FIGURE 9. In brief, stages of the Odd bit counter in FIGURE 9 are turned on and off sequentially so that there is only one OD signal applied at any one time. In the Even Column Control unit, an identical Even bit counter generates ED1, ED2, etc. signals for the aforementioned Even Column drivers. After the basic mode of search has been conducted, a Clear Odd signal (Clear Even) is applied to O8–16 which clears FF8–14 to its 0 condition in the event that it had been set to 1 during the byte search. When a basic $M \geqq SR$ search is conducted, however, the technique is to first turn on all row drivers of the byte and then sequentially turn them off. Therefore, Set Odd pulse (Set Even) is first applied to O8–15 setting FF8–14 to its 1 condition and energizing one of its drivers 8–10 or 8–11 according to the search register bit value, as will hereafter be described. An Enable Clear Odd signal is continuously applied to A8–18 for this search and permits said gate to pass through one Odd Search pulse in order to clear FF8–14, if at that time the OD1 signal is present.

Normally, the particular driver 8–10 or 8–11 which is actually energized when FF8–14 is set to 1 is determined by the true value of the Search register bit found in the correspondingly numbered row. Thus, a third input to A8–12 comes from O8–19 which in turn is provided one input from A8–20 and another input from a lead upon which can appear a high signal Change SR To 1. One input to A8–20 is from the 1 output terminal of the Search register stage 1 such that for a 1 value held therein, a high signal SR1 is applied to A8–20. I8–21 also applies an input to A8–20 in response to the absence of (low) signal Change SR To 0. For A8–13, O8–22 responds to A8–23 as well as to a high signal Change SR To 0. A8–23 in turn has one input connected to the 0 output of the Search register stage 1 so that a high signal $\overline{SR1}$ appears for a 0 value in said stage. I8–24 also applies a high input to A8–23 in the absence of the signal Change SR to 1. For most conditions, the signals Change SR To 0 and Change SR To 1 are absent (low) so that outputs from I8–21 and I8–24 are high. Consequently, the enabling of A8–12 will, in this case depend upon a 1 value being present in Search register stage 1, while the enabling of A8–13 depends upon a 0 value therein. As has been explained, however, in connection with the Next Higher and Next Lower searches, there may be times when it is necessary to search subsequent rows in a byte with all Search word values therein effectively equal to 0 (for the case of the Next Higher search) or equal to 1 in the case of the Next Lower search. When such an occasion arrives, as for example the requirement to change the Search word bits to 0, then I8–21 receives a high signal Change SR To 0 which thereupon prevents A8–20 from going high. Since the Change SR To 1 lead remains low, O8–19 has no output therefrom which therefore prevents any energizing of D8–10. The high Change SR To 0 signal is applied directly to O8–22 to permit the enabling of A8–13. The opposite condition occurs when the Change SR To 1 signal is present, since this prevents A8–23 from responding to any Search register bit 0 and in turn drives O8–19 to cause a search for a 1 in the row 1.

As will be observed in FIGURE 8, details of each of the row driving circuits 2 through 36 are identical to details of row 1, except that the Search register and Mask signals applied to each have stage numbers corresponding to row numbers. Furthermore, the OD signal applied also has a number corresponding to the row number. Therefore, a detailed description of each of the remaining row driver circuits will not be given. FIGURE 8 further shows the driver for row 37 which is inductively coupled to the Odd Memory column film elements having a permanent condition of magnetization and which are used for the Not searches in providing indications of equality in FIGURE 4. This driver circuit is less complex than the circuits for rows 1 through 36, since it is always driven to search for the same predetermined bit value here assumed to be 0. Furthermore, FF8–26 is only operated at the end of a search on a byte whose mode statement calls for a Not function. Otherwise, it remains in its 0 condition throughout the entire byte search. O8–27 is supplied in part from A8–28 which in turn is responsive both to the Set Odd signal applied to the other driver circuits, as well as to an Odd Not or Even Not signal from FIGURE 9). This Odd Not signal only appears when the mode statement calls for a Not function, so that for a basic $\overline{M{\geqq}SR}$ search, A8–28 permits the setting of FF8–26 to 1 along with the setting of the other driver flip-flops 8–14 in each of the rows 1 through 36. For a normal $M{\geqq}SR$ search, however, the Odd Not signal is absent, thus preventing the Set Odd pulse from placing FF8–26 in its 1 condition. O8–27 further has an input from A8–29, two of whose inputs in turn are the Odd Search pulse and the Enable Set Odd signal provided to each gate A8–17 in the other rows. The third input to A8–29 is an OD37 signal from FIGURE 9 which is only temporarily applied at the conclusion of a byte search for which a Not function is required. Otherwise, OD37 is absent, thus preventing any setting of FF8–26 by A8–29. O8–30 is used to clear FF8–26 to 0 and is provided with the same Clear Odd signal used in the other driver circuits. It is also provided with the output from A8–31 having as two of its inputs the Odd Search and Enable Clear Odd signals, as well as the OD37 signal.

FIGURE 9 shows details of the Odd Column Control unit used both for energizing in sequence the Odd column row drivers of FIGURE 8, as well as for providing control signals used in the Odd column match logic circuit of FIGURE 4. Identical circuits provided for the Even Column Control unit except that the output signals provided therefrom are labelled with the prefix Even rather than Odd. A 37 stage Odd bit counter 9–10 is employed to select the Memory row to be searched. The output lead from each of its stages C1, C2, C3, etc. is individually connected to the pair of A gates 8–17 and 8–18 in FIGURE 8 associated with drivers for rows 1, 2, 3, etc. Consequently, it is only when the given stage of the bit counter 9–10 is set to 1 that a driver of a corresponding row can be energized in order to search for a given Search word bit. Counter 9–10 is of the construction indicated in FIGURE 6 and includes both Count Forward, Count Backward, and Clear input lines. The output of A9–11 is applied to the Count Forward line such that each leading edge of a positive pulse therefrom permits the counter to be stepped on to the next higher adjacent stage.

As has heretofore been described, the byte translator in FIGURE 5 provides static output signals BB (Begin Byte) and EB (End Byte) indicating the Search register locations which hold values in bytes to be searched. Means are therefore provided to correlate the state of bit counter 9–10 with these BB and EB signals so as to determine when any given memory row, either currently being scanned by counter 9–10 or just having been scanned, is a beginning of a byte or an end of a byte, respectively. Each of a set of A gates 9–14 through 9–48 is individually responsive to a respectively different one of the BB1 through BB35 byte translator signals, as well as being connected to an individual one of the bit counter stages 1 through 35, respectively. Thus, A9–14 produces an output only when C1 of the counter is on and there is a BB1 output from the byte translator. Similarly, A9–15 produces an output only for a C2 counter stage and the presence of a BB2 signal (indicating that the Search register stage 2 is the beginning of a byte). All outputs from A gates 9–14 through 9–48 feed into O9–49 whose output in turn becomes high for a high input thereto from any one of said A gates.

Each of a second set of A gates 9–50 through 9–83 receives an individual one of the EB signals 2 through 35, respectively, as well as an individual one of the bit counter stage signals C3 through C36, respectively. The outputs from these A gates feed into O9–84 whose high output in turn therefore indicates that a complete byte has just been scanned. The correspondence of the EB signals with the C stages of the bit counter is such that the end of byte signal from O9–84 actually does not occur until the bit counter has stepped one row past the row in which the lowest order byte value is stored. For example, assume that the lowest order bit in the first Search word byte is located in Search register stage 3. The Parameter register causes the Byte translator to produce the EB3 signal. When counter 9–10 begins its scan, it sequentially steps through stages C1, C2, and C3 so as to permit successive searching of rows 1, 2, and 3. However, the counter must be stepped to C4 before A9–51 produces a signal now indicating that the first byte terminates at row 3.

In order to determine when O9–49 is to be sensed for the presence of an output indicating the beginning of a byte, and also to indicate when O9–84 is to be sensed for an output indicating the end of a byte, a control flip-flop 9–85 has its 1 output terminal connected to A9–86, and its 0 output connected to A9–87. A9–86 in turn has another input from O9–49 and a third input from the 0 output terminal of a second control flip-flop 9–88. Normally, flip-flop 9–88 is in its 0 condition except when counter 9–10 begins to count backward in preparation for a second pass through the same byte during a Next Higher or Next Lower search. Thus, the signal from the 0 output terminal of FF9–88 normally is high, thus making A9–86 dependent only upon the state of FF9–85 in order to pass the output of O9–84. When FF9–85 is in its 0 condition, the output from the latter gate passes through A9–87 to further control circuits.

A third control flip-flop 9–89 is used to determine when the outputs from the MOS translator circuit should be gated into the Odd column control circuit configuration for controlling the conduct of a byte search. FF9–89 is set to 1 whenever a "beginning of byte" row is detected by A9–86. When in its 1 condition, FF9–89 provides one high input from its 1 output terminal to each of a group of A gates 9–90 through 9–97 which in turn further receive signals from FIGURE 7. When enabled by FF9–89, A9–90 normally passes a Not signal appearing thereto; A9–91 the Interrupt signal; A9–92 the $M{=}SR$ signal; A9–93, the $M{\leqq}SR$ signal; A9–94 the $M{\geqq}SR$ signal; A9–95 the NL signal; A9–96 the NH signal; and A9–97 the Normal signal. Two other A gates 9–161 and 9–162 also respectively pass the And and Or signals in response to the high FF9–89 output. The outputs from A gates 9–90, 9–97, 9–94, 9–93, 9–92, 9–161, and 9–162 are, for the most part, labelled with the same names as their respective inputs but further include the prefix Odd. In the Even Column Control unit, identical gates would have outputs prefaced with Even. The output of A9–97 is actually first gated via O9–163 before becoming the Odd Normal signal, since another input to O9–163 can be applied from A9–164 in order to generate said signal whenever the extra matrix row 37 is searched during a $\overline{M{=}SR}$ or $\overline{M{\leqq}SR}$ mode. I9–165 also inverts A9–164 to disable A9–60 at this time. An O gate 9–166 actually receives the output from A9–94 as well as that from A9–96 in order to generate the Odd $M \geqq SR$ signal during a Next Higher search. Similarly, since the Odd $M \leqq SR$ signal must be produced during a Next Lower search. O9–167 gates through the output from both A9–93 and A9–95. It should further be noted that the signal $M \geqq SR$ is applied through an O gate 9–168 to A9–94, with O9–168 also being responsive to the BL signal in order to generate the Odd $M \geqq SR$ signal during a Between Limits search. In the Even column control circuits, the corresponding gate O9–168 is instead connected to the input of the corresponding A9–93 gate, and the signals $M \leqq SR$ and BL are applied to the Even gate O9–168 so that the signal Even $M \leqq SR$ is generated during the Between Limits search.

The high signal from the 1 output terminal of FF9–89 is also applied to A9–98 and A9–99 which respectively receive the .1 µsec. search pulses and the .2 µsec. search pulses from the indicated sources in FIGURE 1. However, before either A9–98 or A9–99 is completely enabled to pass one or the other of said pulse frequencies, one of the appropriate Enable .1 µsec. or Enable .2 µsec. signals from the MOS translator must also be present. The outputs from A9–98 and A9–99 are applied via O9–100 to each of two A gates 9–101 and 9–102. Before being applied to A9–101, however, the output O9–100 is delayed by element 9–103 for approximately 1 µsec. Only one of the A gates 9–101 and 9–102 can be enabled for any search mode, according to whether or not any basic $M \geqq SR$ search is being conducted in the Odd columns. If such a search is being conducted, then O9–166 produces a high output which permits only A9–101 to pass the 0.2 µsec. search frequency pulse train. An inverter I9–104 prevents enabling of A9–102 at this time. Otherwise, the output from O9–166 is down to disable 9–101 and thereby permit only A9–102 to pass the search frequency pulses (which will be either the .1 µsec. or the .2 µsec. pulses depending upon whether or not an Equality ($M=SR$) search is called for. The outputs from A9–101 and A9–102 are applied via O9–105 to the Odd Search Pulse conductor leading to FIGURE 8. Consequently, as long as FF9–89 remains in its 1 condition, one of the two search frequency sources is connected to sequentially apply pulses which perform the actual setting to 1 or clearing to 0 of the Odd Column Row driver flip-flops 8–14 according to which particular stage of bit counter 9–10 is activated. The output from O9–105 is further applied to A9–106 (normally enabled except for the row 37 search during the Not modes) whose output in turn is directed to a delay element configuration comprised of A9–107 and a delay line 9–108. One path for each search pulse is through said delay line to one input of A9–107, while the other path is directly to the other input of A9–107. Thus, the leading edge of a search pulse in said other path arrives at A9–107 ahead of the leading edge travelling through delay line 9–108. A9–107 therefore cannot be energized until the search pulse leading edge from delay 9–108 arrives, at which time the output from A9–107 goes high. Consequently, the appearance of the leading edge of the output from A9–107 is delayed relative to the signal appearing from A9–106 by an amount equal to the delay encountered in line 9–108. At the trailing edge of the search pulse from A9–106, A9–107 immediately goes low.

The clipped pulse from A9–107 is applied via O9–12 to A9–11 in order to step the bit counter 9–10 to its next higher C stage. Delay 9–108 is adjusted so that this bit counter change in state by any given search pulse occurs after said given search pulse has already been applied to FIGURE 8 to there cause a search of that row indicated by the counter before its said change. A9–107 is also connected to the 0 side of FF9–85 so that this flip-flop can be set to its 0 condition by the first search pulse to appear after the byte beginning has been detected. Once FF9–85 is cleared, A9–87 is enabled to look for the end of the byte, while A9–86 can no longer respond to a beginning of byte indication from O9–49.

As has heretofore been described, for any basic $M=SR$ or $M \leqq SR$ search, all row driver flip-flops of the byte searched are initially in their 0 condition and then are sequentially turned on at the time that their respective rows are to be searched. If either A9–92 or O9–167 produces a high output upon the setting of FF9–89, O9–109 applies the Enable Set Odd signal to A gates 8–17 such that when an Odd Search pulse from O9–105 appears to this figure, that driver flip-flop whose A8–17 also receives a signal from an energized counter stage will now be set to its 1 condition. On the other hand, for any basic $M \geqq SR$ search, it is first necessary to simultaneously turn on all of the byte row drivers and then to sequentially turn them off as their associated rows are searched. When FF9–89 is first set on, any output from O9–166 immediately causes a Single Shot circuit 9–110 to apply a short Set Odd pulse, simultaneously setting all driver flip-flops to the 1 condition. Since A9–101 also is enabled for any output from O9–166 so that the first search pulse through O9–100 is delayed approximately 1 µsec. before being applied to FIGURE 8. Furthermore, the output 09–166 is applied to the Enable Clear Odd conductor in FIGURE 8 so that each Odd Search pulse can clear that driver flip-flop whose A gate 8–18 also receives a high input from an energized bit counter stage.

As long as FF9–89 remains in its 1 condition, search pulses continue to be applied sequentially to the Odd Search conductor, with each search pulse then shortly thereafter stepping bit counter 9–10 to the next higher stage. Eventually the bit counter will be stepped to a stage which causes one of the A gates 9–50 through 9–83 to produce a high output therefrom. Since the first search pulse for a byte has previously cleared FF9–85 to its 0 condition, A9–87 is now permitted to gate through the output from O9–84 to O9–111, from where it is applied to A9–12. If a control FF9–170 is in its 0 condition, then A9–112 permits the end of byte signal to be applied to a variety of locations. First, the Clear Odd signal is taken from A9–112 to place all row driver flip-flops in FIGURE 8 to the 0 condition, since by this time the byte search has been completed. A9–112 further is applied to a delay and clipping configuration comprised of A9–113 and delay line 9–114 which operates in a manner identical with the operation of A9–107 and A9–108, i.e., the leading edge output from A9–113 is delayed relative to the appearance of the leading edge from A9–112. The output from A9–113 clears FF9–89 to 0 and at the same time is applied as the Odd Step MOS signal to A7–53 in the MOS translator. However, the Odd Step MOS signal cannot by itself cause the MOS counter 7–52 to change, since A7–53 requires an identical Even Step MOS signal from the Even Column Control circuits before it produces a high output therefrom. In this way the Odd column and Even column control circuits are synchronized at the end of each byte search so that they can commence searching the next byte at the same time. As soon as FF9–89 is cleared to 0, no more search pulses enter by way of A9–98 or A9–99. The clearing of FF9–89 is accomplished between the appearance of that search pulse, which steps bit counter 9–10 to the stage wherein O9–84 produced a signal, and the appearance of the next following search pulse. Consequently, when bit counter 9–10 steps to a stage whereby an end of byte indication is made, it remains there until the Odd Column Control circuits are ready to determine if the row indicated by said stage is one wherein the next byte also begins.

A9–113 is further connected to A9–171 through a delay configuration comprised of A9–115 and a 1 µsec. delay line 9–116. This delay configuration operates such that the leading edge of the high output from A9–113 is delayed approximately 1 µsec. before it arrives at one input of A9–171 where it is there called the Odd EBS Sense signal also applied to a corresponding A gate 9–171 in the Even Column Control unit. A9–171 in FIGURE 9 requires a similar Even EB Sense signal from the Even Column Control unit so as to synchronize the Odd and Even units to start searching for the next byte at the same time. A9–171 further has an input from the 0 output terminal of the control flip-flop 9–117 which normally is 0 unless bit position 6 of the mode statement requires an Interrupt operation after the byte has been searched. The output from A9–171 is used to set FF9–85 to its 1 condition in order to enable A9–86 and once again commence searching for a beginning of byte signal from O9–49. Thus, when FF9–85 is set to 1, A9–86 becomes active, while A9–87 becomes disabled and thus no longer produces a high output therefrom. If the stage of bit counter 9–10, whose activation provided the EB signal from O9–84, also specifies a row having the beginning of the next byte, then O9–49 is producing a high output signal at the time that FF9–85 is set to 1. Consequently, A9–86 immediately responds to once again set FF9–89 and so gate in the mode of search signals from FIGURE 7 which, by this time, are derived from the next following mode statement because of the now changed state of the MOS counter 7–52. Thus, searching of the next byte commences immediately so that the entering search frequency pulses via either A9–98 or A9–99 permit the stepping of the counter 9–10 until an EB signal is once again generated at the row following the final row of said next byte. On the other hand, if there are one or more search register stages separating the end of one byte and the beginning of the next, O9–49 does not have a high output at the very time that FF9–85 is set to 1. Means are therefore provided to continuously step the bit counter 9–10 until one of the A gates 9–14 through 9–48 goes high, thus indicating the beginning of the next byte. For example, A9–118 is enabled for a 1 condition of FF9–85 and a 0 condition of FF9–89 to transmit to O9–12 a serial train of high speed count pulses. These count pulses, when applied to A9–11, cause the bit counter 9–10 to sequentially step from stage to stage at a high rate until a stage thereof is finally set and causes an output from O9–49, whereupon FF9–89 is immediately set to 1 to prevent any more high speed pulses from passing through A9–118. From that point on, the stepping of bit counter 9–10 is governed by the search frequency pulses entering via A9–98 or A9–99.

The function of control flip-flop 9–117 will now be described. Whenever position 6 of a mode statement has a 1 value therein, this calls for an interrupt at the end of the byte search. Thus, when FF9–89 is set to 1 at the beginning of a byte search, it gates in the Interrupt signal via A9–91 which is applied to one input of A9–172. When the EB signal is finally generated at the end of this byte search, A9–172 now is enabled by the output from A9–112 to set FF9–117. This disables A9–171 which in turn prevents FF9–85 from being set to 1 to sense the beginning of the next byte. Also, an Odd Enable Approximate Match signal is generated which, when combined in the App. Match Counter with its counterpart Even Enable Approximate Match signal, permits this unit to operate. Consequently, both flip-flops 9–85 and 9–89 remain in their 0 condition at the conclusion of this byte search to prevent any further stepping of bit counter 9–10 until a start pulse is received from Unit control. This Start pulse clears FF9–117 to 0 and sets FF9–85 to 1 so as to commence the search for the beginning of the next byte.

As has heretofore been described, whenever any Not mode of search is conducted, it is necessary to search the extra Memory row 37 at the conclusion of a byte in order to provide for the condition of identical bits as has been explained in connection with FIGURE 4. This function is carried out in the following manner. FF9–170 is in its 0 condition for any search other than a Not function. If position 5 of the mode statement contains a 1 value, then the Not signal from the mode statement translator is gated via A9–90 to A9–119 of FF9–170. FF9–85 remains in its 1 state until the first search pulse has been applied to the selected row, and A9–119 sets FF9–170 to 1 as soon as FF9–89 goes to 1. When FF9–170 is set, the now low signal appearing from its 0 output terminal disables A9–112 to prevent its passing any subsequent output from O9–84, A9–87 and O9–111. However, an EB output from O9–84 does apply, via A9–87 and O9–111, a high signal to one input of each of the A gates 9–120 and 9–121. A9–121 also receives a now high input from FF9–170. The high output from A9–121 is applied to A9–164 whose output in turn becomes high if either a $\overline{M=SR}$ or $\overline{M\leq SR}$ search is being conducted, as indicated by O9–109. Thus, the Odd Not signal is changed to Odd Normal for the extra row 37 search. A9–121 is further enabled to generate the OD37 signal and thus permit the next following search pulse, which is that pulse occurring subsequent to the search pulse which stepped bit counter 9–10 to an EB condition, to be gated through either A8–29 or A8–31 and change the state of the driver flip-flop 8–26 for row 37. However, this additional search pulse fails to step bit counter 9–10 at this time because A9–106 is disabled by the resulting low output from I9–122 whose input is connected with the output of A9–121. This additional search pulse is also delayed by a delay line element 9–123 and then applied to A9–120 which now operates to clear FF9–170 and so permit A9–112 to apply the EB signal from O9–84 to the other circuits in order to clear them as has been described. By the time that FF9–170 is cleared to 0, the said additional search pulse has disappeared from the input of A9–106 so that there is no chance that the bit counter 9–10 may be inadvertently stepped forward from its stage at which the EB signal is produced.

The next following portion of the Odd Column Control unit to be described deals with the generation of the control signals for the Word Match Logic circuits, followed by the means for modifying the operation of the row scanning procedure in order to accomplish a second pass through the same byte in the case of a Next Higher or a Next Lower search. At the beginning of a word search, the Unit Control section transmits a Clear signal which sets FF9–124 to its 1 condition. The 0 output terminal of FF9–124 is connected directly to one input of A9–125, and to its other input through a delay line 9–126 and I9–127. Thus, as FF9–124 is switched from its 1 condition back to its 0 condition (which occurs just prior to time T1, FIGURE 12, in a manner subsequently described) the leading edge of the high signal appearing from its 0 output terminal is immediately applied to A9–125. I9–127 produces a high output unless it receives a high input thereto from delay line 9–126. However, the leading edge of the high signal from FF9–124 is delayed by 9–126 before being applied to said inverter so that for a short period of time immediately subsequent to the clearing of FF9–124, A9–125 produces an output signal which terminates when the output of delay 9–126 finally goes high. This short pulse from A9–125 is applied to A9–128 and A9–129. If the first bit position of the mode statement requires an And coupling function, then A9–128 is enabled to pass the short pulse from A9–125 and thereby produce the Odd CL4 signal. On the other hand, if the first bit position of the mode statement requires an Or logical connection, then A9–129 is enabled to generate the short pulse Odd CL3. As will be recalled, the Odd CL4 pulse initially sets the Match flip-flop to 1 in each Odd match logic circuit, while the Odd CL3 pulse initially clears said flip-flops to 0. However, if the first stage of the MOS register contains a 1, this specifies that the particular state of each Match flip-flop should not be changed at the start of the word search so as to permit combining the results of said word search with the results of one or more previous word searches. Thus, the Inhibit signal from the MOS translator in FIGURE 7 is inverted by I9–130 to disable both A9–128 and A9–129 from producing their said indicated output signals.

The clearing to 0 of FF9–124 is accomplished by a delayed signal from A9–169 whenever the first search pulse is generated after the first BB signal of the word is detected from O9–49 via A9–86. As will be recalled, the signal BB from A9–86 sets FF9–89 to thereafter permit applications of search pulses to the row drivers. A delay line 9–131 is included in this clear input circuit for FF9–124 whose value is about equal to the time between T0 and T1, such that FF9–124 is cleared to 0 just prior to the T1 time thus producing either the CL4 or CL3 signal if required.

In order to produce the Odd CL1 signal, which initially maintains the Enable flip-flop 4–26 in each Odd match logic circuit in its 0 condition until such time that the sense line signals appear, a flip-flop 9–132 is employed which is set to 1, via O9–173, both at T0 time (by A9–169) and also at either T3 or T4 time (by an EB signal from A9–112). The high signal from its 1 output terminal is labelled Odd CL1. FF9–132 also is used to generate the Odd CL2 signal which, for the case of *M=SR*, is present during the entire time between T1 and T3, but for any other search mode (including all Not searches) is only a short pulse at time T1 (or time T2) which initially sets the Enable flip-flop 4–26 to its 1 condition. The output terminal of FF9–132 is connected to A9–133, one of whose other inputs is the Odd *M=SR* signal from A9–92. A9–133 also receives the Normal signal which is down for any Not search. A9–134 receives the 0 output signal of FF9–132 both directly and via a delay line 9–175 and I9–174. A9–133 and A9–134 both feed into 09–135 whose output in turn is applied to A9–136 for generating a high Odd CL2 signal only in the presence of a high output from I9–137 (always the case except for the start of a second pass through the same byte). FF9–132 is returned to its 0 condition by application of the first search pulse to be generated from O9–105 after FF9–89 has been set to 1. This search pulse is applied to a delay line 9–138 equal to the time required between the initial driving of a row and the appearance of any significant active sense line signal caused thereby. Thus, FF9–132 is cleared to 0 at approximately time T1 or T2 (according to the particular mode of search) and in so doing applies a high output to A gates 9–133 and 9–134. While the mode of search is *M=SR*, then A9–133 continuously generates the Odd CL2 signal between times T1 and T3. On the other hand, for any other mode of search A9–133 is disabled, and only a short pulse appears from A9–134 immediately subsequent to the clearing of FF9–132. The length of the short pulse is, of course, determined by the length of delay 9–175 which operates to terminate the output of A9–134 as soon as the leading edge of the high signal from FF9–132 reaches the input of I9–174. After FF9–132 has been cleared to 0, the next following EB signal sets it to 1, either at T3 or T4 depending upon the mode of search, to again generate the Odd CL1 signal as shown in FIGURE 12.

The remaining circuits in FIGURE 9 are used to control the Next Higher or Next Lower search modes of operation, including the second pass through the byte as required. For the first pass through the byte, a control flip-flop FF9–140 is normally in its 0 condition to permit, via I9–137, A9–136 to generate the Odd CL2 signal for the required *M≧SR* or *M≦SR* search. During said first pass any signal from either A9–96 or A9–95 is applied to O9–141 whose output in turn is applied to A9–142. The 0 output of FF9–140 is also coupled to A9–142 through a delay line 9–143. At the conclusion of the first pass through the byte, the now appearing EB signal from A9–112 enables A9–142 to set FF9–140 to 1. However, once FF9–140 has been so set, any subsequent EB signal to A9–142 prevents an output therefrom. The high signal now appearing from the 1 output terminal of FF9–140 is applied through a delay line 9–144 to one input of A9–145 also responsive to a high output from 09–141 and an EB signal. However, by the time that the leading edge of a high signal appears from the output of delay line 9–144 to one input of A9–145, FF9–89 will have been cleared by said EB signal so as to make low all inputs to O9–141. This means that FF9–140 remains set at 1 for the entire second pass through the byte, since by the time FF9–89 is set to 1 for the second pass, the EB signal will have disappeared from the input to A9–145.

When FF9–140 is set to 1 by the EB signal appearing from A9–112 at the end of the first pass, the immediate disappearance of the Permit MOS Step signal prevents gate A7–53 from responding to the high outputs from A9–113 in both Odd and Even Column Control units which appear just shortly after the setting of FF9–14. Consequently the mode of search counter 7–52 decodes the same mode statement as was decoded during the first pass through the byte. The output from A9–142 (used to set FF9–140) is also applied to the 1 input terminal of a flip-flop 9–146 whose state controls whether the bit counter 9–10 is allowed to count forward or count backward. For any mode of search other than a second byte pass in a Next Higher or Next Lower situation, FF9–146 is in a 0 condition so as to apply a high signal to A9–11. However, the high output from A9–142 sets FF9–146 to 1 to terminate this signal and instead apply a high signal from its 1 output terminal to A9–113. The enabling of A9–113 permits it to apply pulses from the high speed source via A9–118 to the Count backward line of bit counter 9–10. The pulse from A9–142 further is applied to set FF9–88 to the 1 condition, thereby disabling A9–86 at the start of backward counting for counter 9–10. The reason for this disabling of A9–86 is to prevent a premature detection of a BB signal at the very stage of the counter from whence the backward count is to start, since the counter must be counted all the way back to the beginning of the byte just searched. Thus, when FF9–85 is automatically set to 1 by the delayed EB signal (at the end of the first pass), A9–118 gates in high speed count pulses which step the bit counter backwards commencing from the C stage which detected said EB signal. However, when the counter has been stepped backward only one stage from its starting point, A9–86 must then be permitted to sense any BB signal which might then be generated, starting with the first stage to which the counter is stepped in its backward direction. Thus, the first high speed count pulse applied to O9–13 during the backward operation is also slightly delayed by delay line 9–147 and then applied to clear FF9–88 to 0. This permits A9–86 to detect if a BB signal is associated with the first counter stage reached in the backward count operation. If so, then FF9–89 is immediately set to 1, thus prohibiting any further high speed count pulses from passing through A9–118. If no BB signal is detected at this time, however, then high speed count pulses continue to pass through A9–118 until the bit counter 9–10 finally does step to a stage which produces an output from O9–49. The same BB signal which sets FF9–89 is also applied via A9–86 to clear FF9–146 to 0 in order to permit forward counting by counter 9–10 during the second pass through the byte.

During the second pass through the byte for the Next Lower or Next Higher search, the now present 1 condition of FF9–140 permits the selective generation of either the Odd F1 or Odd F2 signals according to the states of the Odd Column or (Even Column) Enable flip-flops 4–26 after each row search, as has been previously explained in connection with FIGURE 4. A9–147 and A9–148 respectively generate these two signals, the former through O9–154. Each of these gates has one input connected to the output of O9–105, via A9–150 and delay line 9–151, to thereby receive each search pulse applied to the row drivers during the second pass through the field. However, the actual production of either the Odd F1 or Odd F2 signals is dependent upon the state of the Enable flip-flops 4–26 in the odd (or even) match circuits, whose 1 output terminals are individually connected to O9–149. For example, a high signal E1 indicates that FF4–26 in the odd numbered column 1 match logic circuit is in a 1 condition. The same is true for flip-flop FF4–26 in the column 3 match logic circuit whenever a high signal E3 appears to O9–149. The output of O9–149 is connected to one input of each A gate 9–147 and 9–148. One input of A9–150 is connected to the output of O9–105, while its other input is connected to the 1 output terminal of FF9–140. The delay line 9–151 has a delay slightly greater than the time lag between the application of a search pulse to a driver flip-flop and the appearance of any significant sense line signal therefrom to the match logic circuits. Consequently, the sampling of O9–149 by A gates 9–147 and 9–148 is delayed until the flip-flops 4–26 have had a chance to respond to sense line outputs caused by the same search pulse. If all odd flip-flops 4–26 are in a 0 condition after a row has been searched, then the output from O9–149 is low, making high the output of I9–152 which thereby permits A9–147 to respond to the delayed search pulse and thus generate an Odd F1 signal. On the other hand, if at least one Enable flip-flop 4–26 remains set after a row has been searched, the delayed search pulse through 9–151 finds A9–149 enabled by a high output from O9–149 to thereupon generate the Odd F2 signal.

An Odd F1 signal is also generated at the beginning of the second pass through the byte in order to initially set to 1 all Enable flip-flops 4–26 whose Match flip-flops have remained set at the end of the first pass. This is performed by A9–153 via O9–154 which, because of the 1 condition of FF9–140, responds to the output from O9–135 at the beginning of the second pass.

As has heretofore been described, the generation of an Odd F1 signal subsequent to the searching of any row also calls for an effective change in search register bits for at least all succeeding row searches during the second pass. A flip-flop 9–155 has its 1 output terminal connected to A9–157 also receiving the NH signal from A9–96 for a Next Higher search. A9–158 likewise has one input connected to FF9–155, with the other input coming from A9–95 which gates through the NL signal. Consequently, if FF9–155 is set at any time during the second pass, either A9–157 or A9–158 is enabled to respectively generate either the signal Change SR to 0 or Change SR To 1, depending upon whether a Next Higher or a Next Lower search is being conducted. These two signals are applied to FIGURE 8 for effectively causing a change in search register bits remaining to be searched in the second pass. Of course, earlier scanned SR bits of the byte are also changed in this process, but this is of no consequence. FF9–155 is set to a 1 condition during the second pass by the first output signal from A9–147.

At the conclusion of the second pass through the field, an EB signal from A9–112 is once again produced which now makes high the output of A9–145 so as to clear both FF9–140 and FF9–155. This occurs after delay 9–151 has had a chance to apply the last search pulse to gates A9–147 and A9–148, inasmuch as said EB signal itself is caused by the same search pulse as delayed through A9–108. The clearing of FF9–140 again makes high the Permit MOS Step signal in time to permit the change of the MOS counter 7–52 to its next stage so as to scan the next following mode statement for the next following byte. FF9–89 is cleared by the EB signal at the end of the second pass to terminate an output from O9–141, thus keeping FF9–140 in its 0 condition. After a 1$\mu$sec. delay through 0–116, FF9–85 is set to 1 to begin the scan for the beginning of the next byte.

FIGURE 10 shows a circuit for generating the signal BL1 used to enable each gate A4–30 in all Word Match Logic circuits for a Between Limits search. BL1, as shown in FIGURE 12, appears at T1 time and lasts until T4 time. A flip-flop 10–10 normally is in its 0 condition such that a signal BL1 from its 1 output terminal is not present. However, at the beginning of a byte search the signal BL from the MOS translator is applied to A10–11 and A10–12 to permit their operation during this mode of search. Since even Memory columns are being driven according to $M \leq SR$, the Even CL2 signal from the Even Column Control circuit appears at time T1 and passes through A10–12 to set FF10–10. The Odd Memory columns are driven according to $M \geq SR$ such that the Odd EB signal appears at approximately time T4 and, when applied to A10–11, clears FF10–10 thus terminating the BL1 signal.

FIGURE 11 shows circuit details for interrogating the Word Match Logic circuits at the conclusion of a complete word search in order to both produce match data for those Memory word locations in which matches are obtained, as well as to determine the state of the No Match (NM) and Multiple Match (MM) flip-flops associated with the Match register. An A gate 11–10 has inputs from both the Odd End Word and Even End Word signals from their respective Odd and Even control circuits, each of these signals appearing when its respective bit counter 9–10 steps to its stage C37. When both said signals appear, A11–10 sets a flip-flop 11–11 to its 1 condition indicative of the fact that the match logic circuits must now be interrogated. The 1 output terminal of FF11–11 is connected to A11–12 and A11–13, each of which also has an input from the Interrogate pulse line coming from the program control of the computer. However, for either A11–12 or A11–13 to be enabled, the proper stage of a counter 11–14 must be on. The output from stage C1 of said counter is connected to A11–12 so when said stage is active, an Interrogate pulse may pass through A11–12 and onto the Interrogate transmission line for the Word Match Logic circuits which are connected to the even numbered Memory columns. When counter 11–14 has C2 stage active, an Interrogate pulse can pass through A11–13 and to the Interrogate transmission line connected with the Word Match Logic circuits of the odd numbered Memory columns. The third stage C3 of counter 11–14 is finally turned on at the end of the odd column interrogate time, thus indicating that the word search cycle is complete.

The opposite terminals of both the Odd and Even interrogate transmission lines are connected to O11–15 whose output in turn is directed to several components. A11–16 has an input from O11–15 and an output connected to the set to 1 terminal of the No Match flip-flop in the Match register. Another A gate 11–17 whose output is connected to the Multiple Match flip-flop in the Match register, also has an input from O11–15 via I11–18. Consequently, a high output from O11–15 (thus indicating that an Interrogate pulse applied to either the Odd or Even column transmission line has been propagated completely therethrough without finding a Match condition), enables A11–16 and A11–17 in turn. O11–20 has inputs from both A11–12 and A11–13 such that its output becomes high for an Interrogate pulse applied to either the Odd or Even interrogate transmission line. The output from O11–20 is connected through a delay line 11–21 to the Count Forward lead of a counter 11–19 so that each Interrogate pulse applied to either the Odd or Even transmission line eventually supplies a Count Forward signal to counter 11–19. The time delay provided by line 11–21 to each Interrogate pulse is enough to delay its arrival to counter 11–19 until after it would have appeared from O11–15 if there are no Match flip-flops in a 1 condition along the entire transmission line length. The output from O11–20 is further connected to an input of A11–17 through a second delay line 11–22, having the same time lag as would be encountered by an Interrogate pulse on its Odd or Even interrogate transmission line if there are no Match flip-flops set thereon. Consequently, delay 11–22 is shorter than delay 11–21, since it is desired that any positive output from the former arrive at A11–17 simultaneously with the arrival thereto of any Interrogate signal from O11–15 via I11–18.

A Clear line is provided to counter 11–19 for resetting same to its C1 state both at the beginning of an Even column interrogate cycle and also at the beginning of the following Odd column interrogate cycle. The resetting of counter 11–19 is accomplished through O11–23 by either an Illegal Address signal, or through a delay line element 11–24 whose output is connected to O11–15 and which is longer than delay 11–21. For any given Interrogate pulse that can propagate through the entire length of the Even or Odd transmission line, the relative delays of lines 11–21 and 11–24 cause a pulse to appear on the Clear line of counter 11–19 subsequent to the appearance of a pulse on its Count Forward line. The output from O11–15 is further connected to O11–25 which in turn is connected to the Count Forward line of counter 11–14. Any interrogate pulse appearing at O11–15, therefore, steps counter 11–14 to the next higher stage and eventually to stage C3. An additional input is applied to O11–25 by the Illegal Address signal from the Address Compare circuit thus indicating that a match address is illegal as compared to the last address for which Memory is loaded. This Illegal Address indication resets counter 11–19 and steps counter 11–14.

The overall operation of FIGURE 11 is as follows. When A11–10 is enabled by both the Odd and Even bit counters stepping to their stage C37, FF11–11 is set to thereby indicate the Word Match Logic circuits should now be interrogated for matches. Since counter 11–14 is in its C1 state, A11–12 permits the first Interrogate pulse to pass therethrough and then to the Even interrogate transmission line where it is applied to gates A4–37 and A4–38 in the Memory column 2 Word Match Logic. If flip-flop 4–34 in said circuit is set to 1, then A4–37 thereof sends a signal to the Address Encoder for generating match data. The first Interrogate pulse therefore cannot pass through A4–38 of the column 2 match logic circuit, and so it disappears from the Even transmission line as indicated by the absence of an output from O11–15. This first Interrogate pulse also is applied to O11–20 and is delayed by 11–21 before reaching counter 11–19 to step same to stage C2. Because of the shorter delay encountered in delay line 11–22, the output from O11–20 has disappeared from the input to A11–17 by the time that counter 11–19 steps to C2. This means, therefore, that there can be no output from A11–16.

After the computer has processed the first match data generated by the Address Encoder, it applies a second Interrogate pulse which passes through A11–12 to both the Even column transmission line and to O11–20. By this time the Match FF4–35 in Even column 2 has been cleared to 0 because of the feedback of the preceding first Interrogate pulse through delay 4–39. Therefore, the second Interrogate pulse passes through A4–38 of the column 2 match circuit and is applied to inputs of A4–37 and A4–38 in the column 4 match circuit. If the match flip-flop in that column is set to 1, then the Address Encoder is energized and this second Interrogate pulse also disappears from the Even interrogate transmission line. On the other hand, the column 4 Match flip-flop may be in a 0 condition, so that the Interrogate pulse is propagated to column 6, etc. Under the assumption a second match exists some place in the even column match circuits, there again is no output O11–15. The second Interrogate pulse applied to O11–20 is once again delayed by 11–21 and then applied to the Count Forward input of counter 11–19. However, there is no change in the state of counter 11–19 since its stage C2 is already on. The O11–20 output is also transmitted to A11–17 via delay 11–22. Since there is no output from O11–15 by the time that said second Interrogate pulse arrives at A11–17, a signal is generated therefrom which sets the Multiple Match flip-flop in the Match address register, thus indicating that there are at least two matches in the Even column match circuit. In the absence of an O11–15 output, counter 11–19 remains in its C2 conducting condition, and counter 11–14 remains with its C1 stage on.

When the third Interrogate pulse is next received from the computer, an output is also derived from A11–17 if said third Interrogate pulse disappears from the Even transmission line because of a third Match flip-flop set to 1 somewhere in the even column match circuits. The same is true for subsequent interrogate pulses when there are still even Match flip-flops set to a 1 condition. Eventually, all even Match flip-flops will be in a 0 condition. The next following Interrogate pulse from A11–12 thus propagates through the Even interrogate transmission line to appear at the output of O11–15. In so doing, its high signal is inverted by I11–18 in order to inhibit A11–17 from setting the Multiple Match flip-flop for this given interrogate pulse. The O11–15 output is further applied to clear counter 11–19 back to its C1 stage, and counter 11–14 is stepped from C1 to C2 which permits Interrogate pulses to now pass through A11–13 to the Odd column interrogate transmission line.

Assume now that there are no matches to be found in any of the odd numbered Memory columns. The first Interrogate pulse applied via A11–13 arrives at the outputs of both O11–15 and O11–20. Since counter 11–19 is on stage C1 by the time that O11–15 goes high, A11–16 is enabled to set the No Match flip-flop in the Match Address register. This first Interrogate pulse then appears at the output of delay 11–24 and steps counter 11–19 to stage C2. However, the delayed output from delay line 11–24 subsequently resets counter 11–19 back to stage C1. Furthermore, counter 11–14 is stepped from stage C2 to stage C3 to indicate the end of the search cycle.

One further example may be given to illustrate the operation of FIGURE 11. If the first interrogate pulse to be applied to either interrogate transmission line finds a match therein, counter 11–19 is stepped from C1 to C2 and there is no output from A11–16. However, if there is only one match in the transmission line being interrogated, the second interrogate pulse applied thereto appears from O11–15 to inhibit any output from A11–17, thus preventing the Multiple Match flip-flop from being set on by the second interrogate pulse.

OVERALL SYSTEM OPERATION

To briefly describe the functional operation of the Search Memory system, a complete sequence of operations will now be traced from the time the program initiates the search to the time that all match data have been transmitted to the computer and/or other utilization means for further processing. For a better understanding of the following, refer also to FIGURE 1. In a typical computer installation, a number of computer programmed instructions can be employed by Unit Control 1–11 to operate the Search Memory system. To initially and rapidly block load both the Memory section (with the data word storage array) and the Match Data Storage unit with information, a Set Load Designator instruction (SLD) is executed which clears the Address Register 1–31 to a value or address identifying Memory column 1 and sets a special load designator so that any address held in the Address Register 1–31 can be incremented by 1 at the end of each complete transfer of information to the Memory and Match Data columns specified by said address. Next, an instruction called Word To Associative Memory (WAM) is executed which places a data word into column 1 of the film array in the Memory section, followed by execution of a Word To Data Memory (WDM) instruction which both loads column 1 of the Match Data Storage unit 1–27 and thereafter permits the address in Address register 1–31 to be incremented to a value specifying column 2 of the Memory and Match Data Storage units. Instructions WAM and WDM are now alternately repeated until the Memory and Match Data Storage units are filled with information in column 1 to some column *n*, not necessarily the last column N. Also, the programmer can, if he so desires, commence block loading from a column other than 1 by executing an instruction labelled AMAR just after the SLD instruction in order to transfer an address from the computer memory into the address register 1–31, from where block loading can commence.

A Load Parameter Register (LPR) instruction (LPR) is next used by Unit Control 1–11 to place a 36-bit word from the computer main memory into PR1–13; a Load Mode of Search Register instruction (LMS) likewise controls a MOS word transfer to MOS1–14; and a Load Mask Register instruction (LMR) places a Mask word from the computer into MR1–15. Thus, just prior to the beginning of each search cycle and at the discretion of the programmer, none, one, or more of these three last named instructions can be sequentially executed to enter said control words one at a time into the Search memory system. Once these control words have been set up, a subsequently executed instruction Search Register Control (SRC) causes the transfer of a Search word from the computer main memory to the Search register 1–12, from which point on the operation of the Search memory is automatic so that the computer can perform other functions. Unit Control 1–11 generates first a Clear signal followed by a Start signal so as to initiate a search cycle operation on the entire Search word now in the Search register. Also, the load designator element in Address Register 1–31 is cleared, and the address there is transferred to the Last Address Register 1–30.

Assume that the first search cycle is a mixed search on four bytes of six bits each; the first byte for $M=SR$, the second byte for $M \geq SR$, the third byte for $M \leq SR$, and the fourth byte for BL. The exact location and length of the bytes are specified by the Parameter register. The first mode statement in the MOS register is interpreted as $M=SR$ and the first byte is searched bit serially. Mismatch signals resulting from this first byte search are held in the Match Logic. The second mode statement is then interpreted as $M \geq SR$, causing all of the row drivers for this byte to be turned on simultaneously before then being turned off sequentially. In each Word Match Logic circuit, the first active sense line signal resulting from the trailing edge of the drive pulses is combined with control signals in the match logic to result in either a match or no-match condition for that byte. The third mode statement is then interpreted as a $M \leq SR$ search, and the sequence for byte search two is now repeated by byte search three except that the row drivers are now turned on sequentially. Finally, the last mode statement is interpreted as Between Limits search. All even numbered Memory columns are driven for $M \leq SR$ and all odd numbered Memory columns for $M \geq SR$. During the search of this fourth byte, the mismatch outputs of each adjacent pair of Word Match Logic circuits are crossgated (i.e., a mismatch in either results in a mismatch for both).

Upon completion of this fourth byte search, an interrogation of the Match Logic is initiated by Unit Control 1–11 which sends a first interrogate pulse through the match logic for the half containing the even column match logic circuits. When this first interrogate pulse reaches the first circuit whose FF4–135 is 1, it is routed to the Match Data Storage unit which thereupon sends a match data word into the Match register 1–28. Match Data Storage unit 1–27 also routes the address of the column, in which said first match is found, to Address Register 1–31. On the other hand, if there had been no match whatsover in the even column Match Logic circuits, the first interrogate pulse would have travelled all the way through the match logic without being routed into the Match Data Storage unit and would be used to set the No-Match stage in the Match Register 1–28. The address which is placed in the Address register 1–31 is compared with the address in the Last Address register 1–30 to determine if it is a legitimate match, since said Last Address register indicates the column of the last word to be loaded into the Search memory system. If the address is legal, Unit Control 1–31 sends an input data request signal to the computer and also transfers the information in Match Register 1–28, including the values of the No Match (NM) and Multiple Match (MM) stages, to the Input/Output Buffer unit 1–10 where it is held until the computer can accept it. In the case where the No Match stage of the Match Register has been set by said first interrogate pulse, Unit Control 1–11 also sends an input data request signal to the computer in order to transfer the No Match and Multiple Match values thereto for subsequent interpretation.

When the computer finally accepts the Match Register information from the Input/Output Buffer unit 1–10, it can be programmed to perform one of several functions. In response to a No Match bit of 0 (indicating that at least one even column match circuit was in a match condition), an instruction called Next Match Data (NMD) can be immediately executed which thereby causes the Unit Control to generate a second interrogate pulse which also samples those match circuits connected with the even numbered Memory columns. However, before said NMD instruction is executed, one or both of the WAM WDM instructions may first be performed so as to replace the information, on which the match was obtained, with new information to be used during the next following search cycle. This new information is written in from the computer memory to the Memory and/or Match Data Storage column whose address now resides in Address Register 1–31, said address being that of the column giving the match indication.

The computer also may cause the execution of the NMD instruction when the said first interrogate pulse sets the No Match value to 1 due to the absence of any even column match condition, since a second interrogate pulse is desired to sample the odd column match logic circuit. Furthermore, an Illegal Address signal generated at any time during even column interrogation also permits Unit Control to generate a subsequent Interrogate pulse for odd column interrogation.

Assuming now the application of a second interrogate pulse to the even column Word Match Logic circuits, said pulse ignores the logic circuit for the first match condition (since it has been reset) and continues down the transmission line until another match, if any, is encountered. If a second match is so found, the process above is repeated but the Multiple Match stage is set to 1. When the computer receives the match data associated with this second even column match condition, it again executes the NMD instruction (and perhaps also the WAM and/or WDM instructions) so as to cause a third interrogation pulse to be applied to the even column match logic circuits. The repeated execution of this NMD instruction is normally done in a loop programming technique. This process continues until either all legal even column matches are found, or an illegal address is generated. The interrogate circuitry now switches to the odd column match circuits, and the same functions performed therefor. However, if the first interrogate pulse so applied to the odd column match circuits finds a no match condition in all, the resulting 1 value of the No Match stage in Match register 1–27 now causes the computer to exit from the NMD program loop, i.e., to skip the next instruction. On the other hand, when said first interrogate pulse to the odd column match circuits does find a match condition, a subsequent NMD instruction will be executed to apply a second interrogate pulse. This process continues until all odd column matches are found, or alternatively, until an Illegal Address is indicated, at which time the Search Cycle Finish signal is generated which can be transmitted to cause an exit from the NMD program loop.

After the first search cycle is terminated, the computer program can be written so as to again execute one or more of the LPR, LMS, LMR, or SRC instructions in order to change the search criteria and then commence a second search cycle. After a selected number of search cycles have been performed, the program can then proceed to interpret all of the match data found. It can use the No-Match and Multiple-Match control bits to correlate the various groups of addresses with separate search operations, Assume, for example, that for five consecutive search cycles, the following ten even column matches were found: the first search cycle produced a single even column match; the second a group of five matches; the third a No-Match in the even columns; the fourth a group of two matches; and the fifth a single match. The NM and MM control bits for the ten resulting even column match data words as sent to the computer are shown below in Example 3. It can be seen that the first appearing match data word of a plural word group contains a 0 MM bit and all others in the group contain a 1 MM bit. This configuration can be easily distinguished by the computer. With regard to word number 7, only NM and MM bit values are actually transferred to the computer since there were no even column matches obtained during search cycle 3. Furthermore, a pattern of NM and MM bits would also be sent to the computer for the odd Memory column matches obtained during said five search cycles.

*Example 3*

| Even Column Match Data Words in Order of Transfer to Computer | Multiple Match Bit (MM) | No Match Bit (NM) | Search Cycle |
|---|---|---|---|
| 1 | 0 | 0 | 1 |
| 2 | 0 | 0 | |
| 3 | 1 | 0 | |
| 4 | 1 | 0 | 2 |
| 5 | 1 | 0 | |
| 6 | 1 | 0 | |
| 7 | 0 | 1 | 3 |
| 8 | 0 | 0 | |
| 9 | 1 | 0 | 4 |
| 10 | 0 | 0 | 5 |

If during any search cycle a mode statement calls for an interrupt at the end of a byte scan, said interrupt operation causes an approximate count of the number of matches obtained up to this time as has been previously described. This count is transferred from the Approximate Match Counter 1–33 to the Computer via the Input/Output Buffer. After the computer receives said count, several programmed choices are available. By executing one NMA instruction, Unit control is caused to set FF11–11 and then transmit one interrogate pulse to the Even column match circuits in order to transfer the first match data word, if any, to the computer. The computer upon receipt of same thereafter does not repeat execution of the NMA instruction, and Unit Control is internally reset to terminate the search cycle at the end of the byte scan where the interrupt occurred. Alternatively, the computer, after receiving the approximate match count, can execute a Resume Interrupted Search instruction (RIS) causing Unit Control to produce a Start signal which in turn allows the Column Control Units to begin the scan of the next byte following that for which the interrupt was specified. The search cycle then proceeds to its normal conclusion unless some other mode statement therein specifies another interrupt operation. However, before either the said one NMA or RIS instruction is executed the computer can execute an instruction labelled NMA which causes Unit Control to operate the Exact Match Counter 1–32 and then transfer to the computer the exact number of matches.

What has been shown and described is an extremely versatile search memory system wherein during each search cycle, a large number of different searches can be performed on different portions of the same word. Although certain preferred structure have been shown for various units therein, it is to be understood that the invention in its broader aspects is not to be so limited. For example, different byte scan speeds may be employed according to the electrical characteristics of the components used, and memory storage elements other than thin films can be utilized. Furthermore, where the special Between Limits search mode is not required, all memory columns can be driven by the same Column Control unit. Consequently, many modifications and/or changes will be apparent to those skilled in the art without departure from the novel principles defined in the appended claims.

The embodiments of the invention in which an exclusive property or privilege is claimed are defined as follows:

1. A match logic circuit comprising:

(a) a first conductor for receiving either one of first polarity or second polarity electrical signals, a second conductor, and a third conductor;

(b) first means connected between said first conductor and each of said second and third conductors which is selectively operable for producing a predetermined signal on said second conductor in response to a said first polarity signal on said first conductor, and for producing a predetermined signal on said third conductor in response to a said second polarity signal on said first conductor;

(c) second means connected between said first conductor and one of said second and third conductors which is selectively operable for producing a predetermined signal on said last named one conductor in response to either a said first polarity or a said second polarity signal on said first conductor;

(d) first control means having a first stable condition and a second stable condition; third means selectively operable for placing said first control means into its said first stable condition;

(e) first gating means connected with said first control means so as to be in a signal passing state when said first control means is in its said first stable condition; and (f) fourth means connecting one of said second and third conductors with said first control means and connecting the other of said second and third conductors with said first gating means such that a said predetermined signal on said last named one conductor places said first control means into its said second stable condition while a said predetermined signal on said last named other conductor passes through said first gating means when in its signal passing state.

2. A match logic according to claim 1 wherein said fourth means is selectively operable to one state for connecting said second and third conductors to said first control means and to said first gating means, respectively and is selectively operable to another state for connecting said third and second conductors to said first control means and to said first gating means, respectively.

3. A match logic circuit comprising:

(a) a first conductor for receiving either one of first polarity or second polarity electrical signals, a second conductor, and a third conductor;

(b) first means connected between said first conductor and each of said second and third conductors which is selectively operable for producing a predetermined signal on said second conductor in response to a said first polarity signal on said first conductor, and for producing a predetermined signal on said third conductor in response to a said second polarity signal on said first conductor;

(c) second means connected between said first conductor and each of said second and third conductors which is selectively operable for producing a predetermined signal on said second conductor in response to a said first polarity signal on said first conductor, and for producing a predetermined signal on said third conductor in response to a said second polarity signal on said first conductor;

(d) third means connected between said first conductor and one of said second and third conductors which is selectively operable for producing a predetermined signal on said last named one conductor in response to either a said first polarity or a said second polarity signal on said first conductor;

(e) first control means having a first stable condition and a second stable condition; fourth means selectively operable for placing said first control means into its said first stable condition;

(f) first gating means connected with said first control means so as to be in a signal passing state when said first control means is in its said first stable condition; and (g) fifth means connecting one of said second and third conductors with said first control means and connecting the other of said second and third conductors with said first gating means such that a said predetermined signal on said last named one conductor places said first control means into its said second stable condition while a said predetermined signal on said last named other conductor passes through said first gating means when in its signal passing state.

4. A match logic circuit according to claim 3 wherein said fifth means is selectively operable to one state for connecting said second and third conductors to said first control means and to said first gating means, respectively, and is selectively operable to another state for connecting said third and second conductors to said first control means and to said first gating means, respectively.

5. A match logic circuit comprising:

(a) a first conductor for receiving either one of first polarity or second polarity electrical signals, a second conductor, and a third conductor;

(b) first means connected between said first conductor and each of said second and third conductors which is selectively operable for producing a predetermined signal on said second conductor in response to a said first polarity signal on said first conductor, and for producing a predetermined signal on said third conductor in response to a said second polarity signal on said first conductor;

(c) second means connected between said first conductor and one of said second and third conductors which is selectively operable for producing a predetermined signal on said last named one conductor in response to either a said first polarity or a said second polarity signal on said first conductor;

(d) first control means having a first stable condition and a second stable condition; third means selectively operable for placing said first control means into its said first stable condition;

(e) first and second gating means each connected with said first control means and each selectively operable so as to be in a signal passing state when said first control means is in its said first stable condition; and (f) fourth means connecting one of said second and third conductors with said first control means and connecting the other of said second and third conductors with both said first and second gating means such that a said predetermined signal on said last named one conductor places said first control means into its said second stable condition while a said predetermined signal on said last named other conductor passes through a said first or second gating means when in its signal passing state.

6. A match logic circuit according to claim 5 wherein said fourth means is selectively operable to one state for connecting said second and third conductors to said first control means and to said first and second gating means respectively, and is selectively operable to another state for connecting said third and second conductors to said first control means and to said first and second gating means respectively.

7. A match logic circuit comprising:

(a) a first conductor for receiving either one of first polarity or second polarity electrical signals, a second conductor, and a third conductor;

(b) first means connected between said first conductor and each of said second and third conductors which is selectively operable for producing a predetermined signal on said second conductor in response to a said first polarity signal on said first conductor, and for producing a predetermined signal on said third conductor in response to a said second polarity signal on said first conductor;

(c) second means connected between said first conductor and each of said second and third conductors which is selectively operable for producing a predetermined signal on said second conductor in response to a said first polarity signal on said first conductor, and for producing a predetermined signal on said third conductor in response to a said second polarity signal on said first conductor;

(d) third means connected between said first conductor and one of said second and third conductors which is selectively operable for producing a predetermined signal on said last named one conductor in response to either a said first polarity or a said second polarity signal on said first conductor;

(e) first control means having a first stable condition and a second stable condition; fourth means selectively operable for placing said first control means into its said first stable condition;

(f) first and second gating means each connected with said first control means and each selectively operable so as to be in a signal passing state when said first control means is in its said first stable condition; and (g) fifth means connecting one of said second and third conductors with said first control means and connecting the other of said second and third conductors with both said first and second gating means such that a said predetermined signal on said last named one conductor places said first control means into its said second stable condition while a said predetermined signal on said last named other conductor passes through a said first or second gating means when in its signal passing state.

8. A match logic circuit according to claim 7 wherein said fifth means is selectively operable to one state for connecting said second and third conductors to said first control means and to said first and second gating means, respectively, and is selectively operable to another state for connecting said third and second conductors to said first control means and to said first and second gating means, respectively.

9. A match logic circuit comprising:

(a) a first conductor for receiving either one of first polarity or second polarity signals, a second conductor, and a third conductor;

(b) first means connected between said first conductor and each of said second and third conductors for producing a predetermined signal on said second conductor in response to a said first polarity signal on said first conductor, and for producing a predetermined signal on said third conductor in response to a said second polarity signal on said first conductor;

(c) first control means having a first stable condition and a second stable condition; second means selectively operable for placing said first control means into its said first stable condition;

(d) first gating means connected with said first control means so as to be in a signal passing state when said first control means is in its said first stable condition; second gating means adapted to receive a first control signal and connected with said first first control means so as to be in a signal passing state when said first control means is in its said second stable condition;

(e) third means connecting said second conductor with said first control means and connecting said third conductor with said first gating means, such that a said predetermined signal on said second conductor places said first control means into its said second stable condition while a said predetermined signal on said third conductor passes through said first gating means when in its signal passing state;

(f) second control means having a first stable condition and a second stable condition which is connected to both said first and said second gating means such that a signal passing through either places said second control means into its said second stable condition; fourth means selectively operable for placing said second control means into its said first stable condition;

(g) third gating means adapted to receive a second control signal and connected with said second control means so as to be in a signal passing state when said second control means is in its said first stable condition; and (h) fifth means connecting said first control means with said third gating means such that a signal passing therethrough places said first control means in its said first stable condition.

10. A search memory configuration comprising:

(a) first means presenting a number N of search reference bits;

(b) second means storing at least said number N of data bits;

(c) a mode of search control means selectively operable to specify any one of a plurality of search operations;

(d) third means including a first conductor for successively comparing in a predetermined sequence each *n*th search reference bit with a corresponding *n*th stored data bit in a manner such that a first polarity electrical signal is produced on said first conductor when a search reference bit of a predetermined value is compared with a data bit of opposite value while a second polarity electrical signal is produced on said first conductor when a search reference bit of said opposite value is compared with a data bit of said predetermined value;

(e) a second conductor and a third conductor;

(f) fourth means connected between said first conductor and each of said second and third conductors for producing a predetermined signal on said second conductor in response to a said first polarity signal on said first conductor, and for producing a predetermined signal on said third conductor in response to a said second polarity signal on said first conductor;

(g) first control means having a first stable condition and a second stable condition; fifth means for placing said first control means in its said first stable condition prior to the commencement of the search reference compare cycle;

(h) first gating means connected with said first control means so as to be in a signal passing state when said first control means is in its said first stable state; and (i) sixth means connecting one of said second and third conductors with said first control means and connecting the other of said second and third conductors with said first gating means such that a said predetermined signal on said last named one conductor places said first control means into its said second stable condition while a said predetermined signal on said last named other conductor passes through said first gating means when in its signal passing state.

11. A search memory configuration according to claim 10 wherein said sixth means is responsive to said mode of search control means and is conditioned by at least one specified search operation therefrom for connecting said second and third conductors with said first control means and said first gating means, respectively, and is conditioned by at least another said specified search operation for connecting said third and said second conductors with said first control means and said first gating means, respectively.

12. A search memory configuration according to claim 10 wherein said third means is connected to said mode of search control means and is responsive to at least a first specified search operation therefrom for producing a predetermined polarity signal on said first conductor subsequent to the final comparison of the Nth search reference bit with the Nth data bit, and wherein said sixth means is responsive to said mode of search control means and is conditioned by at least one specified search operation therefrom for connecting said second and third conductors in one way with said first control means and said first gating means, and is conditioned by at least and first specified search operation for connecting said second and third conductors in the opposite way with said first control means and said first gating means at least during the comparison of all N search reference bits with all N data bits.

13. A search memory configuration according to claim 12 wherein said sixth means is responsive to said first specified search operation for connecting said second and third conductors with said first control means and said first gating means in said one way subsequent to the final comparison of the Nth search reference bit and Nth data bit.

14. A search memory configuration according to claim 12 wherein said sixth means is responsive to said first specified search operation for connecting said second and third conductors with said first control means and said first gating means in said opposite way subsequent to the final comparison of the Nth search reference bit and Nth data bit.

15. A search memory configuration according to claim 10 wherein said fourth means must be conditioned by at least one specified search operation from said mode of search control means in order to produce said predetermined signals; wherein is further included seventh means connected between said first conductor and one of said second and third conductors which is conditionable by at least another specified search operation from said mode of search control for producing a predetermined signal on said last named conductor in response to either a said first polarity or a said second polarity signal on said first conductor.

16. A search memory configuration according to claim 10 wherein said first gating means must further be conditioned by at least one specified search operation from said mode of search control means in order to be in its signal passing state; and wherein is further included second gating means connected with both said first control means and said last named other conductor which is conditioned by at least another specified search operation from said mode of search control means so as to be in a signal passing state when said first control means is in its said first stable state.

17. A search memory configuration comprising:

(a) first means presenting a number N of search reference bits;

(b) second means storing at least said number N of data bits;

(c) a mode of search control means selectively operable to specify any one of a plurality of search operations;

(d) third means including a first conductor for successively comparing in a predetermined sequence each *n*th search reference bit with a corresponding *n*th stored data bit in a manner such that a first polarity electrical signal is produced on said first conductor when a search reference bit of a predetermined value is compared with a data bit of opposite value while a second polarity electrical signal is produced on said first conductor when a search reference bit of said opposite value is compared with a data bit of said predetermined value;

(e) a second conductor and a third conductor;

(f) fourth means connected between said first conductor and one of said second and third conductors for producing a predetermined signal on said last named one conductor in response to either a said first polarity or a said second polarity signal on said first conductor;

(g) first control means having a first stable condition and a second stable condition; fifth means for placing said first control means in its said first stable condition prior to the commencement of the search reference compare cycle;

(h) first gating means connected with said first control means so as to be in a signal passing state when said first control means is in its said first stable state; and (i) sixth means connecting one of said second and third conductors with said first control means and connecting the other of said second and third conductors with said first gating means such that a said predetermined signal on said last named one conductor places said first control means into its said second stable condition while a said predetermined signal on said last named other conductor passes through said first gating means when in its signal passing state.

18. A search memory configuration according to claim 17 wherein said sixth means is responsive to said mode of search control means and is conditioned by at least one specified search operation therefrom for connecting said second and third conductors with said first control means and said first gating means, respectively, and is conditioned by at least another said specified search operation for connecting said third and said second conductors with said first control means and said first gating means, respectively.

19. A search memory configuration according to claim 17 wherein said first gating means must further be conditioned by at least one specified search operation from said mode of search control means in order to be in its signal passing state; and wherein is further included second gating means connected with both said first control means and said last named other conductor which is conditioned by at least another specified search operation from said mode of search control means so as to be in a signal passing state when said first control means is in its said first stable state.

20. A search memory configuration comprising:

(a) first means presenting a number N of search reference bits;

(b) second means storing at least said number N of data bits;

(c) a mode of search control means selectively operable to specify any one of a plurality of search operations;

(d) third means responsive to said mode of search means and including a first conductor for successively comparing in a predetermined sequence each *n*th search reference bit with a corresponding *n*th stored data bit in a manner such that for at least one specified search operation from said mode of search control means a first polarity electrical signal is produced on said first conductor when a search reference bit of a predetermined value is compared with a data bit of opposite value while a second polarity electrical signal is produced on said first conductor when a search reference bit of said opposite value is compared with a data bit of said predetermined value, and for at least another specified search operation from said mode of search control means a said second polarity electrical signal is produced on said first conductor when a search reference bit of said predetermined value is compared with a data bit of said opposite value while a said first polarity signal is produced on said first output conductor when a search reference bit of said opposite value is compared with a data bit of said predetermined value;

(e) a second conductor and a third conductor;

(f) fourth means connected between said first conductor and each of said second and third conductors which is conditioned by said last named one specified search operation from said mode of search control means for producing a predetermined signal on said second conductor in response to a said first polarity signal on said first conductor, and for producing a predetermined signal on said third conductor in response to a said second polarity signal on said first conductor;

(g) fifth means connected between said first conductor and each of said second and third conductors which is conditioned by said last named another specified search operation from said mode of search control means for producing a predetermined signal on said second conductor in response to a said first polarity signal on said first conductor, and for producing a predetermined signal on said third conductor in response to a said second polarity signal on said first conductor;

(h) first control means having a first stable condition and a second stable condition; sixth means for placing said first control means into its said first stable condition prior to the commencement of the search reference compare cycle;

(i) first gating means connected with said first control means so as to be in a signal passing state when said first control means is in its said first stable condition; and (j) seventh means connecting one of said second and third conductors with said first control means and connecting the other of said second and third conductors with said first gating means such that a said predetermined signal on said last named one conductor places said first control means into its said second stable condition while a said predetermined signal on said last named other conductor passes through said first gating means when in its signal passing state.

21. A search memory configuration according to claim 20 wherein said third means is further responsive to at least a first specified search operation from said mode of search control means for producing a predetermined polarity signal on said first conductor subsequent to the final comparison of the Nth search reference bit with the Nth data bit, and wherein said seventh means is responsive to said mode of search control means and is conditioned by at least one specified search operation therefrom for connecting said second and third conductors with said first control means and said first gating means, respectively, and is conditioned by at least said first specified search operation for connecting said third and second conductors with said first control means and said first gating means, respectively, at least during the comparison of all N search reference bits with all N data bits.

22. A search memory configuration according to claim 21 wherein said seventh means is responsive to said first specified search operation for connecting said second and third conductors with said first control means and said first gating means, respectively, subsequent to the final comparison of the Nth search reference bit and Nth data bit.

23. A search memory configuration according to claim 20 wherein is further included eighth means connected between said first conductor and one of said second and third conductors which is conditioned by at least one specified search for producing a predetermined signal on said last named one conductor in response to either a said first polarity or said second polarity signal on said first conductor.

24. A search memory configuration comprising:

(a) first means presenting a number N of search reference bits;

(b) second means storing at least said number N of data bits;

(c) parameter control means selectively operable to identify a plurality of different groups of said search reference bits each group to be compared with a corresponding different group of said stored data bits;

(d) third means responsive to said parameter control means and including a first conductor for successively comparing in a predetermined sequence each $n$th bit of each said identified search reference group with a corresponding $n$th bit of the corresponding stored data group, group by group, in a manner such that a first polarity electrical signal is produced on said first conductor when a search reference bit of a predetermined value is compared with a data bit of opposite value, and a second polarity electrical signal is produced on said first conductor when a search reference bit of said opposite value is compared with a data bit of said predetermined value;

(e) a second conductor and a third conductor;

(f) fourth means connected between said first conductor and each of said second and third conductors which is selectively operable for producing a predetermined signal on said second conductor in response to a said first polarity signal on said first conductor, and for producing a predetermined signal on said third conductor in response to a said second polarity signal on said first conductor;

(g) first control means having a first stable condition and a second stable condition; fifth means operated by said third means for placing said first control means into its said first stable condition prior to the commencement of each search reference group compare cycle;

(h) first gating means connected with said first control means so as to be in a signal passing state when said first control means is in its said first stable condition; and (i) sixth means connecting one of said second and third conductors with said first control means and connecting the other of said second and third conductors with said first gating means such that a said predetermined signal on said last named one conductor places said first control means into its said second stable condition while a said predetermined signal on said last named other conductor passes through said first gating means when in its signal passing state.

25. A search memory configuration according to claim 24 wherein is further included mask control means selectively operable to present a variable number of masking bits each acting upon said third means to prevent the comparison of a different $n$th search reference bit with the corresponding $n$th data bit.

26. A search memory configuration comprising:

(a) first means presenting a number N of search reference bits;

(b) second means storing at least said number N of data bits;

(c) parameter control means selectively operable to identify a plurality of different groups of said search reference bits each group to be compared with a corresponding different group of said stored data bits;

(d) a mode of search control means selectively operable to specify for each said identified search reference group any one of a plurality of search operations;

(e) third means responsive to said parameter control means and including a first conductor for successively comparing in a predetermined sequence each $n$th bit of each said identified search reference group with a corresponding $n$th bit of the corresponding stored data group, group by group, in a manner such that a first polarity electrical signal is produced on said first conductor when a search reference bit of a predetermined value is compared with a data bit of opposite value, and a second polarity electrical signal is produced on said first conductor when a search reference bit of said opposite value is compared with a data bit of said predetermined value;

(f) a second conductor and a third conductor;

(g) fourth means connected between said first conductor and each of said second and third conductors which is conditioned by at least one specified search operation from said mode of search control means for producing a predetermined signal on said second conductor in response to a said first polarity signal on said first conductor, and for producing a predetermined signal on said third conductor in response to a said second polarity signal on said first conductor;

(h) first control means having a first stable condition and a second stable condition; fifth means for placing said first control means into its said first stable condition prior to the commencement of each search reference group compare cycle;

(i) first gating means connected with said first control means so as to be in a signal passing state when said first control means is in its said first stable condition; and (j) sixth means connecting one of said second and third conductors with said first control means and connecting the other of said second and third conductors with said first gating means such that a said predetermined signal on said last named one conductor places said first control means into its second stable condition while a said predetermined signal on said last named other conductor passes through said first gating means when in its signal passing state.

27. A search memory configuration according to claim 26 wherein said third means is further responsive to a first specified search operation from said mode of search control for any search reference group in order to terminate the compare operation at the end of said search group cycle.

28. A search memory configuration comprising:

(a) first means presenting a number N of search reference bits;

(b) second means storing two groups of data bits, each group of said number N;

(c) third means including two first conductors for successively comparing in a predetermined sequence each $n$th search reference bit simultaneously with a corresponding $n$th stored data bit in each of said two groups in a manner such that for one said group a first polarity electrical signal is produced on one said first conductor when a search reference bit of a predetermined value is compared with a data bit of opposite value while a second polarity signal is produced on a said one first conductor when a search reference bit of said opposite value is compared with a data bit of said predetermined value, and for the other said group a said second polarity electrical signal is produced on said other first conductor when a search reference bit of said predetermined value is compared with a data bit of said opposite value while a said first polarity signal is produced on said other first conductor when a search reference bit of said opposite value is compared with a data bit of said predetermined value;

(d) a first match logic circuit connected to said one first conductor and a second match logic circuit connected to said other first conductor, where each said match logic circuit comprises in combination a second conductor and a third conductor; fourth means connected between its said first conductor and each of said second and third conductors for producing a predetermined signal on said second conductor in response to a said first polarity signal on its said first conductor, and for producing a predetermined signal on said third conductor in response to a said second polarity signal on its said first conductor; first control means having a first stable condition and a second stable condition; fifth means operated by said third means for placing said first control means into its said first stable condition prior to the commencement of the search reference compare cycle; first and second gating means each connected with said first control means so as to be in a signal passing state when said first control means is in its said first stable condition; sixth means connecting said second conductor with said first control means and connecting said third conductor with both of said first and second gating means such that a said predetermined signal on said second conductor places said first control means in its said second stable condition while a said predetermined signal on said third conductor passes through a said first or second gating means when in its signal passing state; an output conductor connected to the output of said first gating means; and (e) a first interconnecting means for applying a signal from the output of said second gating means in said first match logic circuit to said output conductor in said second match logic circuit, and a second interconnecting means for applying a signal from the output of said second gating means in said second match logic circuit to said output conductor in said first match logic circuit.

29. A search memory configuration comprising:

(a) first means presenting a number N of search reference bits;

(b) second means storing a number M of groups of data bits, each group having said number N of data bits;

(c) third means including a said number M of first conductors each associated with a different said data bit group for successively comparing in a predetermined sequence each *n*th search reference bit simultaneously with a corresponding *n*th stored data bit in each said data bit group in a manner such that on each said first conductor a first polarity electrical signal is produced when a search reference bit of a predetermined value is compared with its group data bit of opposite value while a second polarity electrical signal is produced on said first conductor when a search reference bit of said opposite value is compared with its group data bit of said predetermined value;

(d) a said number M of match logic circuits each connected to a different said first conductor, where each said match logic circuit comprises in combination a second conductor and a third conductor; fourth means connected between its said first conductor and each of said second and third conductors for producing a predetermined signal on said second conductor in response to a said first polarity signal on its said first conductor, and for producing a predetermined signal on said third conductor in response to a said second polarity signal on its said first conductor; first control means having a first stable condition and a second stable condition; fifth means operated by said third means for placing said first control means into its first stable condition prior to the commencement of the search reference cycle; first gating means connected with said first control means so as to be in a signal passing state when said first control means is in its said first stable condition; sixth means connecting one of said second and third conductors with said first control means and connecting the other of said second and third conductors with said first gating means such that a said predetermined signal on said last named one conductor places said first control means in its said second stable condition while a said predetermined signal on said last named other conductor passes through said first gating means when in its signal passing state; second control means having a first stable condition and a second stable condition which is connected to said first gating means such that a signal passing therethrough places said second control means into one of its said stable conditions; seventh means selectively operable for placing said second control means into the other of its said stable conditions; and (e) eighth means interconnected with the said second control means of each said match logic circuit for sampling the condition thereof.

30. A search memory configuration according to claim 29 wherein said eighth means is operable by said third means subsequent to the final comparison of the Nth search reference bit and each Nth data bit for sequentially sampling each said word match logic circuit.

31. A search memory configuration according to claim 30 wherein said eighth means includes, for each said match logic circuit, first interrogate gate means connected with the said second control means therein so as to be in a signal passing state when said second control means is in one of its stable conditions, and a second interrogate gating means connected with the said second control means therein so as to be in a signal passing state when said second control means is in the other of its stable conditions, said eighth means further including an interrogate signal conductor connected from the output of the same one of said interrogate gating means in each said *m*th match logic circuit to both of said interrogate gating means in the adjacent $m+1$th match logic circuit; and wherein is further included ninth means responsive to an interrogate signal from the other said interrogate gating means in each said match logic circuit for reversing the stable condition of the said second control means therein.

32. A search memory configuration according to claim 31 which further includes tenth means operated by said eighth means for generating a multiple match signal indication for each interrogate signal beginning with the second which is generated from a said last named other interrogate gating means.

33. A match logic circuit comprising:

(a) a first conductor for receiving either one of first polarity or second polarity electrical signals, a second conductor, and a third conductor;

(b) first means connected between said first conductor and each of said second and third conductors for producing a predetermined signal on said second conductor in response to a said first polarity signal on said first conductor, and for producing a predetermined signal on said third conductor in response to a said second polarity signal on said first conductor;

(c) first control means having a first stable condition and a second stable condition; second means selectively operable for placing said first control means into its said first stable condition;

(d) first and second gating means each connected with said first control means and each selectively operable so as to be in a signal passing state when said first control means is in its said first stable condition;

(e) third means connecting one of said second and third conductors with said first control means and connecting the other of said second and third conductors with both said first and second gating means such that a said predetermined signal on said last named one conductor places said first control means into its said second stable condition while a said predetermined signal on said last named other conductor passes through a said first or second gating means when in its signal passing state, said third means being selectively operable to one state for connecting said second and third conductors to said first control means and to said first and second gating means, respectively, and being selectively operable to another state for connecting said third and second conductors to said first control means and to said first and second gating means, respectively.

34. A match logic circuit comprising:

(a) a first conductor for receiving either one of first polarity or second polarity electrical signals, a second conductor, and a third conductor;

(b) first means connected between said first conductor and each of said second and third conductors for producing a predetermined signal on said second conductor in response to a said first polarity signal on said first conductor, and for producing a predetermined signal on said third conductor in response to a said second polarity signal on said first conductor;

(c) first control means having a first stable condition and second stable condition; second means selectively operable for placing said first control means into its said first stable condition;

(d) first and second gating means each connected with said first control means and each selectively operable so as to be in a signal passing state when said first control means is in its said first stable condition;

(e) third means connecting one of said second and third conductors with said first control means and connecting the other of said second and third conductors with both said first and second gating means such that a said predetermined signal on said last named one conductor places said first control means into its said second stable condition while a said predetermined signal on said last named other conductor passes through a said first or second gating means when in its signal passing state;

(f) second control means having a first stable condition and a second stable condition which is connected to the outputs of said first and second gating means so as to be responsive to a said predetermined signal passing through said first gating means for being placed into its said first stable condition and responsive to a said predetermined signal passing through said second gating means for being placed into its said second stable condition; fourth means selectively operable for placing said second control means into its said first stable condition, and fifth means selectively operable for placing said second control means into its said second stable condition.

References Cited

UNITED STATES PATENTS

| | | | |
|---|---|---|---|
| 3,185,965 | 5/1965 | Chi-Yuan Lee | 340—172.5 |
| 3,195,109 | 7/1965 | Behnke | 340—172.5 |

ROBERT C. BAILEY, *Primary Examiner.*

G. D. SHAW, *Assistant Examiner.*

UNITED STATES PATENT OFFICE
CERTIFICATE OF CORRECTION

Patent No. 3,332,069 July 18, 1967

Earl C. Joseph et al.

It is hereby certified that error appears in the above numbered patent requiring correction and that the said Letters Patent should read as corrected below.

Column 1, line 54, for ""descriptor'" read -- "descriptor" --; column 4, line 17, for "searcch" read -- search --; line 60, after "also" insert -- transmit search termination signals to Search Control and must also --; column 5, line 68, for "matching" read -- match --; column 6, line 27, for "date" read -- data --; column 8, line 61, for "World" read -- Word --; column 10, line 38, after "4" strike out "as" and insert the same after "4" in line 40, same column 10; column 19, line 68, for "add" read -- odd --; column 23, line 69, for "now" read -- row --; column 24, line 55, strike out "with the search results"; column 32, line 50, for "value" read -- values --; line 73, for "07-72" read -- A7-72 --; column 33, line 33, before "not" insert -- even --; column 35 line 22, before "or" insert an opening parenthesis; column 37, line 26, after "output" insert -- from --; column 41, line 44, for "while" read -- where --; column 42, line 16, for "FF9-14" read -- FF9-140 --; column 53, line 7, strike out "first", second occurrence; column 54, line 30, for "and" read -- said --.

Signed and sealed this 14th day of January 1969.

(SEAL)
Attest:

EDWARD M.FLETCHER,JR.
Attesting Officer

EDWARD J. BRENNER
Commissioner of Patents